US011051319B2

(12) United States Patent
Asterjadhi et al.

(10) Patent No.: US 11,051,319 B2
(45) Date of Patent: Jun. 29, 2021

(54) TECHNIQUES FOR LOW LATENCY COMMUNICATIONS IN WIRELESS LOCAL AREA NETWORKS

(71) Applicant: QUALCOMM Incorporated, San Diego, CA (US)

(72) Inventors: Alfred Asterjadhi, San Diego, CA (US); George Cherian, San Diego, CA (US); Abhishek Pramod Patil, San Diego, CA (US); Bin Tian, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 35 days.

(21) Appl. No.: 16/559,346

(22) Filed: Sep. 3, 2019

(65) Prior Publication Data

US 2020/0077421 A1 Mar. 5, 2020

Related U.S. Application Data

(60) Provisional application No. 62/726,912, filed on Sep. 4, 2018.

(51) Int. Cl.
| | |
|---|---|
| *H04W 72/12* | (2009.01) |
| *H04W 28/02* | (2009.01) |
| *H04L 5/00* | (2006.01) |
| *H04W 74/02* | (2009.01) |
| *H04W 72/04* | (2009.01) |
| *H04W 72/10* | (2009.01) |

(52) U.S. Cl.
CPC ....... *H04W 72/1242* (2013.01); *H04L 5/0055* (2013.01); *H04W 28/0268* (2013.01); *H04W 74/02* (2013.01); *H04W 72/0446* (2013.01); *H04W 72/10* (2013.01)

(58) Field of Classification Search
CPC .......................... H04W 72/1242; H04L 5/0055
USPC .......................................................... 370/329
See application file for complete search history.

(56) References Cited

U.S. PATENT DOCUMENTS

| 8,856,807 B1* | 10/2014 | Khapre | .................. | G06Q 10/10 719/318 |
| 2001/0033581 A1* | 10/2001 | Kawarai | ............. | H04L 49/3081 370/468 |

(Continued)

*Primary Examiner* — Peter G Solinsky
(74) *Attorney, Agent, or Firm* — Holland & Hart LLP

(57) ABSTRACT

Techniques for implementing low latency communications in a wireless local area network are provided. A first wireless communication device may implement a low latency basic service set (BSS) that allows contention-based channel access over a portion of a bandwidth. The first wireless communication device may configure a primary channel and one or more secondary channels within an available bandwidth. Communications with one or more wireless communication devices that have data traffic associated with a quality of service (QoS) parameter may be provided over one or more of the secondary channels. A transmission from a second wireless communication device on the primary channel may be discarded by the first wireless communication device, or the first wireless communication device may take over channel access from the second wireless communication device if such a transmission overlaps with low latency transmissions on the one or more secondary channels.

30 Claims, 27 Drawing Sheets

(56) References Cited

U.S. PATENT DOCUMENTS

| | | | | |
|---|---|---|---|---|
| 2002/0154653 A1* | 10/2002 | Benveniste | ....... | H04W 28/0231 |
| | | | | 370/447 |
| 2003/0181204 A1* | 9/2003 | Benveniste | ........... | H04W 74/02 |
| | | | | 455/422.1 |
| 2011/0321050 A1* | 12/2011 | Ho | ........................ | H04W 4/08 |
| | | | | 718/102 |
| 2012/0099564 A1* | 4/2012 | Bekiares | ............. | H04L 47/2441 |
| | | | | 370/336 |
| 2012/0195276 A1* | 8/2012 | Chun | .................... | H04L 47/30 |
| | | | | 370/329 |
| 2012/0230262 A1* | 9/2012 | Benveniste | ........... | H04W 74/04 |
| | | | | 370/329 |
| 2015/0049707 A1* | 2/2015 | Vajapeyam | ........... | H04W 76/19 |
| | | | | 370/329 |
| 2016/0219510 A1* | 7/2016 | Asterjadhi | ........ | H04W 52/0216 |
| 2016/0380896 A1* | 12/2016 | Caulfield | ................ | H04L 69/16 |
| | | | | 370/235 |
| 2017/0086211 A1* | 3/2017 | Sahin | .................... | H04W 48/16 |
| 2018/0324867 A1* | 11/2018 | Basu Mallick | ... | H04W 72/1242 |
| 2018/0359776 A1* | 12/2018 | Li | ..................... | H04W 72/0406 |
| 2018/0359802 A1* | 12/2018 | Cho | .................. | H04W 72/1242 |
| 2019/0150176 A1* | 5/2019 | Pelletier | ................ | H04L 1/1812 |
| | | | | 370/329 |
| 2020/0022214 A1* | 1/2020 | Takahashi | ............. | H04W 76/11 |
| 2020/0267753 A1* | 8/2020 | Adjakple | .......... | H04W 72/1226 |
| 2020/0374691 A1* | 11/2020 | Li | ......................... | H04W 12/10 |
| 2020/0374948 A1* | 11/2020 | Pan | ....................... | H04W 28/12 |

\* cited by examiner

Figure 2A

200 → [L-STF 204 | L-LTF 206 | L-SIG 208] (202) | VHT-SIG-A 210 | VHT-STF 212 | VHT-LTFs 214 | VHT-SIG-B 216 | Data 218

Figure 2B

220 → [L-STF 224 | L-LTF 226 | L-SIG 228 | RL-SIG 230 | HE-SIG-A 232] (222) | HE-SIG-B 234 | HE-STF 236 | HE-LTFs 238 | Data 240

TECHNIQUES FOR LOW LATENCY COMMUNICATIONS IN WIRELESS LOCAL AREA NETWORKS

CROSS REFERENCE

The present Application for Patent claims the benefit of U.S. Provisional Patent Application No. 62/726,912 by ASTERJADHI, et al., entitled "TECHNIQUES FOR LOW LATENCY COMMUNICATIONS IN WIRELESS LOCAL AREA NETWORKS," filed Sep. 4, 2018, assigned to the assignee hereof, and expressly incorporated by reference herein.

TECHNICAL FIELD

This disclosure relates generally to wireless communications, and more specifically, to low latency communication techniques in wireless local area networks.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (for example, time, frequency, and power). A wireless network, for example a wireless local area network (WLAN), such as a Wi-Fi (in other words, Institute of Electrical and Electronics Engineers (IEEE) 802.11) network may include access points (APs) that may communicate with one or more stations (STAs) or mobile devices. An AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL, or forward link, may refer to the communication link from the AP to the station, and the UL, or reverse link, may refer to the communication link from the station to the AP. WLANs may provide network access through a shared wireless communication medium that APs and STAs may access in accordance with a contention-based channel access scheme, such as an enhanced distributed channel access (EDCA) scheme.

Some wireless communication system deployments may provide communications for applications that have relatively stringent quality of service (QoS) targets. For example, some industrial internet of things (IIoT) applications or virtual reality (VR) applications may have a stringent target (such as 1 ms or less) for delivery of a packet from a transmitting device to a receiving device. Some channel contention schemes, however, may provide a latency that is potentially beyond the latency criteria for such applications.

SUMMARY

Various described techniques relate to improved methods, systems, or devices that support low latency communications in wireless systems. The systems, methods and devices of this disclosure each have several innovative aspects, no single one of which is solely responsible for the desirable attributes disclosed herein.

In some examples, an access point (AP) may implement a basic service set (BSS) that allows contention-based channel access over a portion of a bandwidth available to the AP. In some examples, an AP may configure a primary channel and one or more secondary channels within an available bandwidth. Communications with one or more stations (STAs) that have data traffic associated with a QoS parameter (e.g., a predetermined QoS parameter) may be provided over one or more of the secondary channels, and communications with STAs having non-low latency data traffic may be provided over only the primary channel. In some examples, a transmission from a STA on the primary channel may be discarded by an AP if such a transmission overlaps with transmissions on the one or more secondary channels, for example low latency transmissions.

A method of wireless communication at a first wireless communication device is described. The method may include receiving, by the first wireless communication device, configuration information for a contention-based channel access procedure for initiating wireless communications with a second wireless communication device, the configuration information indicating that one or more wireless communications to the second wireless communication device that are in conformance with the contention-based channel access procedure can be discarded by the second wireless communication device in favor of other wireless transmissions associated with a predetermined quality of service (QoS) parameter, performing the contention-based channel access procedure based at least in part on the configuration information, transmitting, by the first wireless communication device, a first wireless communication to the second wireless communication device during a first transmission opportunity (TxOP) responsive to the successful completion of the contention-based channel access procedure, and determining, by the first wireless communication device, that the first wireless communication is discardable by the second wireless communication device based at least in part on the predetermined QoS parameter.

An apparatus for wireless communication at a first wireless communication device is described. The apparatus may include a processor, memory in electronic communication with the processor, and instructions stored in the memory. The instructions may be executable by the processor to cause the apparatus to receive, by the first wireless communication device, configuration information for a contention-based channel access procedure for initiating wireless communications with an second wireless communication device, the configuration information indicating that one or more wireless communications to the second wireless communication device that are in conformance with the contention-based channel access procedure can be discarded by the second wireless communication device in favor of other wireless transmissions associated with a predetermined QoS parameter, perform the contention-based channel access procedure based at least in part on the configuration information, transmit, by the first wireless communication device, a first wireless communication to the second wireless communication device during a first TxOP responsive to the successful completion of the contention-based channel access procedure, and determine, by the first wireless communication device, that the first wireless communication is discardable by the second wireless communication device based at least in part on the predetermined QoS parameter.

Another apparatus for wireless communication at a first wireless communication device is described. The apparatus may include means for receiving, by the first wireless communication device, configuration information for a contention-based channel access procedure for initiating wireless communications with an second wireless communication device, the configuration information indicating that one or more wireless communications to the second wireless communication device that are in conformance with the contention-based channel access procedure can be discarded by the second wireless communication device in favor of other wireless transmissions associated with a predetermined QoS parameter, performing the contention-based channel access procedure based at least in part on the configuration information, transmitting, by the first wireless communication device, a first wireless communication to the second wireless communication device during a first TxOP responsive to the successful completion of the contention-based channel access procedure, and determining, by the first wireless communication device, that the first wireless communication is discardable by the second wireless communication device based at least in part on the predetermined QoS parameter.

A non-transitory computer-readable medium storing code for wireless communication at a first wireless communication device is described. The code may include instructions executable by a processor to receive, by the first wireless communication device, configuration information for a contention-based channel access procedure for initiating wireless communications with an second wireless communication device, the configuration information indicating that one or more wireless communications to the second wireless communication device that are in conformance with the contention-based channel access procedure can be discarded by the second wireless communication device in favor of other wireless transmissions associated with a predetermined QoS parameter, perform the contention-based channel access procedure based at least in part on the configuration information, transmit, by the first wireless communication device, a first wireless communication to the second wireless communication device during a first TxOP responsive to the successful completion of the contention-based channel access procedure, and determine, by the first wireless communication device, that the first wireless communication is discardable by the second wireless communication device based at least in part on the predetermined QoS parameter.

Some examples of the method, apparatuses, and non-transitory computer-readable medium described herein may further include operations, features, means, or instructions for adjusting a contention window backoff counter for initiating a subsequent wireless communication to the second wireless communication device based on determining that the first wireless communication has been discarded by the second wireless communication device, in which the contention window backoff counter may be maintained at or reduced from a prior contention window backoff counter used for the first wireless communication.

Some examples of the method, apparatuses, and non-transitory computer-readable medium described herein may further include operations, features, means, or instructions for determining that the first wireless communication has been discarded by the second wireless communication device based at least in part on a negative acknowledgment or negative block acknowledgment received from the second wireless communication device, a transmission addressed to a third wireless communication device received from the second wireless communication device, or both.

Some examples of the method, apparatuses, and non-transitory computer-readable medium described herein may further include operations, features, means, or instructions for receiving a trigger during the first TxOP or during a subsequent TxOP to initiate at least a retransmission of the first wireless communication to the second wireless communication device.

In some examples of the method, apparatuses, and non-transitory computer-readable medium described herein, at least a portion of the QoS service period overlaps at least a portion of the first TxOP.

In some examples of the method, apparatuses, and non-transitory computer-readable medium described herein, the second wireless communication device accesses a channel for transmitting the other wireless transmissions associated with the predetermined QoS parameter to at least one other wireless communication device.

Some examples of the method, apparatuses, and non-transitory computer-readable medium described herein may further include operations, features, means, or instructions for accessing the channel may be based on a contention-based mechanism.

Some examples of the method, apparatuses, and non-transitory computer-readable medium described herein may further include operations, features, means, or instructions for receiving a schedule of QoS service periods for data traffic associated with the predetermined QoS parameter, in which determining that the first wireless communication is discardable by the second wireless communication device is based on the schedule.

In some examples of the method, apparatuses, and non-transitory computer-readable medium described herein, the schedule of transmission periods may be received in a beacon transmission from the second wireless communication device.

In some examples of the method, apparatuses, and non-transitory computer-readable medium described herein, the determining that the first wireless communication may be discarded by the second wireless communication device may include operations, features, means, or instructions for determining that the first wireless communication at least partially overlaps with at least a portion of a first QoS service period and determining that an acknowledgment of the first wireless communication may be not received from the second wireless communication device.

Some examples of the method, apparatuses, and non-transitory computer-readable medium described herein may further include operations, features, means, or instructions for providing the second wireless communication device with a transmission end time for the first wireless communication in an L-SIG length field in a physical (PHY) header of the first wireless communication or a TxOP duration in a SIG-A field in the PHY header of the first wireless communication, in which the TxOP duration indicates an end of a duration of time that the first wireless communication device reserves for one or more wireless communications.

In some examples of the method, apparatuses, and non-transitory computer-readable medium described herein, the transmission end time may be provided in any other received portion of the first wireless communication.

In some examples of the method, apparatuses, and non-transitory computer-readable medium described herein, the predetermined QoS parameter corresponds to one or more of a low latency threshold or a service priority threshold.

In some examples of the method, apparatuses, and non-transitory computer-readable medium described herein, the predetermined QoS parameter corresponds to one or more of a low latency threshold or a service priority threshold.

A method of wireless communication at a first wireless communication device is described. The method may include determining, by the first wireless communication device, that wireless communications of data traffic associated with a predetermined QoS parameter are to be prioritized compared to other wireless communications during at least a first portion of a QoS service period, determining, by the first wireless communication device, that a second wireless communication device has initiated a first wireless communication that at least partially overlaps with the QoS service period, in which the first wireless communication is in conformance with a contention-based channel access procedure for initiating the first wireless communication, determining, by the first wireless communication device, that the first wireless communication is not associated with the predetermined QoS parameter, and discarding, by the first wireless communication device, the first wireless communication based on the determining that the first wireless communication at least partially overlaps the QoS service period and based on the determining that the first wireless communication is not associated with the predetermined QoS parameter.

An apparatus for wireless communication at a first wireless communication device is described. The apparatus may include a processor, memory in electronic communication with the processor, and instructions stored in the memory. The instructions may be executable by the processor to cause the apparatus to determine, by the first wireless communication device, that wireless communications of data traffic associated with a predetermined QoS parameter are to be prioritized compared to other wireless communications during at least a first portion of a QoS service period, determine, by the first wireless communication device, that a second wireless communication device has initiated a first wireless communication that at least partially overlaps with the QoS service period, in which the first wireless communication is in conformance with a contention-based channel access procedure for initiating the first wireless communication, determine, by the first wireless communication device, that the first wireless communication is not associated with the predetermined QoS parameter, and discard, by the first wireless communication device, the first wireless communication based on the determining that the first wireless communication at least partially overlaps the QoS service period and based on the determining that the first wireless communication is not associated with the predetermined QoS parameter.

Another apparatus for wireless communication at a first wireless communication device is described. The apparatus may include means for determining, by the first wireless communication device, that wireless communications of data traffic associated with a predetermined QoS parameter are to be prioritized compared to other wireless communications during at least a first portion of a QoS service period, determining, by the first wireless communication device, that a second wireless communication device has initiated a first wireless communication that at least partially overlaps with the QoS service period, in which the first wireless communication is in conformance with a contention-based channel access procedure for initiating the first wireless communication, determining, by the first wireless communication device, that the first wireless communication is not associated with the predetermined QoS parameter, and discarding, by the first wireless communication device, the first wireless communication based on the determining that the first wireless communication at least partially overlaps the QoS service period and based on the determining that the first wireless communication is not associated with the predetermined QoS parameter.

A non-transitory computer-readable medium storing code for wireless communication at a first wireless communication device is described. The code may include instructions executable by a processor to determine, by the first wireless communication device, that wireless communications of data traffic associated with a predetermined QoS parameter are to be prioritized compared to other wireless communications during at least a first portion of a QoS service period, determine, by the first wireless communication device, that a second wireless communication device has initiated a first wireless communication that at least partially overlaps with the QoS service period, in which the first wireless communication is in conformance with a contention-based channel access procedure for initiating the first wireless communication, determine, by the first wireless communication device, that the first wireless communication is not associated with the predetermined QoS parameter, and discard, by the first wireless communication device, the first wireless communication based on the determining that the first wireless communication at least partially overlaps the QoS service period and based on the determining that the first wireless communication is not associated with the predetermined QoS parameter.

Some examples of the method, apparatuses, and non-transitory computer-readable medium described herein may further include operations, features, means, or instructions for determining that the first wireless communication at least partially overlaps the QoS service period based on a transmission end time provided in a header of the first wireless communication.

In some examples of the method, apparatuses, and non-transitory computer-readable medium described herein, the transmission end time may be provided in an L-SIG length field in the header of the first wireless communication or in a SIG-A field in the header of the first wireless communication.

Some examples of the method, apparatuses, and non-transitory computer-readable medium described herein may further include operations, features, means, or instructions for transmitting a negative acknowledgment or negative block acknowledgment that indicates that the first wireless communication has been discarded by the first wireless communication device Some examples of the method, apparatuses, and non-transitory computer-readable medium described herein may further include operations, features, means, or instructions for transmitting configuration information to one or more wireless communication devices, the configuration information including an indication that wireless communications of the one or more wireless communication devices can be discarded by the first wireless communication device, and that a backoff counter for initiating a subsequent wireless communication from the one or more wireless communication devices can be adjusted responsive to the wireless communication being discarded.

Some examples of the method, apparatuses, and non-transitory computer-readable medium described herein may further include operations, features, means, or instructions for transmitting an indication to the second wireless communication device during the QoS service period or a subsequent TxOP to initiate a contention-free retransmission of the first wireless communication by the second wireless communication device.

In some examples of the method, apparatuses, and non-transitory computer-readable medium described herein, the indication to the second wireless communication device may be a trigger frame or a reverse direction grant provided to the second wireless communication device.

Some examples of the method, apparatuses, and non-transitory computer-readable medium described herein may further include operations, features, means, or instructions for transmitting a wireless communication having data traffic associated with the predetermined QoS parameter to a third wireless communication device during the QoS service period.

In some examples of the method, apparatuses, and non-transitory computer-readable medium described herein, the transmitting may include operations, features, means, or instructions for performing an energy detection procedure on each of a set of channels to be used for transmission of the wireless communication having data traffic associated with the predetermined QoS parameter and suppressing portions of the wireless communication having data traffic associated with the predetermined QoS parameter on at least a first channel of the set of channels responsive to a detected energy of the first channel being above a threshold value.

In some examples of the method, apparatuses, and non-transitory computer-readable medium described herein, the second wireless communication device may be associated with the first wireless communication device, and the first wireless communication device accesses a channel for transmitting a wireless communication having data traffic associated with the predetermined QoS parameter to a third wireless communication device.

Some examples of the method, apparatuses, and non-transitory computer-readable medium described herein may further include operations, features, means, or instructions for transmitting a schedule of QoS service periods for data traffic associated with the predetermined QoS parameter.

In some examples of the method, apparatuses, and non-transitory computer-readable medium described herein, the schedule of QoS service periods may be transmitted in a broadcast management frame.

A method of wireless communication at a first wireless communication device is described. The method may include identifying, by the first wireless communication device, a primary channel of a second wireless communication device, the primary channel one of a set of channels of an available bandwidth of the second wireless communication device for wireless communications, transmitting, by the first wireless communication device, a first wireless communication that indicates the first wireless communication device has data traffic associated with a predetermined QoS parameter, and receiving, by the first wireless communication device, a second wireless communication from the second wireless communication device including an indication that one or more secondary channels of the set of channels are available for wireless communications with the second wireless communication device associated with the predetermined QoS parameter.

An apparatus for wireless communication at a first wireless communication device is described. The apparatus may include a processor, memory in electronic communication with the processor, and instructions stored in the memory. The instructions may be executable by the processor to cause the apparatus to identify, by the first wireless communication device, a primary channel of an second wireless communication device, the primary channel one of a set of channels of an available bandwidth of the second wireless communication device for wireless communications, transmit, by the first wireless communication device, a first wireless communication that indicates the first wireless communication device has data traffic associated with a predetermined QoS parameter, and receive, by the first wireless communication device, a second wireless communication from the second wireless communication device including an indication that one or more secondary channels of the set of channels are available for wireless communications with the second wireless communication device associated with the predetermined QoS parameter.

Another apparatus for wireless communication at a first wireless communication device is described. The apparatus may include means for identifying, by the first wireless communication device, a primary channel of an second wireless communication device, the primary channel one of a set of channels of an available bandwidth of the second wireless communication device for wireless communications, transmitting, by the first wireless communication device, a first wireless communication that indicates the first wireless communication device has data traffic associated with a predetermined QoS parameter, and receiving, by the first wireless communication device, a second wireless communication from the second wireless communication device including an indication that one or more secondary channels of the set of channels are available for wireless communications with the second wireless communication device associated with the predetermined QoS parameter.

A non-transitory computer-readable medium storing code for wireless communication at a first wireless communication device is described. The code may include instructions executable by a processor to identify, by the first wireless communication device, a primary channel of an second wireless communication device, the primary channel one of a set of channels of an available bandwidth of the second wireless communication device for wireless communications, transmit, by the first wireless communication device, a first wireless communication that indicates the first wireless communication device has data traffic associated with a predetermined QoS parameter, and receive, by the first wireless communication device, a second wireless communication from the second wireless communication device including an indication that one or more secondary channels of the set of channels are available for wireless communications with the second wireless communication device associated with the predetermined QoS parameter.

In some examples of the method, apparatuses, and non-transitory computer-readable medium described herein, the second wireless communication further indicates that the first wireless communication device may be to exclusively use the one or more secondary channels for communications with the second wireless communication device. In some examples, the communications with the second wireless communication device may be contention-based communications or trigger based communications.

In some examples of the method, apparatuses, and non-transitory computer-readable medium described herein, the predetermined QoS parameter corresponds to one or more of a low latency threshold or a service priority threshold.

In some examples of the method, apparatuses, and non-transitory computer-readable medium described herein, the identifying further may include operations, features, means, or instructions for identifying that the available bandwidth includes a bandwidth of the primary channel and a bandwidth of the one or more secondary channels and receiving an indication that the one or more secondary channels may be disabled.

In some examples of the method, apparatuses, and non-transitory computer-readable medium described herein, the identifying further includes identifying that the bandwidth for the primary channel may be equal to a reported BSS bandwidth of the second wireless communication device.

In some examples of the method, apparatuses, and non-transitory computer-readable medium described herein, the indication includes an operation mode notification (OMN) that initiates an increase of a bandwidth to the first wireless communication device to span a bandwidth of one or more of the secondary channels.

In some examples of the method, apparatuses, and non-transitory computer-readable medium described herein, the indication includes a trigger to the first wireless communication device that indicates the first wireless communication device may be to transmit using the primary channel and one or more secondary channels.

In some examples of the method, apparatuses, and non-transitory computer-readable medium described herein, the primary channel may be a discovery channel for enhanced distributed channel access (EDCA) contention, and in which the one or more secondary channels may be unavailable for EDCA contention.

In some examples of the method, apparatuses, and non-transitory computer-readable medium described herein, at least one secondary channel of the one or more secondary channels may be a discovery channel for EDCA contention.

Some examples of the method, apparatuses, and non-transitory computer-readable medium described herein may further include operations, features, means, or instructions for maintaining independent EDCA backoff counters for each of the set of channels, maintaining an EDCA backoff counter dedicated to the primary channel and transmitting using one or more of the channels during a TxOP based on an energy detection (ED) level of the one or more of the channels being below a threshold ED value during an interframe space prior to the TxOP.

Some examples of the method, apparatuses, and non-transitory computer-readable medium described herein may further include operations, features, means, or instructions for receiving an indication from the second wireless communication device that one or more transmissions to the second wireless communication device that may be unassociated with the predetermined QoS parameter may be discarded by the second wireless communication device.

Some examples of the method, apparatuses, and non-transitory computer-readable medium described herein may further include operations, features, means, or instructions for transmitting a second transmission to the second wireless communication device on the primary channel, the second transmission being unassociated with the predetermined QoS parameter, determining that the second transmission may be discarded by the second wireless communication device and adjusting a backoff counter based on the second transmission being discarded.

Some examples of the method, apparatuses, and non-transitory computer-readable medium described herein may further include operations, features, means, or instructions for receiving a trigger during the TxOP or a subsequent TxOP to initiate a retransmission of the second transmission to the second wireless communication device.

Some examples of the method, apparatuses, and non-transitory computer-readable medium described herein may further include operations, features, means, or instructions for receiving a report of a BSS bandwidth of the second wireless communication device in a high efficiency (HE) operation information element (IE), a channel bandwidth of the primary channel equal to a reported BSS bandwidth.

A method of wireless communication at a first wireless communication device is described. The method may include identifying, by the first wireless communication device, an available bandwidth for wireless communications with one or more wireless communication devices and a channel bandwidth for each of a set of channels of the available bandwidth, in which a first channel of the set of channels is configured as a primary channel that is available for transmissions of the one or more wireless communication devices, determining, by the first wireless communication device, that a second wireless communication device is to communicate data traffic associated with a predetermined QoS parameter, and transmitting, by the first wireless communication device, a wireless communication to the second wireless communication device including an indication that one or more secondary channels of the set of channels are available for wireless communications associated with the predetermined QoS parameter.

An apparatus for wireless communication at a first wireless communication device is described. The apparatus may include a processor, memory in electronic communication with the processor, and instructions stored in the memory. The instructions may be executable by the processor to cause the apparatus to identify, by the first wireless communication device, an available bandwidth for wireless communications with one or more wireless communication devices and a channel bandwidth for each of a set of channels of the available bandwidth, in which a first channel of the set of channels is configured as a primary channel that is available for transmissions of the one or more wireless communication devices, determine, by the first wireless communication device, that a second wireless communication device is to communicate data traffic associated with a predetermined QoS parameter, and transmit, by the first wireless communication device, a wireless communication to the second wireless communication device including an indication that one or more secondary channels of the set of channels are available for wireless communications associated with the predetermined QoS parameter.

Another apparatus for wireless communication at a first wireless communication device is described. The apparatus may include means for identifying, by the first wireless communication device, an available bandwidth for wireless communications with one or more wireless communication devices and a channel bandwidth for each of a set of channels of the available bandwidth, in which a first channel of the set of channels is configured as a primary channel that is available for transmissions of the one or more wireless communication devices, determining, by the first wireless communication device, that a second wireless communication device is to communicate data traffic associated with a predetermined QoS parameter, and transmitting, by the first wireless communication device, a wireless communication to the second wireless communication device including an indication that one or more secondary channels of the set of channels are available for wireless communications associated with the predetermined QoS parameter.

A non-transitory computer-readable medium storing code for wireless communication at a first wireless communication device is described. The code may include instructions executable by a processor to identify, by the first wireless communication device, an available bandwidth for wireless communications with one or more wireless communication devices and a channel bandwidth for each of a set of channels of the available bandwidth, in which a first channel of the set of channels is configured as a primary channel that is available for transmissions of the one or more wireless communication devices, determine, by the first wireless communication device, that a second wireless communication device is to communicate data traffic associated with a predetermined QoS parameter, and transmit, by the first wireless communication device, a wireless communication to the second wireless communication device including an indication that one or more secondary channels of the set of channels are available for wireless communications associated with the predetermined QoS parameter.

In some examples of the method, apparatuses, and non-transitory computer-readable medium described herein, the wireless communication to the second wireless communication device further indicates that the second wireless communication device may be to exclusively use the one or more secondary channels for communications with the first wireless communication device. In some examples, the communications with the first wireless communication device may be contention-based communications or trigger based communications.

In some examples of the method, apparatuses, and non-transitory computer-readable medium described herein, the predetermined QoS parameter corresponds to one or more of a low latency threshold or a service priority threshold.

Some examples of the method, apparatuses, and non-transitory computer-readable medium described herein may further include operations, features, means, or instructions for reporting, by the first wireless communication device, a BSS bandwidth that includes a bandwidth of the primary channel and a bandwidth of the one or more secondary channels and transmitting, by the first wireless communication device, an indication that the one or more secondary channels may be disabled.

Some examples of the method, apparatuses, and non-transitory computer-readable medium described herein may further include operations, features, means, or instructions for reporting a reduced BSS bandwidth to the one or more wireless communication devices, the reduced BSS bandwidth corresponding to a first channel bandwidth of the primary channel.

In some examples of the method, apparatuses, and non-transitory computer-readable medium described herein, the indication includes an operation mode notification (OMN) that initiates an increase of a STA bandwidth to span a bandwidth of one or more of the secondary channels.

In some examples of the method, apparatuses, and non-transitory computer-readable medium described herein, the indication includes a trigger to the second wireless communication device that indicates the second wireless communication device may be to transmit using the primary channel and one or more secondary channels.

Some examples of the method, apparatuses, and non-transitory computer-readable medium described herein may further include operations, features, means, or instructions for transmitting an indication that the one or more secondary channels may be disallowed channels in a HE operation information element (IE).

In some examples of the method, apparatuses, and non-transitory computer-readable medium described herein, the first channel may be configured as both the primary channel and a discovery channel for EDCA contention, and in which the one or more secondary channels may be unavailable for EDCA contention.

Some examples of the method, apparatuses, and non-transitory computer-readable medium described herein may further include operations, features, means, or instructions for configuring one or more of the set of secondary channels as a discovery channel for EDCA contention to provide one or more discovery channels.

Some examples of the method, apparatuses, and non-transitory computer-readable medium described herein may further include operations, features, means, or instructions for maintaining independent EDCA backoff counters for each of a set of discovery channels, maintaining an EDCA backoff counter dedicated to the first channel, and transmitting using one or more discover channels of the set of discovery channels during a TxOP based on an energy detection (ED) level of the one or more discovery channels being below a threshold ED value during an interframe space prior to the TxOP.

Some examples of the method, apparatuses, and non-transitory computer-readable medium described herein may further include operations, features, means, or instructions for determining that a QoS service period may be configured for wireless transmissions associated with the predetermined QoS parameter, determining that a third wireless communication device may have initiated a second wireless transmission via the first channel prior to a start of the QoS service period, and that the second wireless transmission at least partially overlaps the QoS service period and discarding the second wireless transmission based on the determining that the second wireless transmission at least partially overlaps the QoS service period.

In some examples of the method, apparatuses, and non-transitory computer-readable medium described herein, the determining that the second wireless transmission at least partially overlaps the QoS service period may be based on a transmission end time provided in a header of the second wireless transmission.

Some examples of the method, apparatuses, and non-transitory computer-readable medium described herein may further include operations, features, means, or instructions for transmitting an indicator to the one or more wireless communication devices that wireless transmissions of the one or more wireless communication devices in the first channel can be discarded by the first wireless communication device, and that a backoff counter for initiating a subsequent wireless transmission from the one or more wireless communication devices may be to be adjusted responsive to a transmission being discarded.

Some examples of the method, apparatuses, and non-transitory computer-readable medium described herein may further include operations, features, means, or instructions for transmitting a trigger to the third wireless communication device during the QoS service period or a subsequent TxOP to initiate a retransmission of the second wireless transmission.

In some examples of the method, apparatuses, and non-transitory computer-readable medium described herein, the first wireless communication device may be an extremely high throughput (EHT) first wireless communication device, and in which a set of transmission streams, reception streams, or combinations thereof, may be concurrently processed at the first wireless communication device.

Some examples of the method, apparatuses, and non-transitory computer-readable medium described herein, multiple independent EDCA counters may be maintained for the set of transmission streams.

In some examples of the method, apparatuses, and non-transitory computer-readable medium described herein, a first subset of the set of transmission streams or reception streams provide data traffic associated with the predetermined QoS parameter via one or more secondary channels, and a second subset of the set of transmission streams or reception streams provide data traffic unassociated with the predetermined QoS parameter via one or more primary channels.

Some examples of the method, apparatuses, and non-transitory computer-readable medium described herein may further include operations, features, means, or instructions for synchronizing transmission slots of the set of transmission streams, reception streams, or combinations thereof to provide a common end time.

In some examples of the method, apparatuses, and non-transitory computer-readable medium described herein, a BSS bandwidth of the first wireless communication device may be indicated in a HE operation IE that may be transmitted to the one or more wireless communication devices, the channel bandwidth of the primary channel equal to a reported BSS bandwidth.

A method of wireless communication at a first wireless communication device is described. The method may include receiving, by the first wireless communication device, configuration information for a contention-based channel access procedure for initiating wireless communications with a second wireless communication device, the configuration information indicating that channel access for one or more wireless communications to the second wireless communication device that are in conformance with the contention-based channel access procedure can be taken over by the second wireless communication device in favor of other wireless transmissions associated with a predetermined QoS parameter, transmitting, by the first wireless communication device, a request to send (RTS) indication to the second wireless communication device responsive to a successful contention-based channel access procedure, receiving, by the first wireless communication device, a clear to send (CTS) indication from the second wireless communication device, and determining, by the first wireless communication device based on the CTS indication, that the second wireless communication device has taken over channel access for at least a portion of the reserved transmit opportunity.

An apparatus for wireless communication at a first wireless communication device is described. The apparatus may include a processor, memory in electronic communication with the processor, and instructions stored in the memory. The instructions may be executable by the processor to cause the apparatus to receive, by the first wireless communication device, configuration information for a contention-based channel access procedure for initiating wireless communications with a second wireless communication device, the configuration information indicating that channel access for one or more wireless communications to the second wireless communication device that are in conformance with the contention-based channel access procedure can be taken over by the second wireless communication device in favor of other wireless transmissions associated with a predetermined QoS parameter, transmit, by the first wireless communication device, a RTS indication to the second wireless communication device responsive to a successful contention-based channel access procedure, receive, by the first wireless communication device, a CTS indication from the second wireless communication device, and determine, by the first wireless communication device based on the CTS indication, that the second wireless communication device has taken over channel access for at least a portion of the reserved transmit opportunity.

Another apparatus for wireless communication at a first wireless communication device is described. The apparatus may include means for receiving, by the first wireless communication device, configuration information for a contention-based channel access procedure for initiating wireless communications with a second wireless communication device, the configuration information indicating that channel access for one or more wireless communications to the second wireless communication device that are in conformance with the contention-based channel access procedure can be taken over by the second wireless communication device in favor of other wireless transmissions associated with a predetermined QoS parameter, transmitting, by the first wireless communication device, a RTS indication to the second wireless communication device responsive to a successful contention-based channel access procedure, receiving, by the first wireless communication device, a CTS indication from the second wireless communication device, and determining, by the first wireless communication device based on the CTS indication, that the second wireless communication device has taken over channel access for at least a portion of the reserved transmit opportunity.

A non-transitory computer-readable medium storing code for wireless communication at a first wireless communication device is described. The code may include instructions executable by a processor to receive, by the first wireless communication device, configuration information for a contention-based channel access procedure for initiating wireless communications with a second wireless communication device, the configuration information indicating that channel access for one or more wireless communications to the second wireless communication device that are in conformance with the contention-based channel access procedure can be taken over by the second wireless communication device in favor of other wireless transmissions associated with a predetermined QoS parameter, transmit, by the first wireless communication device, a RTS signal to the second wireless communication device responsive to a successful contention-based channel access procedure, receive, by the first wireless communication device, a CTS signal from the second wireless communication device, and determine, by the first wireless communication device based on the CTS signal, that the second wireless communication device has taken over channel access for at least a portion of the reserved transmit opportunity.

In some examples of the method, apparatuses, and non-transitory computer-readable medium described herein, the determining may be based on a receiver address (RA) provided with the CTS signal being a RA of the second wireless communication device.

Some examples of the method, apparatuses, and non-transitory computer-readable medium described herein may further include operations, features, means, or instructions for adjusting a contention window backoff counter for initiating a subsequent wireless communication to the second wireless communication device based on determining that the second wireless communication device may have taken over channel access, in which the contention window backoff counter may be maintained at or reduced from a prior contention window backoff counter used for transmitting the RTS indication.

A method of wireless communication at a first wireless communication device is described. The method may include transmitting, by the first wireless communication device, configuration information for a contention-based channel access procedure for initiating wireless communications with a second wireless communication device, the configuration information indicating that channel access for one or more wireless communications to the first wireless communication device that are in conformance with the contention-based channel access procedure can be taken over by the first wireless communication device in favor of other wireless transmissions associated with a predetermined QoS parameter, receiving, by the first wireless communication device, a RTS signal from the second wireless communication device responsive to a successful contention-based channel access procedure, and transmitting, by the first wireless communication device, a CTS signal to the second wireless communication device.

An apparatus for wireless communication at a first wireless communication device is described. The apparatus may include a processor, memory in electronic communication with the processor, and instructions stored in the memory. The instructions may be executable by the processor to cause the apparatus to transmit configuration information for a contention-based channel access procedure for initiating wireless communications with a second wireless communication device, the configuration information indicating that channel access for one or more wireless communications to the first wireless communication device that are in conformance with the contention-based channel access procedure can be taken over by the first wireless communication device in favor of other wireless transmissions associated with a predetermined QoS parameter, receive a RTS signal from the second wireless communication device responsive to a successful contention-based channel access procedure, and transmit a CTS signal to the second wireless communication device.

Another apparatus for wireless communication at a first wireless communication device is described. The apparatus may include means for transmitting, by the first wireless communication device, configuration information for a contention-based channel access procedure for initiating wireless communications with a second wireless communication device, the configuration information indicating that channel access for one or more wireless communications to the first wireless communication device that are in conformance with the contention-based channel access procedure can be taken over by the first wireless communication device in favor of other wireless transmissions associated with a predetermined QoS parameter, receiving, by the first wireless communication device, a RTS signal from the second wireless communication device responsive to a successful contention-based channel access procedure, and transmitting, by the first wireless communication device, a CTS signal to the second wireless communication device.

A non-transitory computer-readable medium storing code for wireless communication at a first wireless communication device is described. The code may include instructions executable by a processor to transmit configuration information for a contention-based channel access procedure for initiating wireless communications with a second wireless communication device, the configuration information indicating that channel access for one or more wireless communications to the first wireless communication device that are in conformance with the contention-based channel access procedure can be taken over by the first wireless communication device in favor of other wireless transmissions associated with a predetermined QoS parameter, receive a RTS signal from the second wireless communication device responsive to a successful contention-based channel access procedure, and transmit a CTS signal to the second wireless communication device.

In some examples of the method, apparatuses, and non-transitory computer-readable medium described herein, the CTS signal includes an RA of the first wireless communication device or of another wireless communication device.

Some examples of the method, apparatuses, and non-transitory computer-readable medium described herein may further include operations, features, means, or instructions for transmitting an indication to adjust a contention window backoff counter for initiating a subsequent wireless communication to the first wireless communication device.

Details of one or more implementations of the subject matter described in this disclosure are set forth in the accompanying drawings and the description below. Other features, aspects, and advantages will become apparent from the description, the drawings and the claims. Note that the relative dimensions of the following Figures may not be drawn to scale.

BRIEF DESCRIPTION OF THE DRAWINGS

FIG. 2A shows an example frame usable for communications between an access point (AP) and a number of stations (STAs) according to some implementations.

FIG. 2B shows an example frame usable for communications between an AP and a number of STAs according to some implementations.

Like reference numbers and designations in the various drawings indicate like elements.

DETAILED DESCRIPTION

Figure 1:
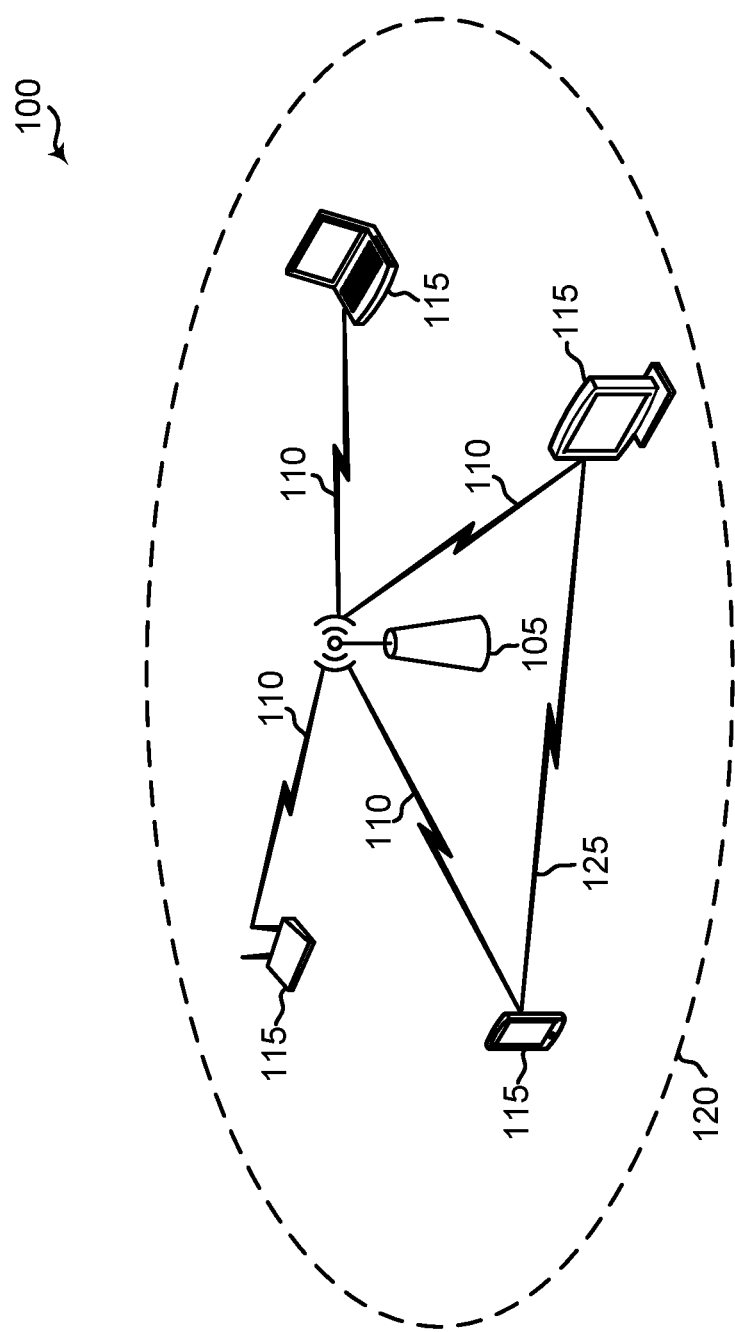
FIG. 1 shows a block diagram of an example wireless communication system according to some implementations.

The following description is directed to some implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to any of the IEEE 802.11 standards, or the Bluetooth® standards. The described implementations also can be implemented in any device, system or network that is capable of transmitting and receiving RF signals according to any of the following technologies or techniques: code division multiple access (CDMA), frequency division multiple access (FDMA), orthogonal frequency division multiple access (OFDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Various implementations relate generally to providing low latency communications in a wireless communication system. Some implementations more specifically relate to configuring an access point (AP) and one or more stations (STAs) with one or more channels for non-low latency communications, and one or more other channels for low latency communications. Particular implementations of the subject matter described in this disclosure can be implemented to realize one or more of the following potential advantages. In some implementations, the described techniques can be used to provide wireless communication system access to both stations (STAs) having low latency traffic (also referred to herein as "low latency STAs") and STAs not having low latency traffic (also referred to herein as "non-low latency STAs") through an AP. Such a deployment may allow for contention-based channel access for any STA and also provide reliable low latency resources for data traffic having relatively stringent latency requirements. Further, an AP in some implementations may provide access to STAs that are associated with the AP as well as to non-associated STAs.

In some examples, an available bandwidth of an AP may have multiple channels, which include a primary channel and one or more secondary channels. A STA may provide an indication to the AP, such as via the primary channel, that the STA has data traffic associated with a quality of service (QoS) parameter, such as a QoS threshold. Such a QoS threshold may be, for example, a latency below which communications of associated data traffic are to be delivered to a receiving device. The AP may provide an indication to the STA that one or more of the secondary channels are available for communications between the AP and the STA. For example, a STA may be associated with a piece of equipment in an industrial internet of things (IIoT) network which may have a requirement that the STA deliver a data packet within one millisecond of arrival of the data packet at the STA. Such a STA may use the one or more secondary channels for communications with the AP and provide the data packet in accordance with the latency requirements. Further, in some implementations, the AP may configure one or more discovery channels that STAs may use to send probe requests and initiate an associated procedure to become associated with the AP. Such a discovery channel may be configured on a same channel as the primary channel, or on a different channel.

In some examples, the AP may report a basic service set (BSS) bandwidth that corresponds to a bandwidth of the primary channel. For example, if the primary channel has a bandwidth of 20 MHz, and three secondary channels each have a 20 MHz bandwidth, the AP may report the 20 MHz primary channel bandwidth as the BSS bandwidth. In such examples, STAs seeking access or initiating transmissions with the AP may transmit using the 20 MHz primary channel, leaving the secondary channels available to the AP for low latency communications. A low latency STA may provide an indication that data traffic of the STA includes low latency data that has a latency target that is below a latency threshold. The AP, responsive to receiving the indication that the STA has low latency data to transmit, may increase the bandwidth for that STA to span one or more of the secondary channels. In other examples, the AP may report that the BSS bandwidth spans the entire bandwidth of the primary and secondary channels, and the AP may disable secondary access to the secondary channels. In such examples, the AP may enable secondary access to one or more of the secondary channels to STAs having low latency traffic.

In some examples, an AP may discard transmissions over the primary channel if such transmissions overlap with low latency communications. For example, periodic low latency transmission periods may be scheduled for the AP and one or more low latency STAs. A non-low latency STA may initiate a transmission over the primary channel prior to a low latency transmission period. The AP may determine that the transmission overlaps with a low latency transmission period and discard the transmission in favor of the low latency communications. For example, a STA may transmit a header that indicates a transmission end time, such as an L-SIG length field in a PHY header, and the AP may discard the transmission if the end time occurs within a low latency transmission period. Such discarding may allow the AP to transmit and receive low latency communications via the secondary channels, rather than the non-low latency communications on the primary channel. In some examples, the AP may explicitly declare that communications on the primary channel may be discarded, and a STA that has a wireless communication that is discarded may set a backoff timer to have a reduced time before attempting a retransmission relative to situations in which a communication was successfully received or in which the primary channel was busy during a contention-based access procedure. In some examples, the AP may transmit a negative acknowledgment or negative block acknowledgment that indicates that a transmission from one or more STAs has been discarded by the AP, which may be used by the one or more STAs to determine that the transmission has been discarded.

In some examples, an AP may take over channel access from an associated STA having lower priority transmissions in favor of transmissions for low latency communications. In some examples, an AP may receive a request to send (RTS) signal in which the STA requests to send a data transmission. In some examples, the RTS signal may be transmitted based on the STA performing a contention procedure and gaining channel access. The data transmission of the STA may be associated with a QoS that is not associated with a QoS parameter (e.g., a predetermined QoS parameter) such as a QoS threshold (for example, a latency target may be above a latency threshold). The AP may, in some examples, determine that the data transmission associated with the RTS signal would overlap with a QoS service period, and may determine to take over the channel from the STA. In such examples, the AP may transmit a clear to send (CTS) signal that may indicate that the AP has taken over channel access for at least a portion of the transmit opportunity that was reserved by the STA. In some examples, the CTS may include a receiver address (RA), and if the RA matches the RA of the AP, it may indicate that the AP has taken over channel access for at least a portion of the reserved transmit opportunity. In some other examples the RA in the CTS may match the RA of another STA (for example, a low latency STA) that the AP has identified for delivery of downlink data following the CTS frame. In some examples, the STA may adjust a contention window backoff counter for initiating a subsequent wireless communication to be the same as or lower than a prior contention window backoff counter used for transmitting the RTS signal.

FIG. 1 shows a block diagram of an example wireless communication system 100. According to some aspects, the wireless communication system 100 can be an example of a wireless local area network (WLAN) (and will hereinafter be referred to as WLAN 100). For example, the WLAN 100 can be a network implementing at least one of the IEEE 802.11 family of standards. The WLAN 100 may include numerous wireless devices such as an AP 105 and multiple associated STAs 115. Each of the STAs 115 also may be referred to as a mobile station (MS), a mobile device, a mobile handset, a wireless handset, an access terminal (AT), a user equipment (UE), a subscriber station (SS), or a subscriber unit, among other possibilities. The STAs 115 may represent various devices such as mobile phones, personal digital assistant (PDAs), other handheld devices, netbooks, notebook computers, tablet computers, laptops, display devices (for example, TVs, computer monitors, navigation systems, among others), printers, key fobs (for example, for passive keyless entry and start (PKES) systems), among other possibilities.

Each of the STAs 115 may associate and communicate with the AP 105 via a communication link 110. The various STAs 115 in the network are able to communicate with one another through the AP 105. A single AP 105 and an associated set of STAs 115 may be referred to as a basic service set (BSS). FIG. 1 additionally shows an example coverage area 120 of the AP 105, which may represent a basic service area (BSA) of the WLAN 100. While only one AP 105 is shown, the WLAN 100 can include multiple APs 105. An extended service set (ESS) may include a set of connected BSSs. An extended network station associated with the WLAN 100 may be connected to a wired or wireless distribution system that may allow multiple APs 105 to be connected in such an ESS. As such, a STA 115 can be covered by more than one AP 105 and can associate with different APs 105 at different times for different transmissions.

STAs 115 may function and communicate (via the respective communication links 110) according to the IEEE 802.11 family of standards and amendments including, but not limited to, 802.11a, 802.11b, 802.11g, 802.11n, 802.11ac, 802.11ad, 802.11ah, 802.11ay, 802.11ax, 802.11az, and 802.11ba. These standards define the WLAN radio and baseband protocols for the PHY and medium access control (MAC) layers. The wireless devices in the WLAN 100 may communicate over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. The unlicensed spectrum may also include other frequency bands, such as the emerging 6 GHz band. The wireless devices in the WLAN 100 also can be configured to communicate over other frequency bands such as shared licensed frequency bands, in which multiple operators may have a license to operate in the same or overlapping frequency band or bands.

In some examples, STAs 115 may form networks without APs 105 or other equipment other than the STAs 115 themselves. One example of such a network is an ad hoc network (or wireless ad hoc network). Ad hoc networks may alternatively be referred to as mesh networks or peer-to-peer (P2P) connections. In some examples, ad hoc networks may be implemented within a larger wireless network such as the WLAN 100. In such implementations, while the STAs 115 may be capable of communicating with each other through the AP 105 using communication links 110, STAs 115 also can communicate directly with each other via direct wireless communication links 125. Additionally, two STAs 115 may communicate via a direct communication link 125 regardless of whether both STAs 115 are associated with and served by the same AP 105. In such an ad hoc system, one or more of the STAs 115 may assume the role filled by the AP 105 in a BSS. Such a STA 115 may be referred to as a group owner (GO) and may coordinate transmissions within the ad hoc network. Examples of direct wireless communication links 125 include Wi-Fi Direct connections, connections established by using a Wi-Fi Tunneled Direct Link Setup (TDLS) link, and other peer-to-peer (P2P) group connections.

Some types of STAs 115 may provide for automated communication. Automated wireless devices may include those implementing internet-of-things (IoT) communication, Machine-to-Machine (M2M) communication, or machine type communication (MTC). IoT, M2M or MTC may refer to data communication technologies that allow devices to communicate without human intervention. For example, IoT, M2M or MTC may refer to communications from STAs 115 that integrate sensors or meters to measure or capture information and relay that information to a central server or application program that can make use of the information or present the information to humans interacting with the program or application.

Some of STAs 115 may be MTC devices, such as MTC devices designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

WLAN 100 may support beamformed transmissions. As an example, AP 105 may use multiple antennas or antenna arrays to conduct beamforming operations for directional communications with a STA 115. Beamforming (which may also be referred to as spatial filtering or directional transmission) is a signal processing technique that may be used at a transmitter (for example, AP 105) to shape or steer an overall antenna beam in the direction of a target receiver (for example, a STA 115). Beamforming may be achieved by combining elements in an antenna array in such a way that transmitted signals at particular angles experience constructive interference while others experience destructive interference. In some examples, the ways in which the elements of the antenna array are combined at the transmitter may depend on channel state information (CSI) associated with the channels over which the AP 105 may communicate with the STA 115. That is, based on this CSI, the AP 105 may appropriately weight the transmissions from each antenna (for example, or antenna port) such that the desired beamforming effects are achieved. In some examples, these weights may be determined before beamforming can be employed. For example, the transmitter (for example, the AP 105) may transmit one or more sounding packets to the receiver in order to determine CSI.

WLAN 100 may further support multiple-input, multiple-output (MIMO) wireless systems. Such systems may use a transmission scheme between a transmitter (for example, AP 105) and a receiver (for example, a STA 115), in which both transmitter and receiver are equipped with multiple antennas. For example, AP 105 may have an antenna array with a number of rows and columns of antenna ports that the AP 105 may use for beamforming in its communication with a STA 115. Signals may be transmitted multiple times in different directions (for example, each transmission may be beamformed differently). The receiver (for example, STA 115) may try multiple beams (for example, antenna subarrays) while receiving the signals.

WLAN protocol data units (PDUs) may be transmitted over a radio frequency spectrum band, which in some examples may include multiple sub-bands or frequency channels. In some examples, the radio frequency spectrum band may have a bandwidth of 80 MHz, and each of the sub-bands or channels may have a bandwidth of 20 MHz. Transmissions to and from STAs 115 and APs 105 typically include control information within a header that is transmitted prior to data transmissions. The information provided in a header is used by a receiving device to decode the subsequent data. A legacy WLAN preamble may include legacy short training field (STF) (L-STF) information, legacy LTF (L-LTF) information, and legacy signaling (L-SIG) information. The legacy preamble may be used for packet detection, automatic gain control and channel estimation, among other uses. The legacy preamble may also be used to maintain compatibility with legacy devices.

In some examples, AP 105 may implement a low latency BSS that allows contention-based channel access over a portion of a bandwidth available to the AP 105. For example, AP 105 may configure a primary channel and one or more secondary channels within an available bandwidth, such as a 20 MHz primary channel and three 20 MHz secondary channels in an 80 MHz total bandwidth. In other examples, higher total bandwidth may be available, and the AP 105 may configure multiple sets of primary channels and secondary channels. One or more STAs 115 may have low latency data traffic, that is associated with a QoS parameter (e.g., a QoS threshold), and may provide an indication to the AP 105 (such as during association with the AP 105, or in a management frame after the AP 105 and STA 115 are associated) that low latency data traffic is to be communicated. The AP 105 may then communicate such low latency data traffic on the secondary channels, while providing non-low latency communications on the primary channel. In some examples, a transmission from a STA 115 on the primary channel may be discarded by an AP 105 if such a transmission overlaps with low latency transmissions on the one or more secondary channels.

FIG. 2A shows an example frame 200 usable for communications between an AP and each of a number of stations identified by the AP. For example, the frame 200 can be formatted as a very high throughput (VHT) frame in accordance with the IEEE 802.11ac amendment to the IEEE 802.11 set of standards. The frame 200 includes a legacy preamble portion 202 that includes a legacy short training field (L-STF) 204, a legacy long training field (L-LTF) 206, and a legacy signaling field (L-SIG) 208. The frame 200 further includes a non-legacy preamble portion that includes a first very high throughput (VHT) signaling field (VHT-SIG-A) 210, a VHT short training field (VHT-STF) 212, a number of VHT long training fields (VHT-LTFs) 214 and a second VHT signaling field (VHT-SIG-B) 216. The frame 200 also can include a payload or data portion 218 after the preamble. The data portion 218 can include medium access control (MAC) protocol data units (MPDUs), for example, in the form of an aggregated MPDU (AMPDU).

The frame 200 may be transmitted over a radio frequency spectrum band, which may include a plurality of sub-bands. For example, the radio frequency spectrum band may have a bandwidth of 80 MHz, and each of the sub-bands may have a bandwidth of 20 MHz. In some examples the sub-bands may be associated with a primary channel and one or more secondary channels. When the radio frequency spectrum band includes a plurality of sub-bands, the L-STF, L-LTF, and L-SIG fields 204, 206 and 208, respectively, may be duplicated and transmitted in each of the plurality of sub-bands. The information in the VHT-SIG-A field 210 is also duplicated and transmitted in each sub-band.

The VHT-SIG-A field 210 may indicate to a station that the frame 200 is an IEEE 802.11ac frame. The VHT-SIG-A field 210 also may include VHT WLAN signaling information usable by stations other than the number of stations that are identified to receive downlink communications in the frame 200. The VHT-SIG-A field 210 also includes information usable by the identified number of stations to decode the VHT-SIG-B field 216. The VHT-SIG-B field 216 may include VHT WLAN signaling information usable by the number of stations identified to receive downlink communications in the frame 200. More specifically, the VHT-SIG-B field 216 may include information usable by the number of stations to decode data received in the data portion 218. The VHT-SIG-B field 216 may be encoded separately from the VHT-SIG-A field 210. The number of VHT-LTFs 214 depends on the number of transmitted streams.

FIG. 2B shows an example frame 220 usable for communications between an AP and each of a number of stations identified by the AP. For example, the frame 220 can be formatted as a high efficiency (HE) frame in accordance with the IEEE 802.11ax amendment to the IEEE 802.11 set of standards. The frame 220 includes a legacy preamble portion 222 that includes a legacy short training field (L-STF) 224, a legacy long training field (L-LTF) 226, and a legacy signaling field (L-SIG) 228. The frame 220 further includes a non-legacy preamble portion that includes a repeated legacy signaling field (RL-SIG) 230, a first high efficiency signaling field (HE-SIG-A) 232, a second high efficiency signaling field (HE-SIG-B) 234, a high efficiency short training field (HE-STF) 236 and a number of high efficiency long training fields (HE-LTFs) 238. The frame 220 also can include a payload or data portion 240 after the preamble. The data portion 240 can include medium access control (MAC) protocol data units (MPDUs), for example, in the form of an aggregated MPDU (AMPDU).

The frame 220 may be transmitted over a radio frequency spectrum band, which may include a plurality of sub-bands. For example, the radio frequency spectrum band may have a bandwidth of 80 MHz, and each of the sub-bands may have a bandwidth of 20 MHz. In some examples different sub-bands may be associated with a primary channel and one or more secondary channels. When the radio frequency spectrum band includes a plurality of sub-bands, the L-STF, L-LTF, and L-SIG fields 224, 226 and 228, respectively, may be duplicated and transmitted in each of the plurality of sub-bands. The information in the RL-SIG field 230 and the HE-SIG-A field 232 is also duplicated and transmitted in each sub-band as shown in FIG. 2B.

The RL-SIG field 230 may indicate to a station that the frame 220 is an IEEE 802.11ax frame. The HE-SIG-A field 232 may include high efficiency WLAN signaling information usable by stations other than the number of stations that are identified to receive downlink communications in the frame 220. The HE-SIG-A field 232 may also include information usable by the identified number of stations to decode the HE-SIG-B field 234. The HE-SIG-B field 234 may include high efficiency WLAN signaling information usable by the number of stations identified to receive downlink communications in the frame 220. More specifically, the HE-SIG-B field 234 may include information usable by the number of stations to decode data received in the data portion 240. The HE-SIG-B field 234 may be encoded separately from the HE-SIG-A field 232.

HE WLAN (HEW) preambles can be used to schedule multiple devices, such as STAs 115, for multi-user simultaneous transmissions (for example, using multi-user orthogonal frequency division multiple access (MU-OFDMA) or multi-user multiple-input, multiple-output (MU-MIMO) techniques). A HEW signaling field may be used to signal a resource allocation pattern to multiple receiving STAs 115. The HEW signaling field can include a common user field that is decodable by multiple STAs 115, as well as a resource allocation field. The resource allocation field can indicate resource unit distributions to multiple STAs 115 and indicate which resource units in a resource unit distribution correspond to MU-MIMO transmissions and which resource units correspond to OFDMA transmissions. The HEW signaling field also can include, subsequent to the common user field, dedicated station-specific signaling fields that are assigned to particular STAs 115 and used to schedule resources and to indicate the scheduling to other WLAN devices.

In some examples, aspects of transmissions may vary based on a distance between a transmitter (for example, AP 105) and a receiver (for example, STA 115). WLAN 100 may otherwise generally benefit from AP 105 having information regarding the location of the various STAs 115 within coverage area 120. In some examples, relevant distances may be computed using round-trip time (RTT)-based ranging procedures. As an example, WLAN 100 may offer such functionality that produces accuracy on the order of one meter (or even centimeter-level accuracy). The same (or similar) techniques employed in WLAN 100 may be applied across other radio access technologies (RATs). For example, such RTT-based ranging functionality may be employed in developing "relative geofencing" applications (in other words, applications in which there is a geofence relative to an object of interest such as a mobile device, a car, a person, among other examples). Various such examples are considered in accordance with aspects of the present disclosure. For example, car keys may employ RTT estimation for PKES systems. RTT-based geofences around an adult may monitor the position of a child within the geofence. Additionally, drone-to-drone and car-to-car RTT functionality may help prevent collisions.

Figure 3:
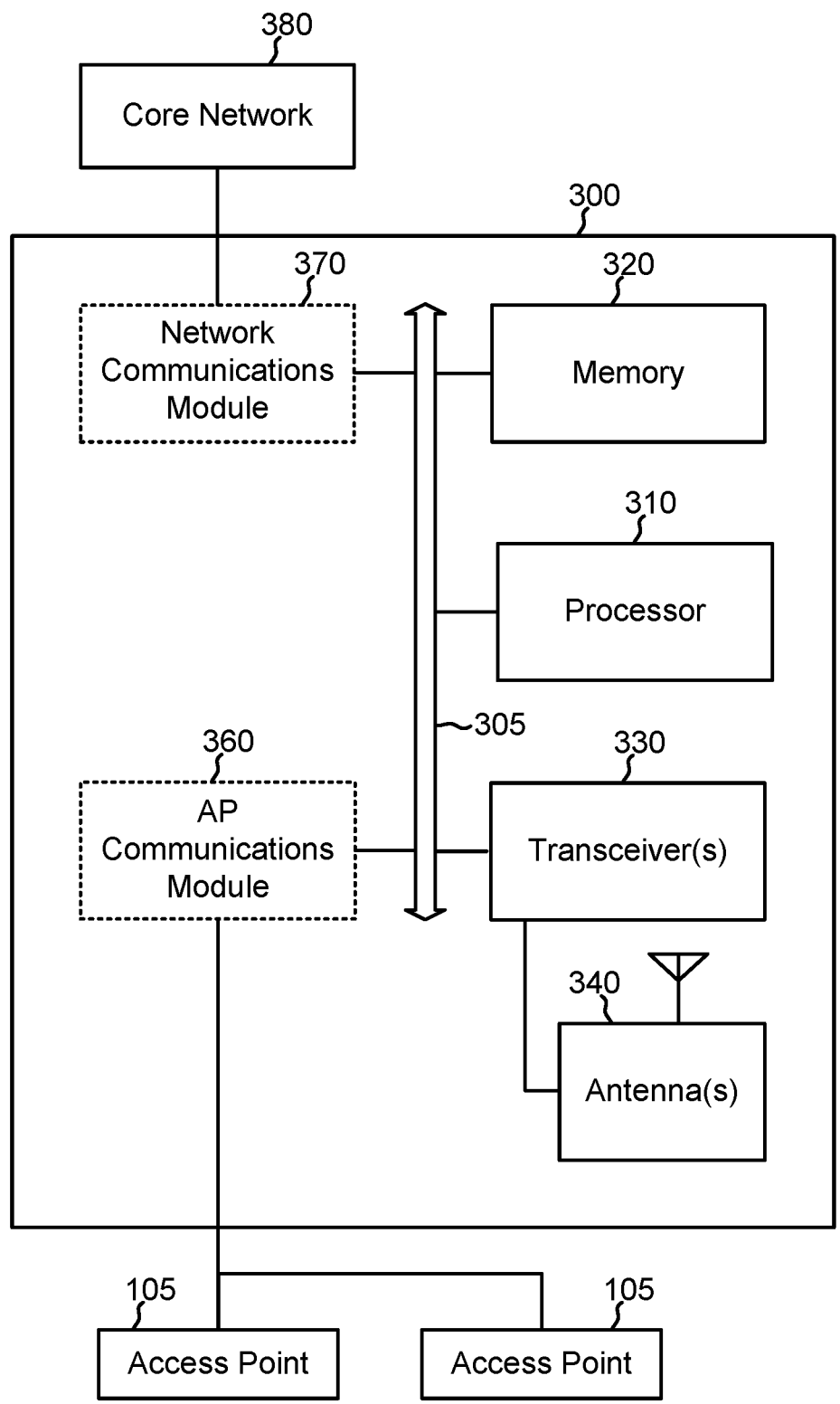
FIG. 3 shows a block diagram of an example AP for use in wireless communication according to some implementations.

FIG. 3 shows a block diagram of an example AP 300 for use in wireless communication. For example, the AP 300 may be an example of aspects of the AP 105 described with reference to FIG. 1. The AP 300 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The AP 300 includes a processor 310, a memory 320, at least one transceiver 330 and at least one antenna 340. In some implementations, the AP 300 also includes one or both of an AP communications module 360 and a network communications module 370. Each of the components (or "modules") described with reference to FIG. 3 can communicate with one another, directly or indirectly, over at least one bus 305.

The memory 320 can include random access memory (RAM) and read-only memory (ROM). The memory 320 also can store processor- or computer-executable software code 325 containing instructions that, when executed by the processor 310, cause the processor to perform various functions described herein for wireless communication, including generation and transmission of a downlink frame and reception of an uplink frame.

The processor 310 can include an intelligent hardware device such as, for example, a central processing unit (CPU), a microcontroller, an application-specific integrated circuit (ASIC), or a programmable logic device (PLD) such as a field programmable gate array (FPGA), among other possibilities. The processor 310 processes information received through the transceiver 330, the AP communications module 360, and the network communications module 370. The processor 310 also can process information to be sent to the transceiver 330 for transmission through the antenna 340, information to be sent to the AP communications module 360, and information to be sent to the network communications module 370. The processor 310 can generally be configured to perform various operations related to generating and transmitting a downlink frame and receiving an uplink frame.

The transceiver 330 can include a modem to modulate packets and provide the modulated packets to the antenna 340 for transmission, as well as to demodulate packets received from the antenna 340. The transceiver 330 can be implemented as at least one radio frequency (RF) transmitter and at least one separate RF receiver. The transceiver 330 can communicate bi-directionally, via the antenna 340, with at least one STA 115 as, for example, shown in FIG. 1. Although only one transceiver 330 and one antenna 340 are shown in FIG. 3, the AP 300 can typically include multiple transceivers 330 and antennas 340. For example, in some AP implementations, the AP 300 can include multiple transmit antennas (each with a corresponding transmit chain) and multiple receive antennas (each with a corresponding receive chain). The AP 300 may communicate with a core network 380 through the network communications module 370. The system also may communicate with other APs, such as APs 105, using the AP communications module 360.

As described above, various implementations relate generally to providing low latency communications between AP 300 and one or more STAs. In some implementations, AP 300 may use a first portion of an AP bandwidth for low latency communications, and a second portion of the AP bandwidth for non-low latency communications. For example, AP 300 may configure a primary channel in a first sub-band of the AP bandwidth, may configure a first secondary channel in a second sub-band of the AP bandwidth, and may configure one or more other secondary channels in other sub-bands of the AP bandwidth. In some examples, the AP 300 may configure multiple primary channels. Further, in some implementations, AP 300 may configure one or more discovery channels, which may be configured on same channels as the primary channels, or on different channels. The AP 300 may identify one or more STAs that are low latency STAs and may provide low latency communications with the low latency STAs using the secondary channels, while providing non-low latency communications using the primary channel. In some implementations, AP 300 may discard transmissions received on the primary channel in the event such transmissions overlap with low latency communications.

Figure 4:
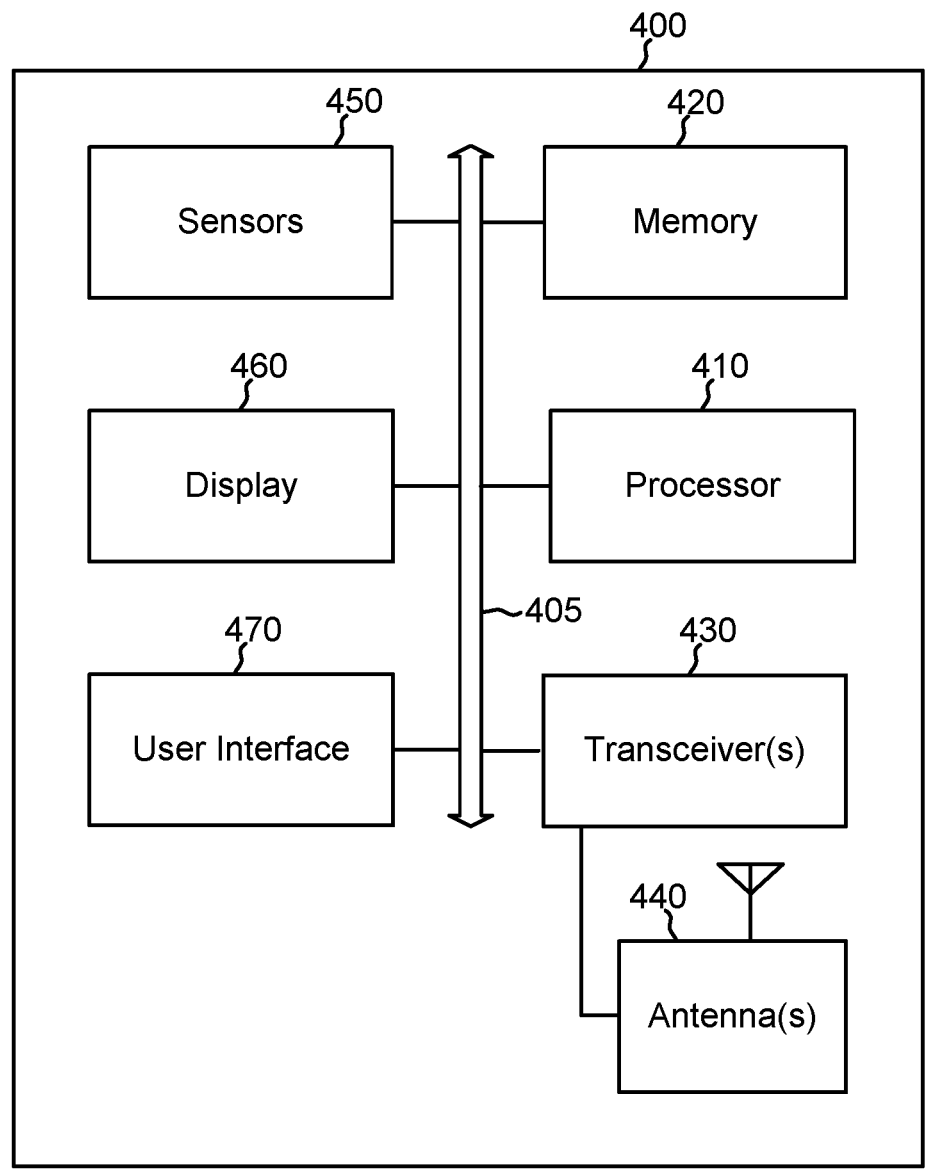
FIG. 4 shows a block diagram of an example STA for use in wireless communication according to some implementations.

FIG. 4 shows a block diagram of an example wireless STA 400 for use in wireless communication. For example, the STA 400 may be an example of aspects of the STA 115 described with reference to FIG. 1. The STA 400 can be configured to send and receive WLAN frames (also referred to herein as transmissions or communications) conforming to an IEEE 802.11 standard (such as the 802.11ac or 802.11ax amendments to the 802.11 family of standards), as well as to encode and decode such frames. The STA 400 includes a processor 410, a memory 420, at least one transceiver 430 and at least one antenna 440. In some implementations, the STA 400 additionally includes one or more of sensors 450, a display 460 and a user interface (UI) 470 (such as a touchscreen or keypad). Each of the components (or "modules") described with reference to FIG. 4 can communicate with one another, directly or indirectly, over at least one bus 405.

The memory 420 can include RAM and ROM. The memory 420 also can store processor- or computer-executable software code 425 containing instructions that, when executed, cause the processor 410 to perform various functions described herein for wireless communication, including reception of a downlink frame and generation and transmission of an uplink frame.

The processor 410 includes an intelligent hardware device such as, for example, a CPU, a microcontroller, an ASIC or a PLD such as an FPGA, among other possibilities. The processor 410 processes information received through the transceiver 430 as well as information to be sent to the transceiver 430 for transmission through the antenna 440. The processor 410 can be configured to perform various operations related to receiving a downlink frame and generating and transmitting an uplink frame.

The transceiver 430 can include a modem to modulate packets and provide the modulated packets to the antenna 440 for transmission, as well as to demodulate packets received from the antenna 440. The transceiver 430 can be implemented as at least one RF transmitter and at least one separate RF receiver. The transceiver 430 can communicate bi-directionally, via the antenna 440, with at least one AP 105 as, for example, shown in FIG. 1. Although only one transceiver 430 and one antenna 440 are shown in FIG. 4, the STA 400 can include two or more antennas. For example, in some STA implementations, the STA 400 can include multiple transmit antennas (each with a corresponding transmit chain) and multiple receive antennas (each with a corresponding receive chain).

In various implementations, as described above, STA 400 may communicate with an AP using one or more sub-bands of an available AP bandwidth. In some examples, STA 400 may communicate with the AP using a primary channel and may indicate to the AP that data traffic of the STA is associated with a QoS parameter. The STA 400 may in such examples receive an indication from the AP that one or more secondary channels are available for communications, which the STA 400 may then use for communicating low latency data. In some implementations, STA 400 may transmit non-low latency data via a primary channel, and the AP may discard such a transmission. In some examples, the STA 400 may adjust a backoff timer for initiating a retransmission based on the initial transmission being discarded. For example, the STA 400 may adjust the backoff timer to attempt the retransmission sooner than in examples in which the transmission was successful or in which a contention-based access procedure indicated that the primary channel was occupied by another transmitter.

Figure 5A:
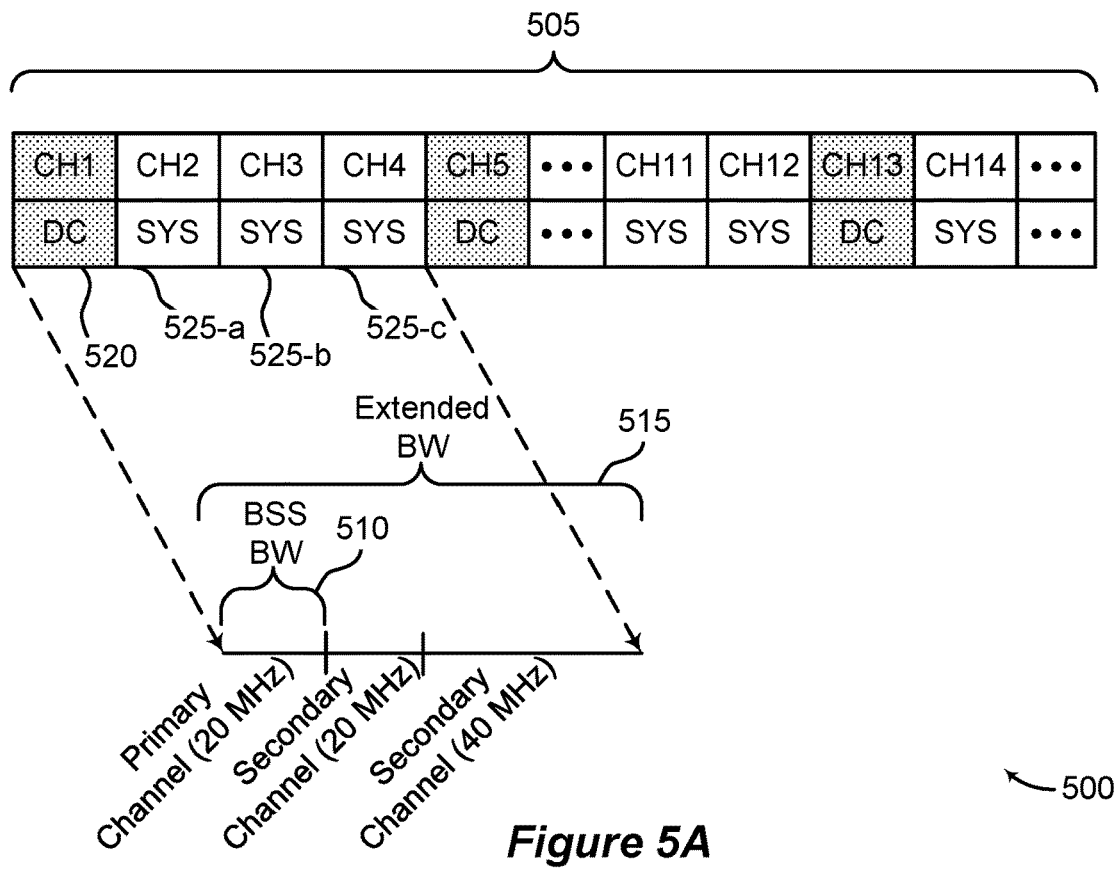
FIG. 5A shows an example of wireless channels that are configured for low latency wireless communication according to some implementations.

FIG. 5A shows an example of wireless channels 500 that are configured for low latency wireless communication according to some implementations. As indicated above, in some implementations an AP, such as an AP 105 of FIG. 1 or AP 300 of FIG. 3, may configure a number of channels within a bandwidth that is available to the AP for communications with a number of STAs, such as a STA 115 of FIG. 1 or STA 400 of FIG. 4. Further, the AP may configure one or more channels for non-low latency communications and for probe requests and may configure one or more other channels for low latency communications.

In the example of FIG. 5A, an available AP bandwidth 505 may span a relatively wide bandwidth. For example, available AP bandwidth 505 may span 320 MHz in a 6 GHz frequency band. In this example, a number of channels may be configured, including a first channel 520 that may be configured as a primary channel, and a number of secondary channels 525 such as second channel 525-a, third channel 525-b, and fourth channel 525-c. The AP may configure the first channel 520 as a primary channel that is available for contention-based communications of one or more STAs that are associated with the AP. Further, the AP may configure the first channel 520 as a discovery channel that non-associated STAs may use to transmit probe requests in order to become associated with the AP. Secondary channels 525, in this example, may be unavailable for contention-based channel access or discovery, and may be used for low latency communications. Such channel configuration may be repeated across the entire available AP bandwidth 505, such as is illustrated in FIG. 5A. In other implementations a one or more of the secondary channels 525 may be configured as discovery channels, and the AP may configure low latency channels around other channels that are configured as primary channels and discovery channels in accordance with techniques discussed herein.

In this example, the AP may report a BSS bandwidth 510 that corresponds to a bandwidth of the first channel 520, and a full extended bandwidth 515 of the AP may be made available to low latency STAs. STAs may receive a report indicating the BSS bandwidth 510, and then identify the first channel 520 as the primary channel that may be used for contention-based channel access and that may be used for probe requests. In the event that the AP determines that one or more STAs are low latency STAs, the AP may provide low latency communications using the secondary channels 520. For example, a first STA may transmit an indication to the AP that it has data traffic associated with a QoS parameter (e.g., a QoS threshold). Such an indication may be provided using any of a number of communications, such as an indication of a QoS associated with data traffic of the STA, in a traffic specification (TSPEC) element, or an explicit indication of a latency bound for data traffic, to name just a few examples. The AP may provide an indication that the secondary channels 520 are to be used for communications, for example, in an operation mode notification (OMN) that is transmitted to the STA and indicates that the STA is to increase its bandwidth to span the primary channel 520 and one or more of the secondary channels 525. In some implementations, STAs may initiate contention-based communications (such as by using enhanced distributed channel access (EDCA)) using the first channel 520 and may not initiate contention-based communications using secondary channels 525. In some implementations, an AP may transmit initial downlink transmissions using one or more of the secondary channels 525, which may include a trigger to the STA that the STA is to use the one or more secondary channels for uplink transmissions from the STA to the AP.

Figure 5B:
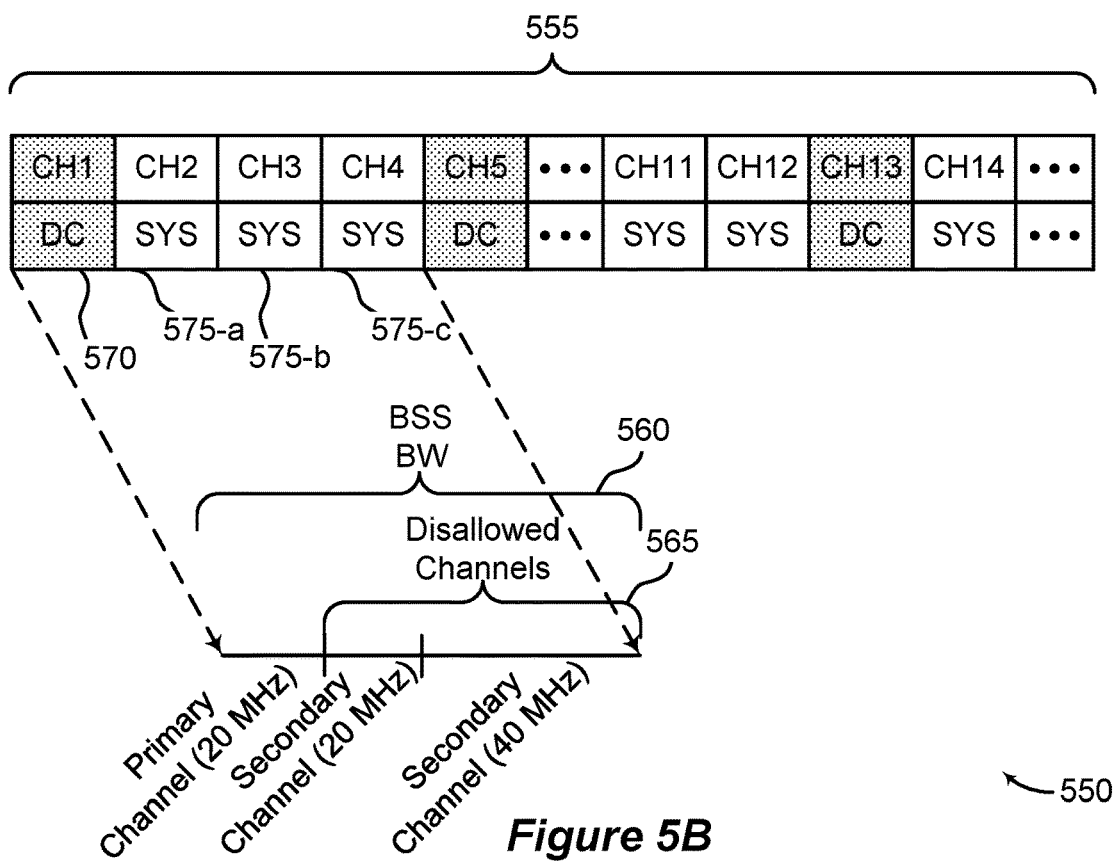
FIG. 5B shows another example of wireless channels that are configured for low latency wireless communication according to some implementations.

FIG. 5B shows another example of wireless channels 550 that are configured for low latency wireless communication according to some implementations. In this example, again the AP, such as an AP 105 of FIG. 1 or AP 300 of FIG. 3, may configure a number of channels within a bandwidth that is available to the AP for communications with a number of STAs, such as a STA 115 of FIG. 1 or STA 400 of FIG. 4. Further, the AP may configure one or more channels for non-low latency communications and for probe requests and may configure one or more other channels for low latency communications.

In the example of FIG. 5B, an available AP bandwidth 555 may span a relatively wide bandwidth. For example, available AP bandwidth 555 may span 320 MHz in a 6 GHz frequency band. In this example, a number of channels may be configured, including a first channel 570 that may be configured as a primary channel, and a number of secondary channels 575 such as second channel 575-a, third channel 575-b, and fourth channel 575-c.

In this example, the AP may maintain a BSS bandwidth 560 that spans the first channel 570 and the secondary channels 575 and may disallow access to the secondary channels 575. For example, the AP may report the BSS bandwidth 560 and may provide a HE operation information element (IE) indicating that secondary channels 575 are disallowed channels 565. Thus, the first channel 570 is configured as a primary channel that is available for contention-based communications of one or more STAs. Again, similarly as indicated above, the AP may configure the first channel 570 as a discovery channel that non-associated STAs may use to transmit probe requests. Secondary channels 575, in this example, may be unavailable for contention-based channel access or discovery, and may be used for low latency communications. Such channel configuration may be repeated across the entire available AP bandwidth 575, such as is illustrated in FIG. 5B. In other implementations a one or more of the secondary channels 575 may be configured as discovery channels, and the AP may configure low latency channels around other channels that are configured as primary channels and discovery channels in accordance with techniques discussed herein.

Figure 6:
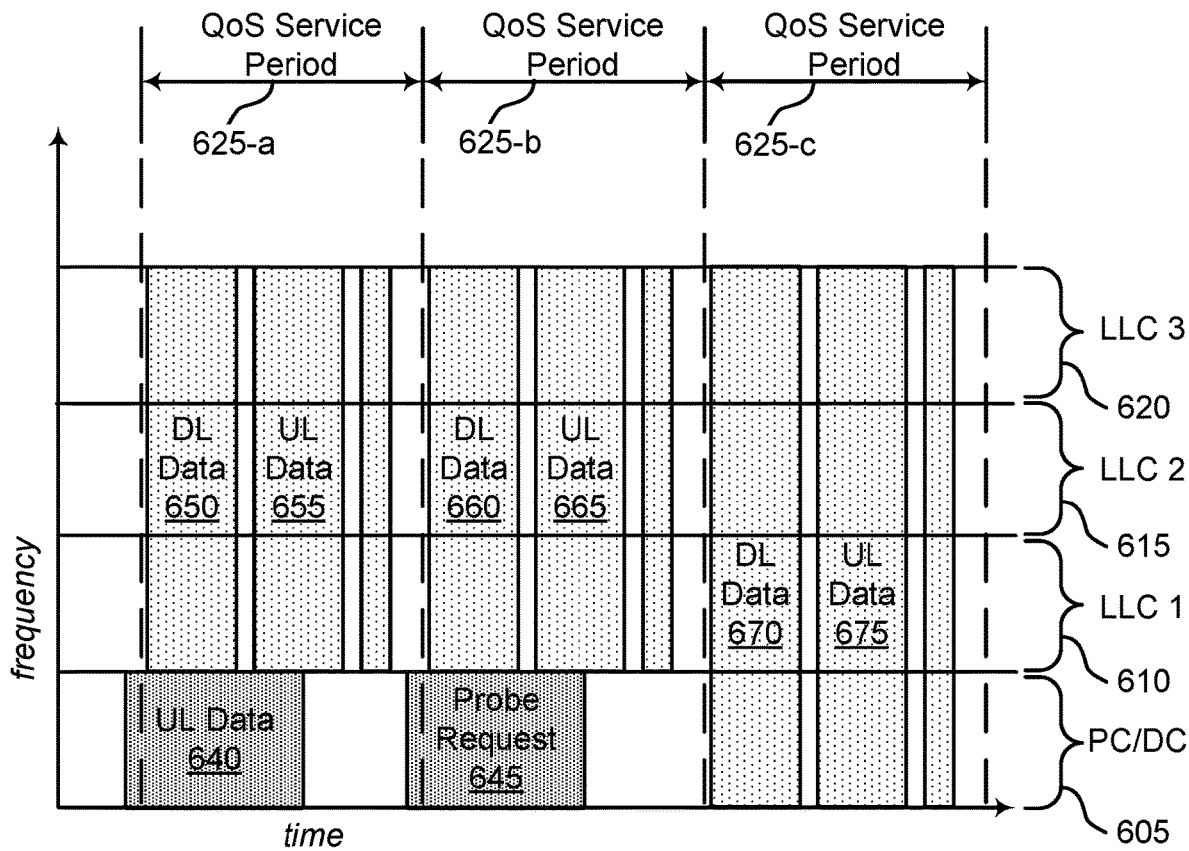
FIG. 6 shows an example of a channel configuration with a primary channel and secondary channels, and QoS service periods, that are configured for wireless communications according to some implementations.

FIG. 6 shows an example of a channel configuration 600 with a primary channel and secondary channels, and QoS service periods, that are configured for wireless communications according to some implementations. In this example, a primary channel 605 may occupy a first portion of bandwidth of an AP. A first low latency channel 610, a second low latency channel 615, and a third low latency channel 620 may occupy a second portion of the bandwidth of the AP. For example, AP bandwidth may span 80 MHz, with primary channel 605 being a 20 MHz channel, and each of the first low latency channel 610, second low latency channel 615, and third low latency channel 620 being 20 MHz channels. In some implementations, additional primary channels and secondary channels may be configured in additional AP bandwidth (such as a 160 MHz or 320 MHz bandwidth). The different bandwidth examples provided herein are for purposes of illustration and discussion only, and that the principles and techniques provided herein may be applied to any different channel or AP bandwidths, as will be readily apparent to persons having ordinary skill in the art.

In this example, the AP may schedule one or more QoS service periods 625, which in this example include a first QoS service period 625-a, a second QoS service period 625-b, and a third QoS service period 625-c. Further, in some implementations, more or fewer QoS service periods 625 may be scheduled. Low latency communications 635 may use the low latency channels 610 through 620, and in some examples may also use the primary channel 605. Non-low latency communications 630 may use the primary channel 605.

In some implementations, low latency data traffic may be relatively deterministic and repeatable. For example, in some IIoT deployments, low latency data traffic may occur at 10 ms intervals and have a 1 ms latency target. In such examples, an AP may schedule QoS service periods 625 once every 10 ms to occupy sufficient time resources to allow for uplink and downlink data traffic between the AP and STAs (such as for 2 ms every 10 ms). The remaining time resources between the QoS service periods 625 may be configured by the AP such that non-low latency STAs may use the secondary channels. In some examples, the AP may trigger non-low latency STAs to provide communications using the secondary channels between QoS service periods 625. In some implementations, an AP may broadcast the low latency schedule in beacon transmissions, and low latency STAs may monitor the secondary channels for communications from the AP during scheduled QoS service periods 625.

In the example of FIG. 6, a first STA may perform a contention-based channel access procedure for the primary channel 605 and begin transmitting uplink data 640. In some implementations, the AP may discard non-low latency transmissions that overlap with a QoS service period 625. In the example of FIG. 6, the AP may discard the uplink data 640 transmission on the primary channel 605 because it overlaps with QoS service period 625-a. The AP may transmit downlink data 650 in the first QoS service period 625-a, which may include a trigger for a STA to transmit low latency uplink data 655. For example, the AP may allocate a low latency STA each of the low latency channels 610 through 620 using a sub-channel selective transmission (SST) indication that is provided to the low latency STA. In such examples, the low latency STAs may communicate using the secondary channels and this may reduce the contention-based channel access load of the primary channel 605.

Continuing with the example of FIG. 6, in second QoS service period 625-b the AP may transmit downlink data 660 to a same or one or more different STAs, which may include a trigger for a STA to transmit low latency uplink data 655. In some examples, the AP may transmit a trigger frame to a STA indicating that the entire AP bandwidth is to be used for communications. In the example of FIG. 6, communications in the third QoS service period 625-c may span the primary channel 605, and each of the low latency channels 610 through 620, and the AP may transmit downlink data 670 using the full AP bandwidth, and one or more STAs may transmit uplink data 675 using the full AP bandwidth. In some implementations, the AP may transmit downlink data 650 using the low latency channels 610 through 620 even in the event that the primary channel 605 is busy. Additionally, or alternatively, a physical layer convergence procedure protocol data unit (PPDU) may be preamble punctured if one or more secondary channels are busy. In other examples, different combinations of uplink and downlink communications may be used during the QoS service periods 625, such as different orders for uplink and downlink communications, or different combinations or sequences of uplink and downlink communications.

As indicated above, in some implementations, non-low latency STAs may identify the QoS service periods 625, such as from the low latency schedule information explicitly provided by AP in a beacon and use a modified backoff timer when such a transmission is discarded. In the example of FIG. 6, a non-low latency STA may perform a contention-based channel access procedure (such as an EDCA procedure) and gain access to the primary channel 605 and initiate transmission of uplink data 640. In such an example, the AP may discard the uplink data 640 in order to maintain transmission readiness at QoS service period 625-a. In such an example, the STA that initiated the transmission of uplink data 640 may use a modified backoff timer. For example, rather than doubling a backoff timer that was used to initiate the transmission of the uplink data, the STA may use the same backoff timer value as was used for the initial transmission of uplink data 640. In some examples, the AP may determine that the uplink data 640 overlaps with QoS service period 625-a based on information provided in a header associated with the uplink data. For example, information in a header of uplink data 640, such as an L-SIG length field in a PHY header that indicated an end time of the uplink data transmission 640, may be used to determine the overlap. In some examples, an AP may discard a non-low latency PPDU, and may transmit a trigger to the STA that transmitted the discarded PPDU in a same or next transmission opportunity (TxOP), or along with an initiated low latency transmission in examples in which a low latency PPDU has ended in sufficient time to allow the retransmission. For example, an association identification (AID) in a trigger may be reserved to identify the STA, or the AID of the STA may be provided in examples in which the AP can determine the AID of the STA (such as if the discarded PPDU is an uplink multi-user (MU) PPDU). In some examples, the AP may transmit a negative acknowledgment or a group acknowledgment to the STA that may be used to determine that the PPDU was discarded.

In some implementations, an AP may also configure a discovery channel that may be used for probe request transmissions from non-associated STAs. In some implementations, the primary channel 605 may also be configured as a discovery channel, and a STA may transmit a probe request 645 based on the configuration or the primary channel 605 as a discovery channel. In some examples, the AP may disregard probe requests that overlap with a QoS service period 625. In other implementations, the discovery channel may be different than the primary channel 605. In some examples, independent backoff counters (such as independent EDCA backoff counters) may be maintained for different channels, such as one backoff counter for primary channel 605 and another backoff counter for a secondary channel that is configured as a discovery channel. In other examples, a single backoff counter may be maintained for the primary channel 605 only, and transmissions on the discovery channel may be initiated if an energy detection (ED) measurement is below an ED threshold, indicating that the discovery channel is idle during an interframe space (such as a point coordination function (PCF) interframe space (PIFS)).

Figure 7:
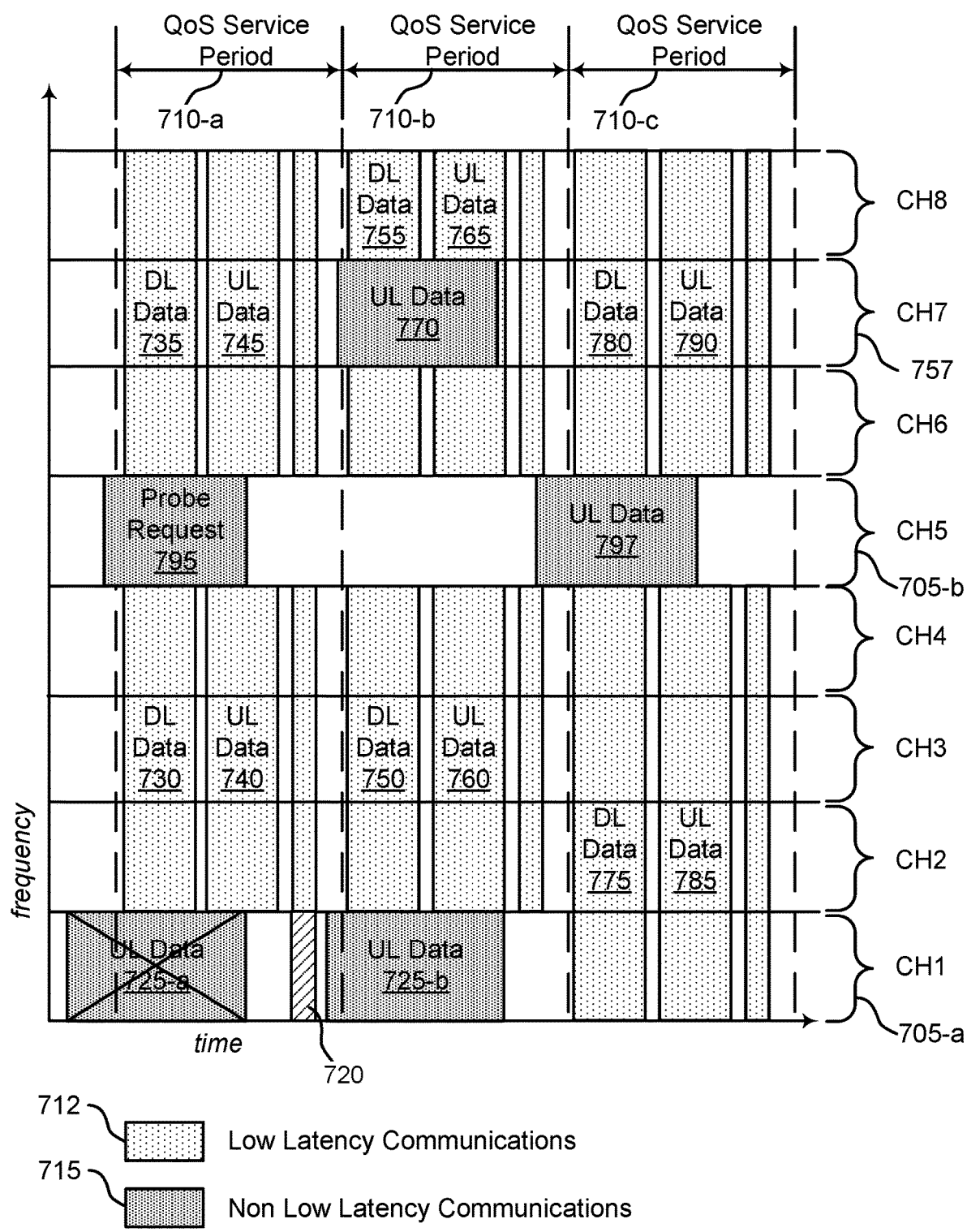
FIG. 7 shows an example of a channel configuration with multiple primary channels and secondary channels, and QoS service periods, for wireless communications according to some implementations.

FIG. 7 shows an example of a channel configuration 700 with multiple primary channels and secondary channels, and QoS service periods, for wireless communications according to some implementations. In this example, the AP may be an EHT AP that is capable of operating over a relatively wide bandwidth. In this example, two primary channels 705, namely first primary channel 705-a and second primary channel 705-b, may each occupy a portion of bandwidth of the AP. Other portions of the bandwidth of the AP may be configured as secondary channels and may provide low latency communications 712 in accordance with some implementations. For example, AP bandwidth may span 160 MHz, with each configured channel being a 20 MHz channel. In some implementations, additional primary channels and secondary channels may be configured in additional AP bandwidth (such as in a 320 MHz bandwidth). The different bandwidth examples provided herein are for purposes of illustration and discussion only, and that the principles and techniques provided herein may be applied to any different channel or AP bandwidths, as will be readily apparent to persons having ordinary skill in the art.

In this example, the AP may schedule one or more QoS service periods 710, which in this example include a first QoS service period 710-a, a second QoS service period 710-b, and a third QoS service period 710-c. Further, in some implementations, more of fewer QoS service periods 710 may be scheduled. Low latency communications 712 may use the low latency channels, and in some examples may also use a primary channel 705. Non-low latency communications 715 may use the primary channels 705. In some implementations, the primary channels 705 may also be configured as discovery channels. In other implementations, the AP may configure one or more channels different than the primary channels 705 as discovery channels.

In some implementations, the AP may be a multi-radio AP capable of concurrent uplink and downlink transmissions to and from multiple concurrent STAs. In some examples, the AP may maintain multiple backoff counters, such as multiple EDCA counters, such as one backoff counter for a discovery channel, one backoff counter for each primary channel 705, and backoff counter for low latency channels.

Such an AP may be full duplex, may process transmit and receive streams in parallel, and may concurrently exchange non-low latency communications 715 in the primary channels and low latency communications 712 in the low latency channels.

In some implementations, the AP may configure a BSS with synchronized slots for transmissions. In some examples, the AP may coordinate with one or more other APs, and multi-AP coordination may be used for communications with one or more STAs. In such examples, synchronized slots among the multiple APs may be used to coordinate communications with STAs. In some examples, synchronization of the slots of the BSS may provide that PPDU end times are synchronized, such as through providing an L-SIG length for frame that provides same end times, or through a TxOP or duration identification that determines an end of a TxOP, for example. In some examples, a frame may be discarded when the AP determines that the PPDU end time is not synchronized with the BSS slots.

In the example of FIG. 7, a STA may transmit uplink data 725-a in first primary channel 705-a, which may overlap with the first QoS service period 710-a, and may be discarded by the AP. In this example, the AP may transmit a trigger 720, which may trigger the STA to retransmit uplink data 725-b, in a synchronized manner with other communications. In some examples, an AID in trigger 720 may be reserved to identify the STA, or the AID of the STA may be provided in examples in which the AP can determine the AID of the STA. Within the first QoS service period 710-a, the AP may transmit first low latency downlink data 730 using a first set of secondary channels and may transmit second low latency downlink data 735 in a second set of secondary channels. Each low latency downlink data transmission may include, in some examples, a trigger to the associated STA to transmit uplink data, including first uplink data 740 in the first set of secondary channels and second uplink data 745 in the second set of secondary channels.

Continuing with the example of FIG. 7, in the second QoS service period 710-b, the AP may transmit third low latency downlink data 750 using the first set of secondary channels and may transmit fourth low latency downlink data 755 in the second set of secondary channels. In this example, a secondary channel 757 may be busy during the second QoS service period 710-b, such as due to a different STA transmitting uplink data 770, and the fourth low latency downlink data 755 may be preamble punctured to accommodate for the busy secondary channel 757. Again, each low latency downlink data transmission may include a trigger to the associated STA to transmit uplink data, including third uplink data 760 in the first set of secondary channels and preamble punctured fourth uplink data 765 in the second set of secondary channels. In this example, a third QoS service period 710-c may include fifth downlink data 775, sixth downlink data 780, fifth uplink data 785 and sixth uplink data 790, that may be communicated in a similar manner as in the first QoS service period 710-a. In this example, the second primary channel 705-b may carry a probe request 795 and an uplink data 797 transmission. Such a probe request 795 and uplink data 797 transmission may be transmitted independently of the first primary channel 705-a and independently of transmissions of low latency channels.

Figure 8:
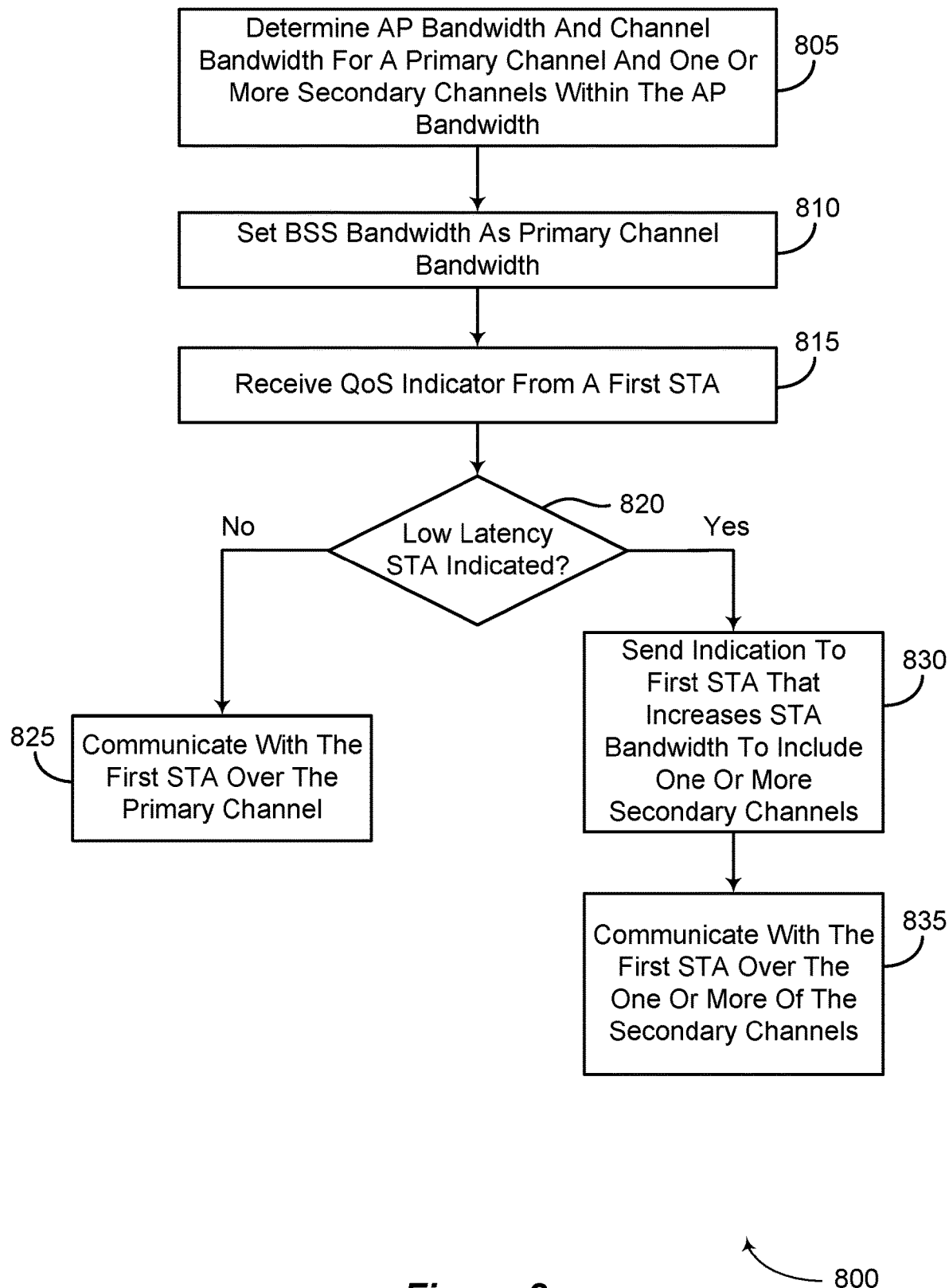
FIGS. 8 through 12 show examples of flowcharts for low latency wireless communications in a wireless communication system according to some implementations.

FIG. 8 shows an example of a flowchart 800 for low latency wireless communications in a wireless communication system according to some implementations. The flowchart 800 may show functions of an AP, such as an AP 105 of FIG. 1 or an AP 300 of FIG. 3, when configuring an AP bandwidth for multiple channels that may be used for low latency wireless communications.

At block 805, the AP may determine an AP bandwidth and channel bandwidth for a primary channel and one or more secondary channels within the AP bandwidth. For example, the AP may determine an 80 MHz AP bandwidth with a 20 MHz channel bandwidth for each of a primary channel and three secondary channels. In other examples, larger bandwidths or smaller bandwidths may be used, different numbers of primary channels may be used, or different numbers of secondary channels may be used.

At block 810, the AP may set a BSS bandwidth as the primary channel bandwidth. In some examples, the primary channel bandwidth may be 20 MHz, and thus the AP may set the BSS bandwidth as 20 MHz. The AP may report the BSS bandwidth to STAs, that may then use the reported BSS bandwidth for contention-based channel access, such as EDCA channel access. In such a manner, the STAs may use the primary channel for contention-based channel access. In some examples, the AP may configure the primary channel bandwidth also to be discovery channel bandwidth, and STAs may transmit probe requests using the primary channel.

At block 815, the AP may receive a QoS indicator from a first STA. In some implementations, the QoS indicator may be an indicator of a priority of a service that uses the data traffic. For example, IIoT services or VR services that have strict latency requirements may be identified as highest priority services and may be identified as low latency services, while non-latency sensitive services, such as general internet data traffic, may be identified as lower priority services that are non-low latency. In some examples, the QoS indicator may be provided in a TSPEC element that provides parameters associated with the data traffic.

At block 820, the AP may determine whether a low latency STA is indicated by the QoS indicator. In some examples, the QoS indicator may indicate that a latency target for data traffic is less than or equal to a latency threshold that is associated with low latency transmissions, and the AP may determine that the STA is a low latency STA based on the latency target. For example, a QoS parameter such as a QoS threshold associated with low latency transmissions may be associated with a low latency threshold set at 1 ms, and in examples in which data traffic of the STA is at or below 1 ms, the STA may be identified as a low latency STA. In some examples, the QoS threshold may be set based on TxOP durations that may be used in a system, and if a latency target for data traffic is less than a TxOP duration, the data traffic may be identified as being below the low latency threshold. In some implementations, the QoS indicator may be an indicator of a priority of a service that uses the data traffic. For example, IIoT services or VR services that have strict latency requirements may be identified as highest priority services and may be identified as low latency services, while non-latency sensitive services, such as general internet data traffic, may be identified as lower priority services that are non-low latency. In some examples, the QoS indicator may be provided in a TSPEC element that provides parameters associated with the data traffic, and one or more parameters, or combinations of parameters, may be identified as being at or below the low latency threshold.

At block 825, if it is determined that a low latency STA is not indicated, the AP may communicate with the first STA over the primary channel. In some examples, the first STA may perform a contention-based channel access, such as an EDCA access procedure, to obtain channel access to the primary channel and initiate a transmission to the AP. In some examples, the AP may perform a contention-based channel access procedure and initiate transmissions to the STA, which may include a trigger to the STA to transmit an uplink transmission within a TxOP of the AP.

At block 830, if it is determined at block 820 that a low latency STA is indicated, the AP may send an indication to the first STA that increases the STA bandwidth to include one or more secondary channels. In some examples, the indication to the first STA may be provided in an OMN that is provided to the STA. The indication to increase the STA bandwidth may, for example, indicate that multiple secondary channels are to be used for communications with the AP.

At block 835, the AP may communicate with the first STA over the one or more secondary channels. In some examples, the communications over the one or more secondary channels may provide reliable and available wireless resources for communications, such that data packets may be delivered within latency targets associated with the data traffic. For example, in some examples the STA may be associated with a piece of industrial equipment in an IIoT, and the IIoT system may have a latency target of 1 ms for delivery of a packet to a receiver. The AP or STA that receives such a data packet may immediately transmit the packet using the one or more secondary channels, thus complying with the packet delivery latency bound of the IIoT service.

Figure 9:
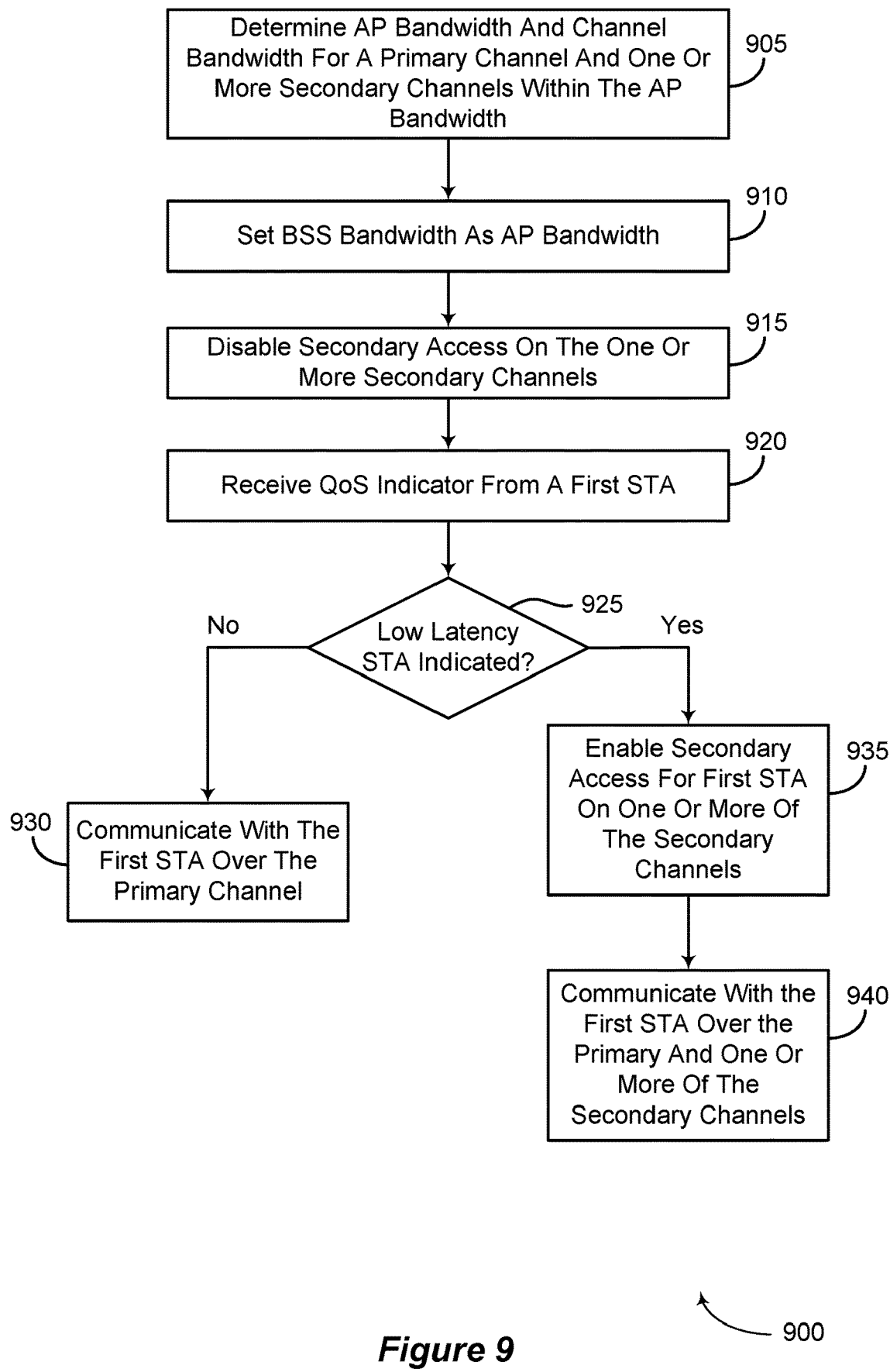

FIG. 9 shows an example of a flowchart 900 for low latency wireless communications in a wireless communication system according to some implementations. The flowchart 900 may show functions of an AP, such as an AP 105 of FIG. 1 or an AP 300 of FIG. 3, when configuring an AP bandwidth for multiple channels that may be used for low latency wireless communications.

At block 905, the AP may determine an AP bandwidth and channel bandwidth for a primary channel and one or more secondary channels within the AP bandwidth. For example, the AP may determine an 80 MHz AP bandwidth with a 20 MHz channel bandwidth for each of a primary channel and three secondary channels. In other examples, larger bandwidths or smaller bandwidths may be used, different numbers of primary channels may be used, or different numbers of secondary channels may be used.

At block 910, the AP may set a BSS bandwidth as the AP bandwidth. In some examples, the AP bandwidth may be 80 MHz, with each of the primary channel and secondary channels having a to MHz bandwidth. Thus, in such examples, the AP may set the BSS bandwidth as 80 MHz. In other examples, the AP bandwidth may be 160 MHz or 320 MHz, and the AP may report the BSS bandwidth to STAs as the full AP bandwidth.

At block 915, the AP may disable secondary access on the one or more secondary channels. For example, the AP may disable secondary access on three 20 MHz secondary channels of an 80 MHz BSS bandwidth. Thus, in such an example, the AP may have only a 20 MHz primary channel that is enabled. One or more STAs may then use the remaining active BSS bandwidth, corresponding to primary channel, for contention-based channel access (such as EDCA channel access). In such a manner, the STAs may use the primary channel for contention-based channel access. In some examples, the AP may transmit a HE operation IE with disallowed channels that correspond to the one or more secondary channels. In some examples, the AP may configure the primary channel bandwidth also to be discovery channel bandwidth, and STAs may transmit probe requests using the primary channel.

At block 920, the AP may receive a QoS indicator from a first STA. In some implementations, similarly, as discussed above with respect to FIG. 8, the QoS indicator may be an indicator of a priority of a service that uses the data traffic. For example, IIoT services or VR services that have strict latency requirements may be identified as highest priority services and may be identified as low latency services, while non-latency sensitive services, such as general internet data traffic, may be identified as lower priority services that are non-low latency. In some examples, the QoS indicator may be provided in a TSPEC element that provides parameters associated with the data traffic.

At block 925, the AP may determine whether a low latency STA is indicated by the QoS indicator. In some examples, the QoS indicator may indicate that a latency target for data traffic is less than or equal to a latency threshold that is associated with low latency transmissions, and the AP may determine that the STA is a low latency STA based on the latency target. For example, a QoS threshold may be associated with a low latency threshold may be set at 1 ms, and in examples in which data traffic of the STA is at or below 1 ms, the STA may be identified as a low latency STA. In some examples, the low latency threshold may be set based on TxOP durations that may be used in a system, and if a latency target for data traffic is less than a TxOP duration, the data traffic may be identified as being below the low latency threshold. In some implementations, the QoS indicator may be an indicator of a priority of a service that uses the data traffic. For example, IIoT services or VR services that have strict latency requirements may be identified as highest priority services and may be identified as low latency services, while non-latency sensitive services, such as general internet data traffic, may be identified as lower priority services that are non-low latency. In some examples, the QoS indicator may be provided in a TSPEC element that provides parameters associated with the data traffic, and one or more parameters, or combinations of parameters, may be identified as being at or below the low latency threshold.

At block 930, if it is determined that a low latency STA is not indicated, the AP may communicate with the first STA over the primary channel. In some examples, the first STA may perform a contention-based channel access, such as an EDCA access procedure, to obtain channel access to the primary channel and initiate a transmission to the AP. In some examples, the AP may perform a contention-based channel access procedure and initiate transmissions to the STA, which may include a trigger to the STA to transmit an uplink transmission within a TxOP of the AP.

At block 935, if it is determined at block 925 that a low latency STA is indicated, the AP may send an indication to the first STA that increases the STA bandwidth to include one or more secondary channels. In some examples, the indication to the first STA may be provided in a HE operation IE that enables access to the one or more secondary channels that is provided to the STA. The indication to increase the STA bandwidth may, for example, indicate that multiple secondary channels are to be used for communications with the AP.

At block 940, the AP may communicate with the first STA over the one or more secondary channels. In some examples, the communications over the one or more secondary channels may provide reliable and available wireless resources for communications, such that data packets may be delivered within latency targets associated with the data traffic. For example, in some examples the STA may be associated with a piece of industrial equipment in an IIoT, and the IIoT system may have a latency target of 1 ms for delivery of a packet to a receiver. The AP or STA that receives such a data packet may immediately transmit the packet using the one or more secondary channels, thus complying with the packet delivery latency bound of the IIoT service.

Figure 10:
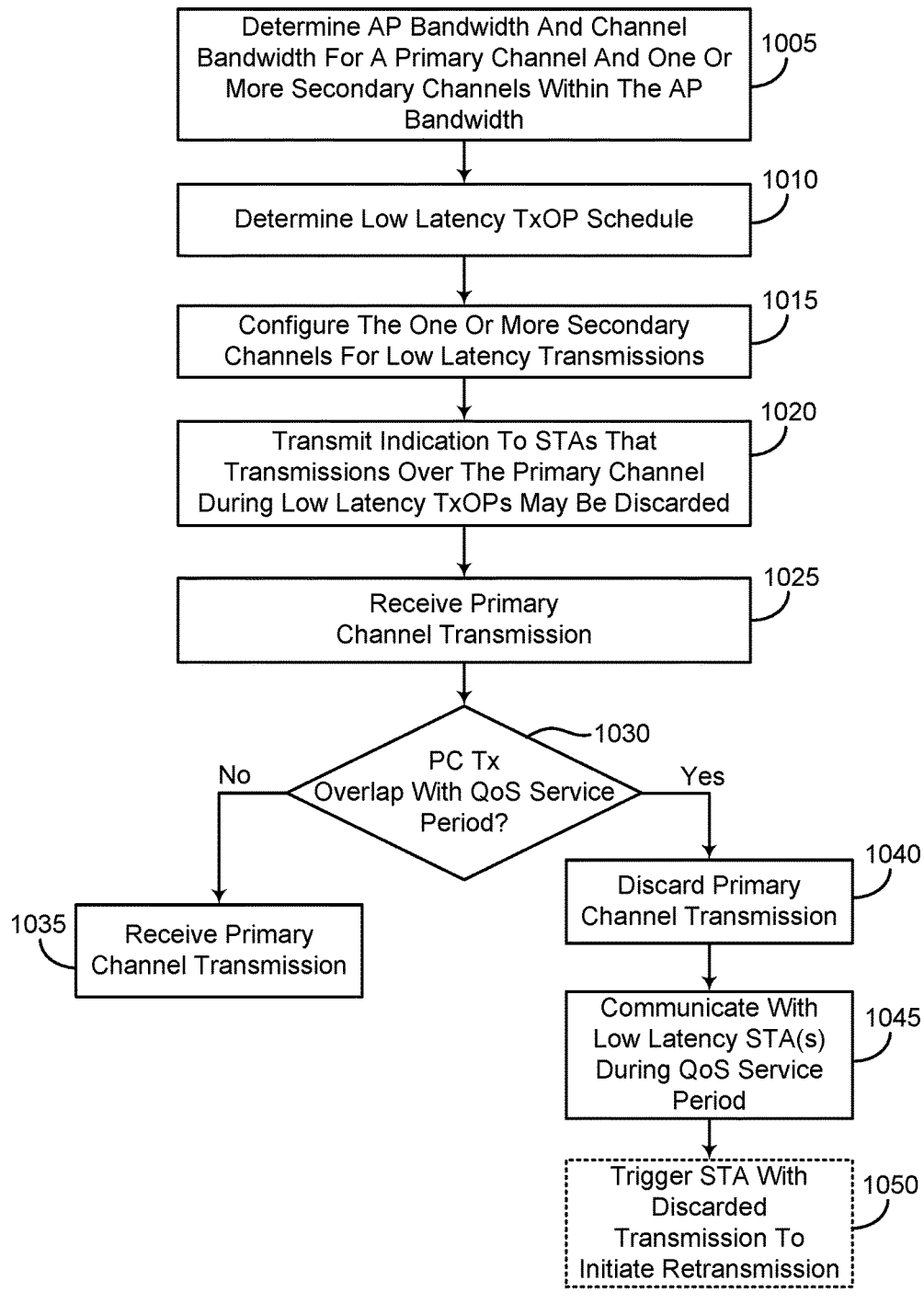

FIG. 10 shows an example of a flowchart 1000 for low latency wireless communications in a wireless communication system according to some implementations. The flowchart 1000 may show functions of an AP, such as an AP 105 of FIG. 1 or an AP 300 of FIG. 3, when configuring an AP bandwidth for multiple channels that may be used for low latency wireless communications.

At block 1005, the AP may determine an AP bandwidth and channel bandwidth for a primary channel and one or more secondary channels within the AP bandwidth. For example, the AP may determine an 80 MHz AP bandwidth with a 20 MHz channel bandwidth for each of a primary channel and three secondary channels. In other examples, larger bandwidths or smaller bandwidths may be used, different numbers of primary channels may be used, or different numbers of secondary channels may be used.

At block 1010, the AP may determine a low latency TxOP schedule. In some examples, the AP may determine the low latency TxOP schedule based on a low latency service that is associated with the AP and BSS. For example, the AP may be deployed in an IIoT setting in which IIoT nodes, such as a piece of industrial machinery, may transmit and receive communications according to a defined schedule. For example, a robotic arm on a piece of industrial machinery may transmit and receive arm position information once every 10 ms, and the transmit data may have an associated delivery latency of 1 ms. In such examples, the low latency TxOP schedule may be set to span two or three milliseconds and repeat every 10 ms.

At block 1015, the AP may configure one or more secondary channels for low latency transmissions. For example, an AP may configure an AP bandwidth of 80, 160, or 320 MHz. The AP may then configure a number of 20 MHz sub-bands as channels that occupy the AP bandwidth. The AP may set every fourth channel within the AP bandwidth as a primary channel, with remaining channels being configured as secondary channels. In some examples, two or more secondary channels may be associated with each different primary channel.

At block 1020, the AP may transmit an indication to the STAs that transmissions over the primary channel during low latency TxOPs may be discarded. In some examples, the AP may transmit an indication to the STAs that any transmissions on a primary channel that overlap a scheduled the low latency transmission may be discarded. For example, a transmission over a primary channel that overlaps with a low latency transmission period, such as indicated at block 1015, may be discarded in order to maintain readiness of the AP during low latency TxOPs.

At block 1025, the AP may receive a primary channel transmission. Such a primary channel transmission may be transmitted by an associated non-low latency STA after performance of a contention-based channel access procedure, such as an EDCA channel access procedure. The STA, as part of a successful contention-based channel access procedure, may determine that the primary channel is available for transmissions of the STA, and may start transmitting a data packet, such as in a payload of a PPDU, to the AP using the primary channel. The primary channel transmission may include a header, which may include an L-SIG length field that may indicate a stop time of the primary channel transmission. In some examples, the primary channel transmission may include a probe request from a non-associated STA.

At block 1030, the AP may determine whether the primary channel transmission will overlap with the low latency transmission period. In some examples, the AP may identify a start time of a QoS service period and may determine whether the primary channel transmission extends beyond the start time of the QoS service period. In some examples, the AP may determine the stop time of the primary channel transmission based on a duration indication provided with the primary channel transmission. For example, the AP may decode the L-SIG length field that is provided with the primary channel transmission to determine a duration of the primary channel transmission and determine whether there is overlap with the QoS service period based on the indicated duration. In some examples, the AP may determine that the primary channel transmission overlaps with the QoS service period based on a start time of the primary channel transmission and a TxOP duration.

At block 1035, if it is determined at block 1030 that the primary channel transmission will not overlap with the QoS service period, the AP may receive the primary channel transmission. In some examples, the AP may receive the primary channel transmission in sufficient time to maintain readiness for low latency communications during a subsequent QoS service period. In some examples, the AP may transmit an acknowledgment of receipt of the primary channel transmission.

At block 1040, if it is determined at block 1030 that the primary channel transmission will overlap with the QoS service period, the AP may discard the primary channel transmission. In some implementations, the AP may discontinue buffering transmissions of the primary channel and discard any transmissions that are already received. In some examples, of the primary channel transmission included an AID for the STA that initiated the transmission, the AP may retain the AID for use in a subsequent trigger to the STA.

At block 1045, the AP may communicate with one or more low latency STAs during the QoS service period. In some implementations, the QoS service period may include uplink and downlink communications with the one or more STAs. For example, the AP may transmit low latency downlink data traffic during an initial downlink communication within the low latency time period. The AP may also transmit a trigger to one or more low latency STAs to initiate low latency uplink communications over one or more secondary channels.

Optionally, at block 1050, the AP may trigger the STA with the discarded transmission to initiate a retransmission. In some examples, the AP may transmit a trigger to the STA that transmitted a discarded transmission in a same or next TxOP. In some examples, such a trigger may be provided along with an initiated low latency transmission in examples in which a low latency PPDU has ended in sufficient time to allow the retransmission. In some examples, an AID in the trigger may be reserved to identify the STA, or the AID of the STA may be provided in examples in which the AP can determine the AID, such as if the discarded transmission included an uplink MU PPDU.

Figure 11:
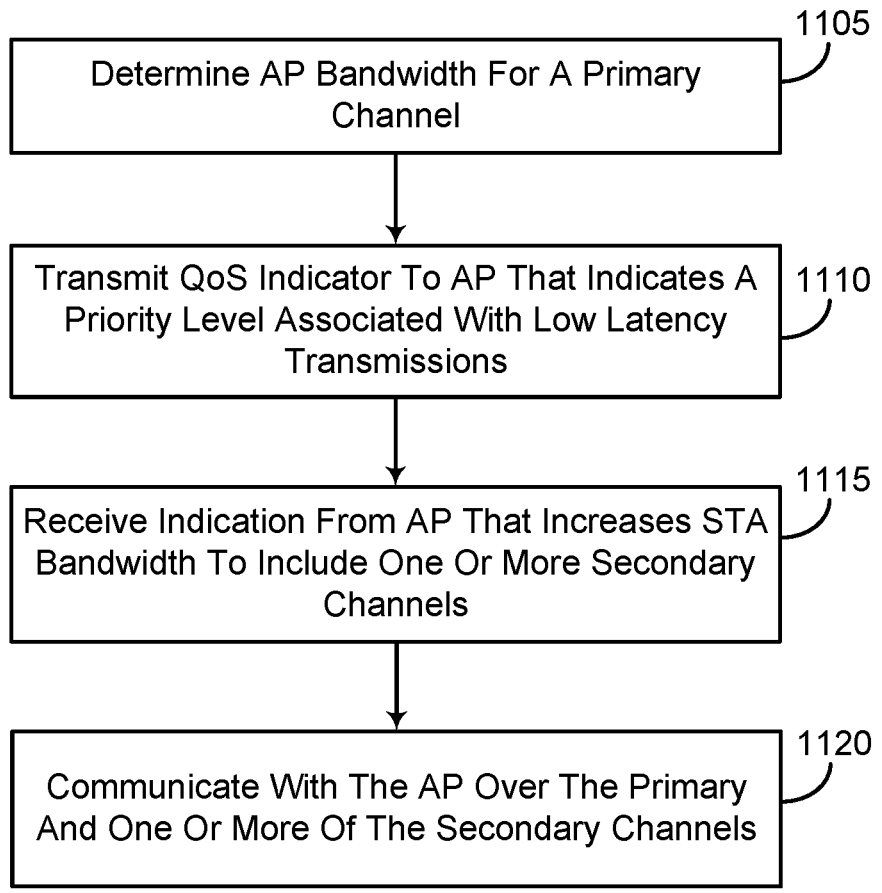

FIG. 11 shows an example of a flowchart 1100 for low latency wireless communications in a wireless communication system according to some implementations. The flowchart 1100 may show functions of a STA, such as an STA 115 of FIG. 1 or a STA 400 of FIG. 4, that provide low latency wireless communications with an AP.

At block 1105, the STA may determine an AP bandwidth for a primary channel. In some examples, the STA may receive an indication of a BSS bandwidth from the AP in one or more beacon transmissions from the AP and may determine the AP bandwidth for the primary channel based on the reported BSS bandwidth. In other examples, the STA may receive an indication of a BSS bandwidth that includes the primary channel and one or more secondary channels and may also receive an indication from the AP that disallows access to the one or more secondary channels. For example, the AP may provide a HE operation IE indicating that secondary channels are disallowed channels.

At block 1110, the STA may transmit a QoS indicator to the AP that indicates a priority level associated with low latency transmissions. In some implementations, the QoS indicator may be an indicator of a priority of a service that uses the data traffic. For example, IIoT services or VR services that have strict latency requirements may be identified as highest priority services and may be identified as low latency services, while non-latency sensitive services, such as general internet data traffic, may be identified as lower priority services that are non-low latency. In some examples, the QoS indicator may be provided in a TSPEC element that provides parameters associated with the data traffic. In some examples, the QoS indicator may be provided to the AP as part of an association procedure when the STA associated with the AP. In other examples, the QoS indicator may be provided to the AP after association, such as in a management frame transmitted to the AP after a service is initiated at the STA that has low latency communications requirements.

At block 1115, the STA may receive an indication from the AP that increases the STA bandwidth to include one or more secondary channels. In some examples, the indication to may be provided in an OMN that is received from the AP. The indication to increase the STA bandwidth may, for example, indicate that multiple secondary channels are to be used for communications with the AP. In some examples, the indication to increase the STA bandwidth may be provided in an HE operation IE that allows the STA to use one or more secondary channels that were previously indicated to be disallowed channels.

At block 1120, the STA may communicate with the AP over the one or more secondary channels. In some examples, the communications over the one or more secondary channels may provide reliable and available wireless resources for communications, such that data packets may be delivered within latency targets associated with the data traffic. For example, in some examples the STA may be associated with a piece of industrial equipment in an IIoT, and the IIoT system may have a latency target of 1 ms for delivery of a packet to a receiver. The AP or STA that receives such a data packet may immediately transmit the packet using the one or more secondary channels, thus complying with the packet delivery latency bound of the IIoT service.

Figure 12:
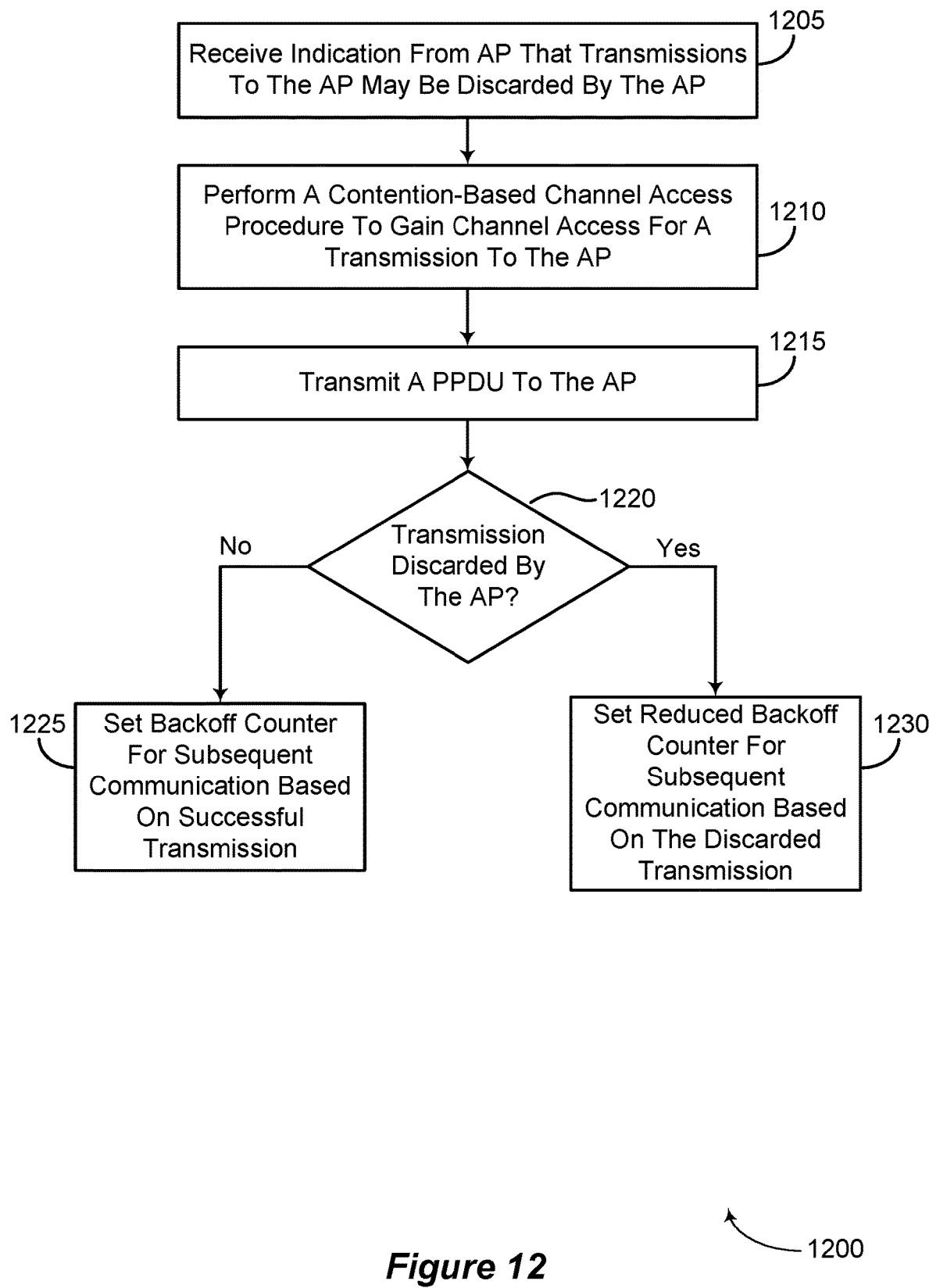

FIG. 12 shows an example of a flowchart 1200 for low latency wireless communications in a wireless communication system according to some implementations. The flowchart 1200 may show functions of a STA, such as an STA 115 of FIG. 1 or a STA 400 of FIG. 4, that provide low latency wireless communications with an AP.

At block 1205, the STA may receive an indication from an AP that transmissions to the AP may be discarded by the AP. In some examples, the AP may transmit an indication that any transmissions on a primary channel that overlap a scheduled the low latency transmission period may be discarded. For example, beacon transmissions from the AP may indicate a low latency schedule, and that transmissions from the STA that overlap with the low latency schedule may be discarded. Such transmissions may be discarded even though the transmission from the STA is in compliance with a contention-based channel access procedure that was performed in advance of the transmission.

At block 1210, the STA may perform a contention-based channel access procedure to gain channel access for a transmission to the AP. For example, the STA may determine that data traffic is to be transmitted to the AP and may perform an EDCA procedure to gain channel access and transmit the data traffic. The contention-based channel access procedure may be used to gain access to a primary channel of the AP, for example.

At block 1215, the STA may transmit a PPDU to the AP. In some examples, the PPDU may include a header, which may include an L-SIG length field that may indicate a stop time of the PPDU transmission.

At block 1220, the STA may determine whether the transmission was discarded by the AP. In some examples, the STA may make such a determination based on a receipt or a lack of receipt of an acknowledgment of the transmission. In some examples, the STA may make such a determination based on an overlap between the transmission and a reported low latency schedule of the AP, in conjunction with whether an acknowledgment of the transmission is received from the AP.

At block 1225, if it is determined at block 1220 that the transmission was not discarded, the STA may set a backoff counter for a subsequent communication with the AP based on the successful transmission. In some examples, the backoff counter may be set according to an EDCA procedure.

At block 1230, if it is determined at block 1220 that the transmission of the STA was discarded by the AP, the STA may set a reduced backoff counter for a subsequent communication based on the discarded transmission. For example, the STA may adjust the backoff timer to attempt a retransmission of the discarded PPDU sooner than in examples in which the transmission was successful or in which a contention-based access procedure indicated that the primary channel was occupied by another transmitter. For example, rather than doubling a backoff timer that was in the contention-based channel access procedure at block 1210, the STA may use the same backoff timer value as was used at block 1210 for the subsequent contention-based channel access procedure to initiate a retransmission of the discarded PPDU.

Figure 13:
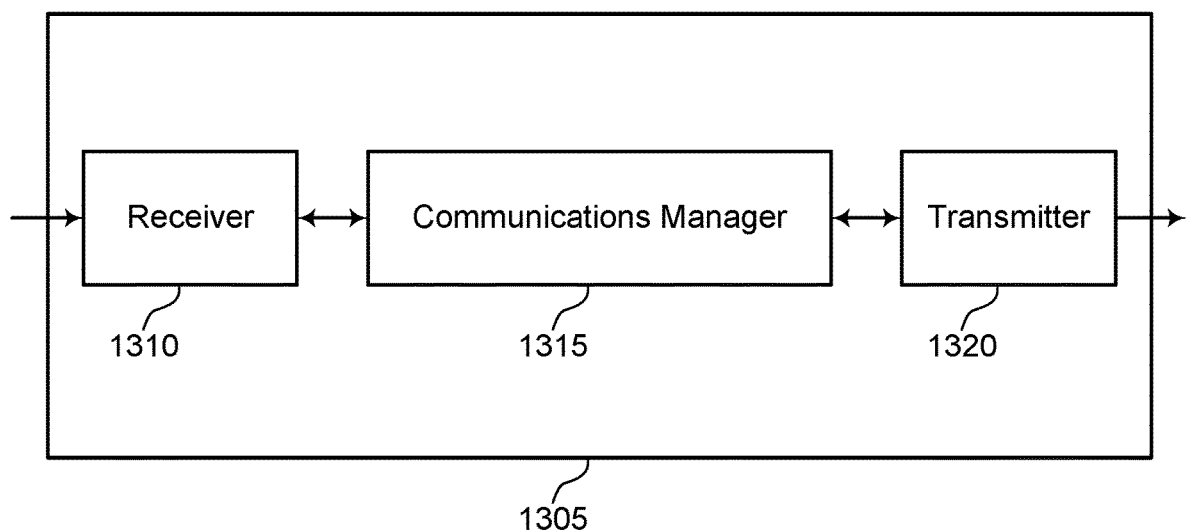
FIGS. 13 and 14 show block diagrams of devices that support techniques for low latency communications in wireless local area networks in accordance with aspects of the present disclosure.

FIG. 13 shows a block diagram of a device 1305 that supports techniques for low latency communications in wireless local area networks in accordance with aspects of the present disclosure. The device 1305 may be an example of aspects of an AP as described herein. The device 1305 may include a receiver 1310, a communications manager 1315, and a transmitter 1320. The communications manager 1315 can be implemented, at least in part, by one or both of a modem and a processor. Each of these components may be in communication with one another (for example, via one or more buses).

The receiver 1310 may receive information such as packets, user data, or control information associated with various information channels (for example, control channels, data channels, and information related to techniques for low latency communications in wireless local area networks, among other examples). Information may be passed on to other components of the device. The receiver 1310 may be an example of aspects of the transceiver 1620 described with reference to FIG. 16. The receiver 1310 may utilize a single antenna or a set of antennas.

The communications manager 1315 may determine that wireless communications of data traffic associated with a predetermined QoS parameter are to be prioritized compared to other wireless communications during at least a first portion of a QoS service period, discard the first wireless communication based on the determining that the first wireless communication at least partially overlaps the QoS service period and based on the determining that the first wireless communication is not associated with the predetermined QoS parameter, determine that a wireless communication device has initiated a first wireless communication that at least partially overlaps with the QoS service period, in which the first wireless communication is in conformance with a contention-based channel access procedure for initiating the first wireless communication, and determine that the first wireless communication is not associated with the predetermined QoS parameter.

In some examples, the communications manager 1315 may also identify an available bandwidth for wireless communications with one or more wireless communication devices (for example, STAs) and a channel bandwidth for each of a set of channels of the available bandwidth, in which a first channel of the set of channels is configured as a primary channel that is available for transmissions of the one or more wireless communication devices, determine that a wireless communication device (for example, a STA) is to communicate data traffic associated with a predetermined QoS parameter, and transmit a wireless communication to the wireless communication device including an indication that one or more secondary channels of the set of channels are available for wireless communications associated with the predetermined QoS parameter. The communications manager 1315 may be an example of aspects of the communications manager 1610 described herein.

The communications manager 1315, or its sub-components, may be implemented in hardware, code (for example, software or firmware) executed by a processor, or any combination thereof. If implemented in code executed by a processor, the functions of the communications manager 1315, or its sub-components may be executed by a general-purpose processor, a digital signal processor (DSP), an application-specific integrated circuit (ASIC), a FPGA or other programmable logic device, discrete gate or transistor logic, discrete hardware components, or any combination thereof designed to perform the functions described in the present disclosure.

The communications manager 1315, or its sub-components, may be physically located at different locations, including being distributed such that portions of functions are implemented at different physical locations by one or more physical components. In some examples, the communications manager 1315, or its sub-components, may be a separate and distinct component in accordance with various aspects of the present disclosure. In some examples, the communications manager 1315, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1320 may transmit signals generated by other components of the device. In some examples, the transmitter 1320 may be collocated with a receiver 1310 in a transceiver module. For example, the transmitter 1320 may be an example of aspects of the transceiver 1620 described with reference to FIG. 16. The transmitter 1320 may utilize a single antenna or a set of antennas.

Figure 14:
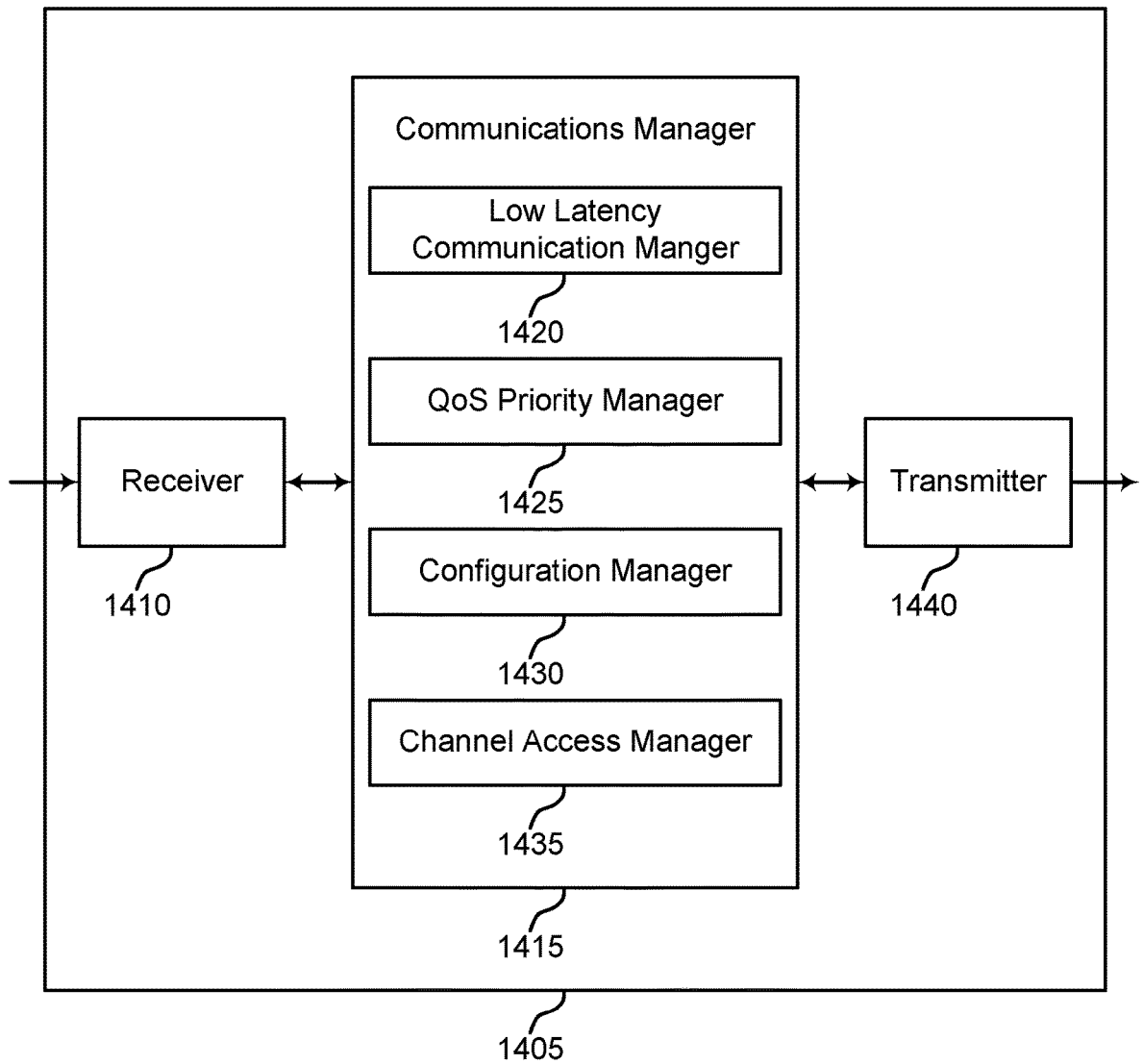

FIG. 14 shows a block diagram of a device 1405 that supports techniques for low latency communications in wireless local area networks in accordance with aspects of the present disclosure. The device 1405 may be an example of aspects of a device 1305 or an AP 105 as described herein. The device 1405 may include a receiver 1410, a communications manager 1415, and a transmitter 1440. The communications manager 1415 can be implemented, at least in part, by one or both of a modem and a processor. Each of these components may be in communication with one another (for example, via one or more buses).

The receiver 1410 may receive information such as packets, user data, or control information associated with various information channels (for example, control channels, data channels, and information related to techniques for low latency communications in wireless local area networks, among other examples). Information may be passed on to other components of the device. The receiver 1410 may be an example of aspects of the transceiver 1620 described with reference to FIG. 16. The receiver 1410 may utilize a single antenna or a set of antennas.

The communications manager 1415 may be an example of aspects of the communications manager 1315 as described herein. The communications manager 1415 may include a low latency communication manager 1420, a QoS priority manager 1425, a configuration manager 1430, and a channel access manager 1435. The communications manager 1415 may be an example of aspects of the communications manager 1610 described herein.

The low latency communication manager 1420 may determine that wireless communications of data traffic associated with a predetermined QoS parameter are to be prioritized compared to other wireless communications during at least a first portion of a QoS service period and discard the first wireless communication based on the determining that the first wireless communication at least partially overlaps the QoS service period and based on the determining that the first wireless communication is not associated with the predetermined QoS parameter. In some examples, the QoS priority manager 1425 may determine that a wireless communication device (for example, a STA) has initiated a first wireless communication that at least partially overlaps with the QoS service period, in which the first wireless communication is in conformance with a contention-based channel access procedure for initiating the first wireless communication and determine that the first wireless communication is not associated with the predetermined QoS parameter.

The configuration manager 1430 may identify an available bandwidth for wireless communications with one or more wireless communication devices (for example, STAs) and a channel bandwidth for each of a set of channels of the available bandwidth, in which a first channel of the set of channels is configured as a primary channel that is available for transmissions of the one or more wireless communication devices.

The low latency communication manager 1420 may determine that a wireless communication device is to communicate data traffic associated with a predetermined QoS parameter.

The channel access manager 1435 may transmit a wireless communication to the wireless communication device including an indication that one or more secondary channels of the set of channels are available for wireless communications associated with the predetermined QoS parameter.

The transmitter 1440 may transmit signals generated by other components of the device. In some examples, the transmitter 1440 may be collocated with a receiver 1410 in a transceiver module. For example, the transmitter 1440 may be an example of aspects of the transceiver 1620 described with reference to FIG. 16. The transmitter 1440 may utilize a single antenna or a set of antennas.

Figure 15:
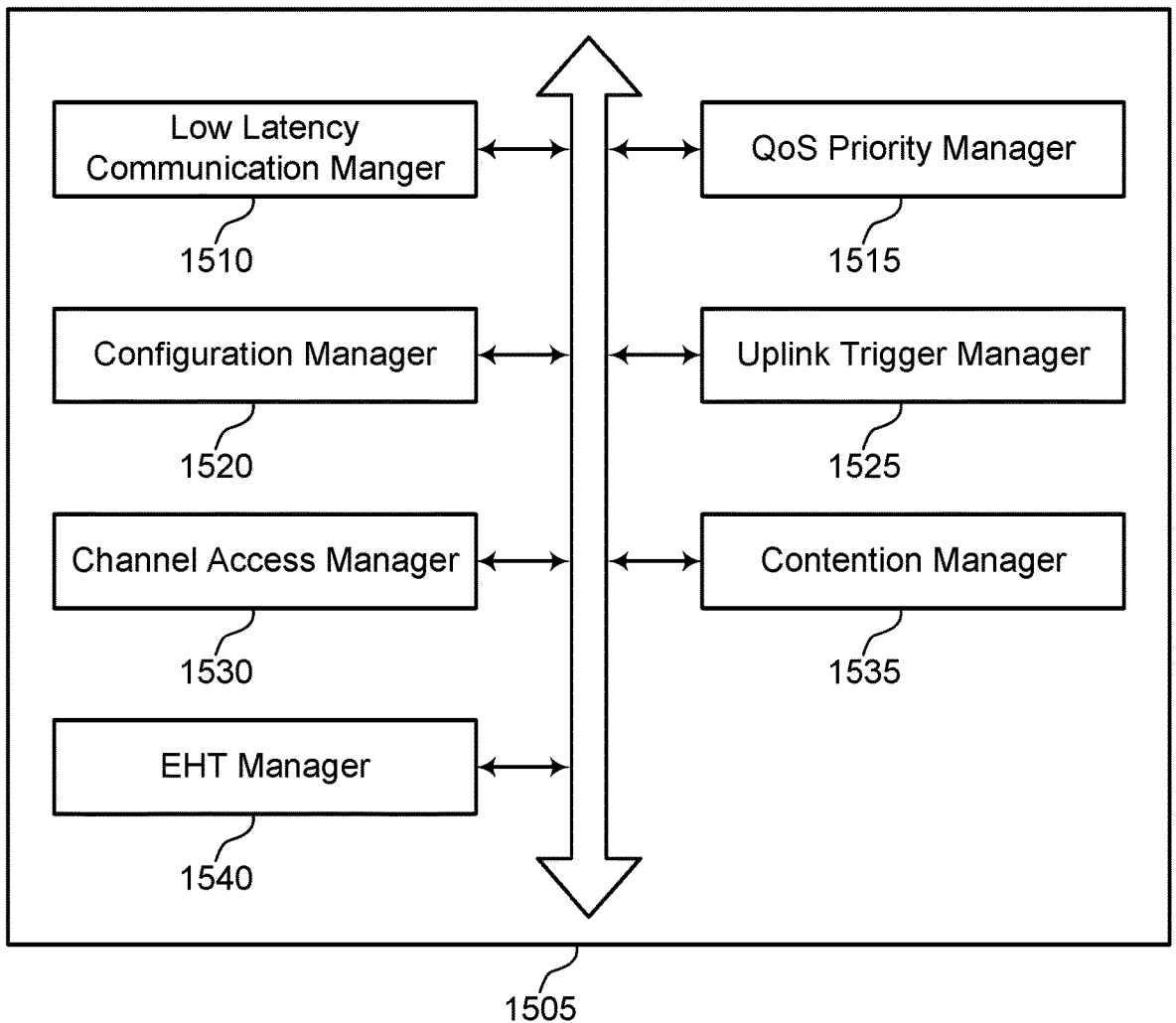
FIG. 15 shows a block diagram of a communications manager that supports techniques for low latency communications in wireless local area networks in accordance with aspects of the present disclosure.

FIG. 15 shows a block diagram of a communications manager 1505 that supports techniques for low latency communications in wireless local area networks in accordance with aspects of the present disclosure. The communications manager 1505 may be an example of aspects of a communications manager 1315, a communications manager 1415, or a communications manager 1610 described herein. The communications manager 1505 may include a low latency communication manager 1510, a QoS priority manager 1515, a configuration manager 1520, an uplink trigger manager 1525, a channel access manager 1530, a contention manager 1535, and an EHT manager 1540. Each of these modules may communicate, directly or indirectly, with one another (for example, via one or more buses).

The low latency communication manager 1510 may determine that wireless communications of data traffic associated with a predetermined QoS parameter are to be prioritized compared to other wireless communications during at least a first portion of a QoS service period. In some examples, the low latency communication manager 1510 may discard the first wireless communication based on the determining that the first wireless communication at least partially overlaps the QoS service period and based on the determining that the first wireless communication is not associated with the predetermined QoS parameter.

In some examples, the low latency communication manager 1510 may determine that a wireless communication device (for example, a first STA) is to communicate data traffic associated with a predetermined QoS parameter. In some examples, the low latency communication manager 1510 may transmit a schedule of QoS service periods for data traffic associated with the predetermined QoS parameter. In some examples, the schedule of QoS service periods is transmitted in a broadcast management frame.

In some examples, the low latency communication manager 1510 may determine that another wireless communication device (for example, a second STA) has initiated a second wireless transmission via the first channel prior to a start of the QoS service period, and that the second wireless transmission at least partially overlaps the QoS service period. In some examples, the low latency communication manager 1510 may discard the second wireless transmission based on the determining that the second wireless transmission at least partially overlaps the QoS service period.

The QoS priority manager 1515 may determine that a wireless communication device has initiated a first wireless communication that at least partially overlaps with the QoS service period, in which the first wireless communication is in conformance with a contention-based channel access procedure for initiating the first wireless communication. In some examples, the QoS priority manager 1515 may determine that the first wireless communication is not associated with the predetermined QoS parameter. In some examples, the QoS priority manager 1515 may determine that the first wireless communication at least partially overlaps the QoS service period based on a transmission end time provided in a header of the first wireless communication. In some examples, the transmission end time is provided in an L-SIG length field in the header of the first wireless communication or in a SIG-A field in the header of the first wireless communication. In some examples, the wireless communication device is associated with a device (for example, an AP, device 1305, device 1405, among other examples), and the device accesses a channel for transmitting a wireless communication having data traffic associated with the predetermined QoS parameter to another wireless communication device.

In some examples, the predetermined QoS parameter corresponds to one or more of a low latency threshold or a service priority threshold.

The configuration manager 1520 may identify an available bandwidth for wireless communications with one or more wireless communication devices (for example, STAs) and a channel bandwidth for each of a set of channels of the available bandwidth, in which a first channel of the set of channels is configured as a primary channel that is available for transmissions of the one or more wireless communication devices. In some examples, the configuration manager 1520 may transmit configuration information to one or more wireless communication devices, the configuration information including an indication that wireless communications of the one or more wireless communication devices can be discarded by the device (for example, an AP), and that a backoff counter for initiating a subsequent wireless communication from the one or more wireless communication devices can be adjusted responsive to the wireless communication being discarded.

In some examples, the configuration manager 1520 may report a BSS bandwidth that includes a bandwidth of the primary channel and a bandwidth of the one or more secondary channels. In some examples, the configuration manager 1520 may transmit an indication that the one or more secondary channels are disabled. In some examples, the configuration manager 1520 may report a reduced BSS bandwidth to the one or more wireless communication devices, the reduced BSS bandwidth corresponding to a first channel bandwidth of the primary channel. In some examples, the configuration manager 1520 may transmit an indication that the one or more secondary channels are disallowed channels in a HE operation IE.

In some examples, the configuration manager 1520 may configure one or more of the set of secondary channels as a discovery channel for EDCA contention to provide one or more discovery channels. In some examples, the indication includes an OMN that initiates an increase of a STA bandwidth to span a bandwidth of one or more of the secondary channels.

In some examples, the first channel is configured as both the primary channel and a discovery channel for EDCA contention, and in which the one or more secondary channels are unavailable for EDCA contention. In some examples, a BSS bandwidth of the device (for example, an AP) is indicated in a HE operation IE that is transmitted to the one or more wireless communication devices, the channel bandwidth of the primary channel equal to a reported BSS bandwidth.

The channel access manager 1530 may transmit a wireless communication to the wireless communication device including an indication that one or more secondary channels of the set of channels are available for wireless communications associated with the predetermined QoS parameter. In some examples, the channel access manager 1530 may perform an energy detection procedure on each of a set of channels to be used for transmission of the wireless communication having data traffic associated with the predetermined QoS parameter. In some examples, the channel access manager 1530 may suppress portions of the wireless communication having data traffic associated with the predetermined QoS parameter on at least a first channel of the set of channels responsive to a detected energy of the first channel being above a threshold value. In some examples, the wireless communication to the wireless communication device further indicates that the wireless communication device is to exclusively use the one or more secondary channels for communications with the device (for example, an AP). In some examples, the communications with the device may be contention-based communications or trigger based communications.

The uplink trigger manager 1525 may transmit an indication to the wireless communication device during the QoS service period or a subsequent TxOP to initiate a contention-free retransmission of the first wireless communication by the wireless communication device. In some examples, the uplink trigger manager 1525 may transmit a trigger to another wireless communication device (for example, a second STA) during the QoS service period or a subsequent TxOP to initiate a retransmission of a discarded wireless transmission. In some examples, the indication to the wireless communication device is a trigger frame or a reverse direction grant provided to the wireless communication device. In some examples, the indication includes a trigger to the wireless communication device that indicates the wireless communication device is to transmit using the primary channel and one or more secondary channels.

The contention manager 1535 may maintain independent EDCA backoff counters for each of a set of discovery channels. In some examples, the contention manager 1535 may maintain an EDCA backoff counter dedicated to the first channel.

In some examples, the contention manager 1535 may transmit using the one or more discovery channels during a TxOP based on an ED level of the one or more discovery channels being below a threshold ED value during an interframe space prior to the TxOP.

In some examples, the device is an extremely high throughput (EHT) AP, and in which a set of transmission streams, reception streams, or combinations thereof, are concurrently processed at the device. The EHT manager 1540 may maintain multiple independent EDCA counters for a set of transmission streams. In some examples, the EHT manager 1540 may synchronize transmission slots of the set of transmission streams, reception streams, or combinations thereof to provide a common end time. In some examples, a first subset of the set of transmission streams or reception streams provide data traffic associated with the predetermined QoS parameter via one or more secondary channels, and a second subset of the set of transmission streams or reception streams provide data traffic unassociated with the predetermined QoS parameter via one or more primary channels.

Figure 16:
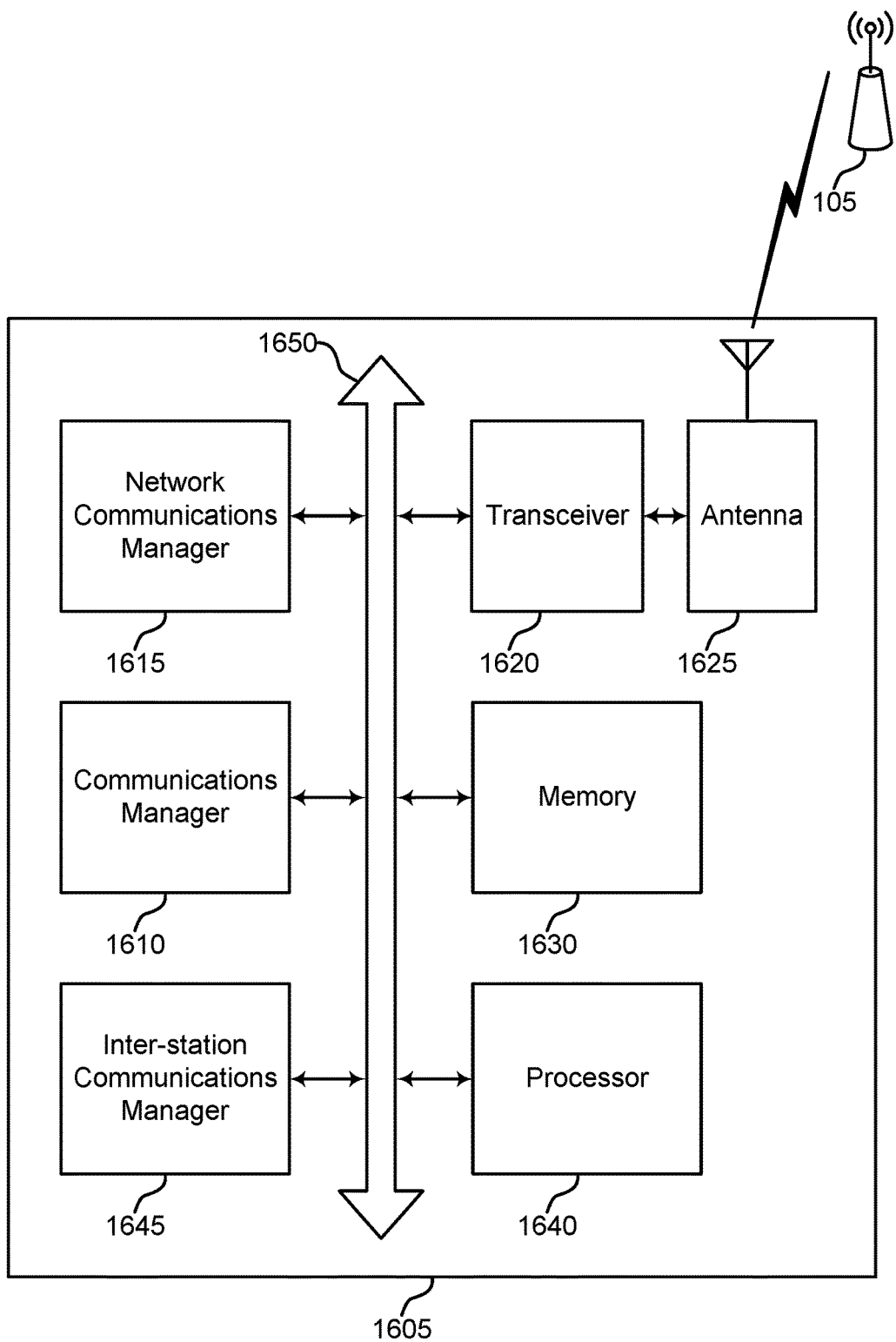
FIG. 16 shows a diagram of a system including a device that supports techniques for low latency communications in wireless local area networks in accordance with aspects of the present disclosure.

FIG. 16 shows a diagram of a system including a device 1605 that supports techniques for low latency communications in wireless local area networks in accordance with aspects of the present disclosure. The device 1605 may be an example of or include the components of device 1305, device 1405, or an AP as described herein. The device 1605 may include components for bi-directional voice and data communications including components for transmitting and receiving communications, including a communications manager 1610, a network communications manager 1615, a transceiver 1620, an antenna 1625, memory 1630, a processor 1640, and an inter-station communications manager 1645. These components may be in electronic communication via one or more buses (for example, bus 1650).

The communications manager 1610 may determine that wireless communications of data traffic associated with a predetermined QoS parameter are to be prioritized compared to other wireless communications during at least a first portion of a QoS service period, discard the first wireless communication based on the determining that the first wireless communication at least partially overlaps the QoS service period and based on the determining that the first wireless communication is not associated with the predetermined QoS parameter, determine that a wireless communication device has initiated a first wireless communication that at least partially overlaps with the QoS service period, in which the first wireless communication is in conformance with a contention-based channel access procedure for initiating the first wireless communication, and determine that the first wireless communication is not associated with the predetermined QoS parameter.

In some examples, the communications manager 1610 may also identify an available bandwidth for wireless communications with one or more wireless communication devices and a channel bandwidth for each of a set of channels of the available bandwidth, in which a first channel of the set of channels is configured as a primary channel that is available for transmissions of the one or more wireless communication devices, determine that a wireless communication device is to communicate data traffic associated with a predetermined QoS parameter, and transmit a wireless communication to the wireless communication device including an indication that one or more secondary channels of the set of channels are available for wireless communications associated with the predetermined QoS parameter.

The network communications manager 1615 may manage communications with a core network (for example, via one or more wired backhaul links). For example, the network communications manager 1615 may manage the transfer of data communications for client devices, such as one or more STAs 115.

The transceiver 1620 may communicate bi-directionally, via one or more antennas, wired, or wireless links as described above. For example, the transceiver 1620 may represent a wireless transceiver and may communicate bi-directionally with another wireless transceiver. The transceiver 1620 may also include a modem to modulate the packets and provide the modulated packets to the antennas for transmission, and to demodulate packets received from the antennas.

In some examples, the wireless device may include a single antenna 1625. However, in some examples the device may have more than one antenna 1625, which may be capable of concurrently transmitting or receiving multiple wireless transmissions.

The memory 1630 may include RAM and ROM. The memory 1630 may store computer-readable, computer-executable code 16 35 including instructions that, when executed, cause the processor to perform various functions described herein. In some examples, the memory 1630 may contain, among other things, a basic input/output system (BIOS) which may control basic hardware or software operation such as the interaction with peripheral components or devices.

The processor 1640 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1640 may be configured to operate a memory array using a memory controller. In other examples, a memory controller may be integrated into processor 1640. The processor 1640 may be configured to execute computer-readable instructions stored in a memory to perform various functions (for example, functions or tasks supporting techniques for low latency communications in wireless local area networks).

The inter-station communications manager 1645 may manage communications with other devices (for example, other APs 105) and may include a controller or scheduler for controlling communications with STAs 115.

Figure 17:
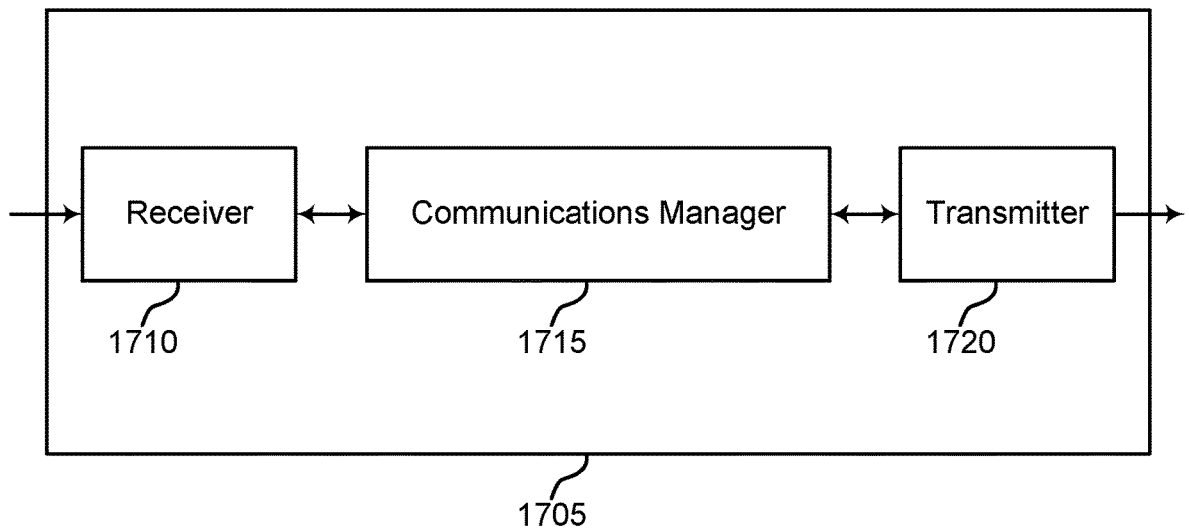
FIGS. 17 and 18 show block diagrams of devices that support techniques for low latency communications in wireless local area networks in accordance with aspects of the present disclosure.

FIG. 17 shows a block diagram of a device 1705 that supports techniques for low latency communications in wireless local area networks in accordance with aspects of the present disclosure. The device 1705 may be an example of aspects of a STA as described herein. The device 1705 may include a receiver 1710, a communications manager 1715, and a transmitter 1720. The communications manager 1715 can be implemented, at least in part, by one or both of a modem and a processor. Each of these components may be in communication with one another (for example, via one or more buses).

Receiver 1710 may receive information such as packets, user data, or control information associated with various information channels (for example, control channels, data channels, and information related to techniques for low latency communications in wireless local area networks, among other examples). Information may be passed on to other components of the device. The receiver 1710 may be an example of aspects of the transceiver 2020 described with reference to FIG. 20. The receiver 1710 may utilize a single antenna or a set of antennas.

The communications manager 1715 may receive configuration information for a contention-based channel access procedure for initiating wireless communications with a wireless communication device (for example, an AP), the configuration information indicating that one or more wireless communications to the wireless communication device that are in conformance with the contention-based channel access procedure can be discarded by the wireless communication device in favor of other wireless transmissions associated with a predetermined QoS parameter, transmit a first wireless communication to the wireless communication device during a first TxOP responsive to a successful contention-based channel access procedure, and determine that the first wireless communication is discardable by the wireless communication device.

In some examples, the communications manager 1715 may also identify a primary channel of a wireless communication device (for example, the AP), the primary channel one of a set of channels of an available bandwidth of the wireless communication device for wireless communications, transmit a first wireless communication that indicates the device 1705 has data traffic associated with a predetermined QoS parameter, and receive a second wireless communication from the wireless communication device including an indication that one or more secondary channels of the set of channels are available for wireless communications with the wireless communication device associated with the predetermined QoS parameter.

In some examples, the communications manager 1715 may also receive configuration information for a contention-based channel access procedure for initiating wireless communications with a wireless communication device, the configuration information indicating that channel access for one or more wireless communications to the wireless communication device that are in conformance with the contention-based channel access procedure can be taken over by the wireless communication device in favor of other wireless transmissions associated with a predetermined QoS parameter, transmit a RTS signal to the wireless communication device responsive to a successful contention-based channel access procedure, receive a CTS signal from the wireless communication device, and determine, based on the CTS signal, that the wireless communication device has taken over channel access. The communications manager 1715 may be an example of aspects of the communications manager 2010 described herein.

The communications manager 1715, or its sub-components, may be implemented in hardware, code (for example, software or firmware) executed by a processor, or any combination thereof. If implemented in code executed by a processor, the functions of the communications manager 1715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1715, or its sub-components, may be physically located at different locations, including being distributed such that portions of functions are implemented at different physical locations by one or more physical components. In some examples, the communications manager 1715, or its sub-components, may be a separate and distinct component in accordance with various aspects of the present disclosure. In some examples, the communications manager 1715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 1720 may transmit signals generated by other components of the device. In some examples, the transmitter 1720 may be collocated with a receiver 1710 in a transceiver module. For example, the transmitter 1720 may be an example of aspects of the transceiver 2020 described with reference to FIG. 20. The transmitter 1720 may utilize a single antenna or a set of antennas.

Figure 18:
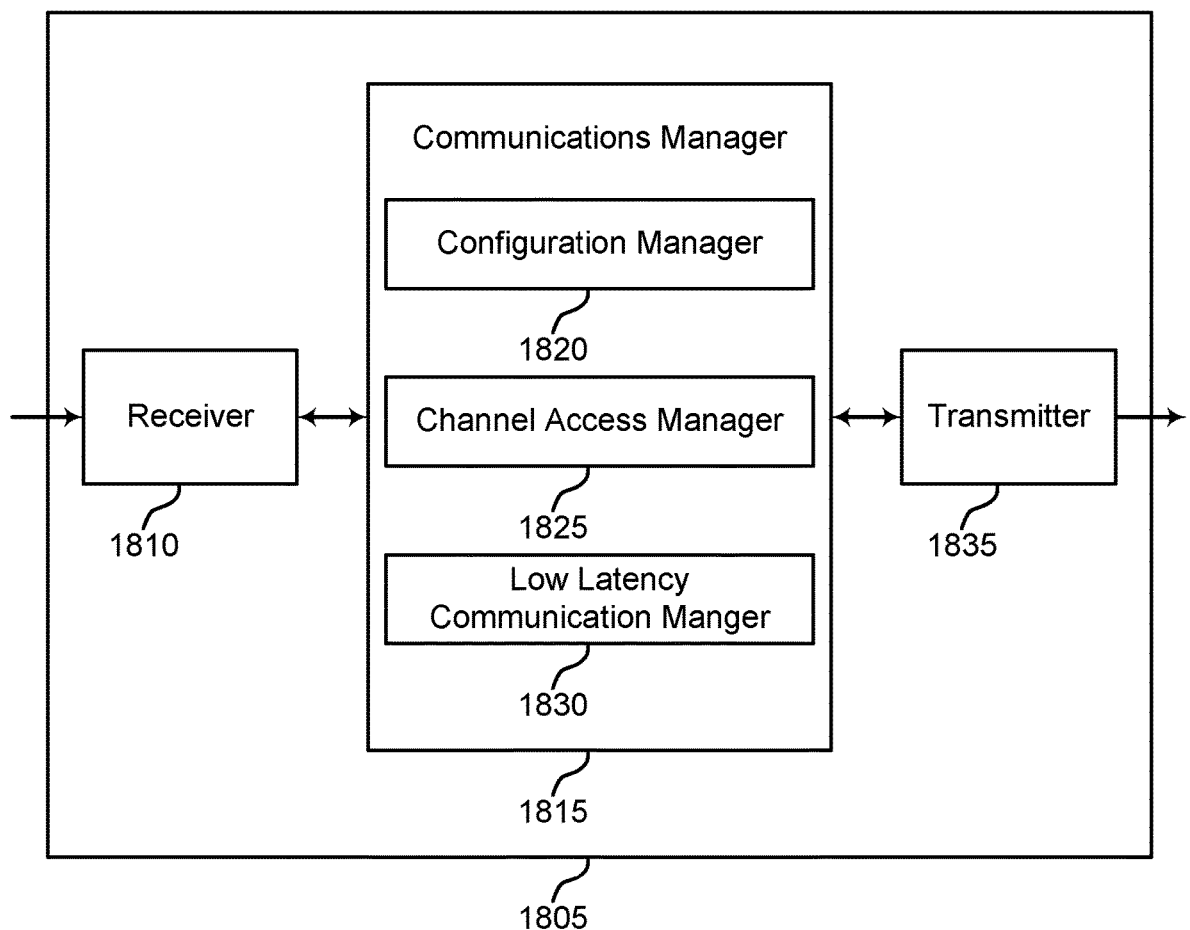

FIG. 18 shows a block diagram of a device 1805 that supports techniques for low latency communications in wireless local area networks in accordance with aspects of the present disclosure. The device 1805 may be an example of aspects of a device 1705 or a STA 115 as described herein. The device 1805 may include a receiver 1810, a communications manager 1815, and a transmitter 1835. The communications manager 1815 can be implemented, at least in part, by one or both of a modem and a processor. Each of these components may be in communication with one another (for example, via one or more buses).

Receiver 1810 may receive information such as packets, user data, or control information associated with various information channels (for example, control channels, data channels, and information related to techniques for low latency communications in wireless local area networks, among other examples). Information may be passed on to other components of the device. The receiver 1810 may be an example of aspects of the transceiver 2020 described with reference to FIG. 20. The receiver 1810 may utilize a single antenna or a set of antennas.

The communications manager 1815 may be an example of aspects of the communications manager 1715 as described herein. The communications manager 1815 may include a configuration manager 1820, a channel access manager 1825, and a low latency communication manager

1830. The communications manager 1815 may be an example of aspects of the communications manager 2010 described herein.

The configuration manager 1820 may receive configuration information for a contention-based channel access procedure for initiating wireless communications with a wireless communication device (for example, an AP), the configuration information indicating that one or more wireless communications to the wireless communication device that are in conformance with the contention-based channel access procedure can be discarded by the wireless communication device in favor of other wireless transmissions associated with a predetermined QoS parameter. In some examples, the configuration manager 1820 may identify a primary channel of a wireless communication device, the primary channel one of a set of channels of an available bandwidth of the wireless communication device for wireless communications. In some examples, the configuration manager 1820 may receive configuration information for a contention-based channel access procedure for initiating wireless communications with a wireless communication device, the configuration information indicating that channel access for one or more wireless communications to the wireless communication device that are in conformance with the contention-based channel access procedure can be taken over by the wireless communication device in favor of other wireless transmissions associated with a predetermined QoS parameter.

The channel access manager 1825 may transmit a first wireless communication to the wireless communication device during a first TxOP responsive to a successful contention-based channel access procedure. In some examples, the channel access manager 1825 may receive a second wireless communication from the wireless communication device including an indication that one or more secondary channels of the set of channels are available for wireless communications with the wireless communication device associated with the predetermined QoS parameter. In some examples, the channel access manager 1825 may transmit an RTS signal to the wireless communication device responsive to a successful contention-based channel access procedure.

The low latency communication manager 1830 may determine that the first wireless communication is discardable by the wireless communication device. In some case, the low latency communication manager 1830 may transmit a first wireless communication that indicates the device 1805 has data traffic associated with a predetermined QoS parameter. In some examples, the low latency communication manager 1830 may receive a CTS signal from the wireless communication device and determine, based on the CTS signal, that the wireless communication device has taken over channel access for at least a portion of the reserved transmit opportunity.

Transmitter 1835 may transmit signals generated by other components of the device. In some examples, the transmitter 1835 may be collocated with a receiver 1810 in a transceiver module. For example, the transmitter 1835 may be an example of aspects of the transceiver 2020 described with reference to FIG. 20. The transmitter 1835 may utilize a single antenna or a set of antennas.

Figure 19:
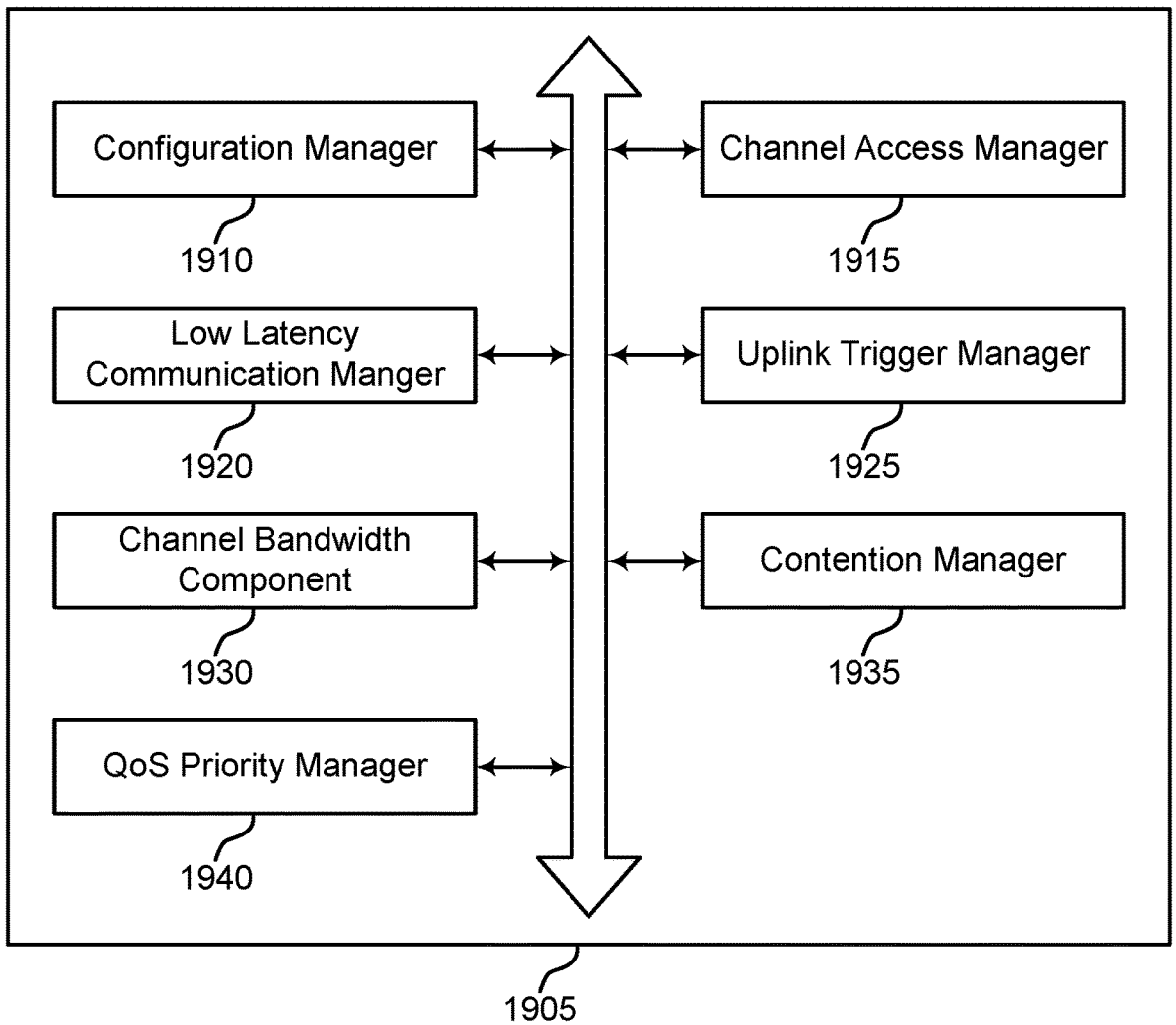
FIG. 19 shows a block diagram of a communications manager that supports techniques for low latency communications in wireless local area networks in accordance with aspects of the present disclosure.

FIG. 19 shows a block diagram of a communications manager 1905 that supports techniques for low latency communications in wireless local area networks in accordance with aspects of the present disclosure. The communications manager 1905 may be an example of aspects of a communications manager 1715, a communications manager 1815, or a communications manager 2010 described herein. The communications manager 1905 may include a configuration manager 1910, a channel access manager 1915, a low latency communication manager 1920, an uplink trigger manager 1925, a channel bandwidth component 1930, a contention manager 1935, and a QoS priority manager 1940. Each of these modules may communicate, directly or indirectly, with one another (for example, via one or more buses).

The configuration manager 1910 may receive configuration information for a contention-based channel access procedure for initiating wireless communications with a wireless communication device (for example, an AP), the configuration information indicating that one or more wireless communications to the wireless communication device that are in conformance with the contention-based channel access procedure can be discarded by the wireless communication device in favor of other wireless transmissions associated with a predetermined QoS parameter. In some examples, the configuration manager 1910 may identify a primary channel of a wireless communication device, the primary channel one of a set of channels of an available bandwidth of the wireless communication device for wireless communications.

In some examples, the configuration manager 1910 may receive configuration information for a contention-based channel access procedure for initiating wireless communications with a wireless communication device, the configuration information indicating that channel access for one or more wireless communications to the wireless communication device that are in conformance with the contention-based channel access procedure can be taken over by the wireless communication device in favor of other wireless transmissions associated with a predetermined QoS parameter.

In some examples, at least one secondary channel of the one or more secondary channels is a discovery channel for EDCA contention. In some examples, the set of channels includes a set of discovery channels, the method further including maintaining independent EDCA backoff counters for each of the set of discovery channels.

The channel access manager 1915 may transmit a first wireless communication to the wireless communication device during a first TxOP responsive to a successful contention-based channel access procedure. In some examples, the channel access manager 1915 may receive a second wireless communication from the wireless communication device including an indication that one or more secondary channels of the set of channels are available for wireless communications with the wireless communication device associated with the predetermined QoS parameter.

In some examples, the channel access manager 1915 may transmit an RTS signal to the wireless communication device responsive to a successful contention-based channel access procedure.

In some examples, the channel access manager 1915 may access the channel is based on a contention-based mechanism. In some examples, the channel access manager 1915 may adjust a contention window backoff counter for initiating a subsequent wireless communication to the wireless communication device based on determining that the first wireless communication is discarded by the wireless communication device, in which the contention window backoff counter is maintained at or reduced from a prior contention window backoff counter used for the first wireless communication.

In some examples, the channel access manager 1915 may provide the wireless communication device with a transmission end time for the first wireless communication in an L-SIG length field in a PHY header of the first wireless communication or a TxOP duration in a SIG-A field in the PHY header of the first wireless communication, in which the TxOP duration indicates an end of a duration of time that the a device (for example, a STA, a device 1705, a device 1805, among other examples) reserves for one or more wireless communications. In some examples, the transmission end time is provided in any other received portion of the first wireless communication.

In some examples, the channel access manager 1915 may identify that the available bandwidth includes a bandwidth of the primary channel and a bandwidth of the one or more secondary channels. In some examples, the channel access manager 1915 may receive an indication that the one or more secondary channels are disabled.

In some examples, the channel access manager 1915 may transmit a second transmission to the wireless communication device on the primary channel, the second transmission being unassociated with the predetermined QoS parameter. In some examples, the second wireless communication further indicates that the device (for example, a STA, a device 1705, a device 1805, among other examples) is to exclusively use the one or more secondary channels for communications with the wireless communication device. In some examples, the communications with the wireless communication device may be contention-based communications or trigger based communications.

The low latency communication manager 1920 may determine that the first wireless communication is discardable by the wireless communication device.

In some examples, the low latency communication manager 1920 may transmit a first wireless communication that indicates the device (for example, a STA, a device 1705, a device 1805, among other examples) has data traffic associated with a predetermined QoS parameter.

In some examples, the low latency communication manager 1920 may receive a CTS signal from the wireless communication device. In some examples, the low latency communication manager 1920 may determine based on the CTS signal, that the wireless communication device has taken over channel access for at least a portion of the reserved transmit opportunity. In some examples, the determining is based on a RA provided with the CTS signal is an AP RA.

In some examples, the low latency communication manager 1920 may receive a schedule of QoS service periods for data traffic associated with the predetermined QoS parameter. In some examples, the low latency communication manager 1920 may determine that the first wireless communication is discardable by the second wireless communication device based on the schedule. In some examples, the low latency communication manager 1920 may determine that the first wireless communication at least partially overlaps with at least a portion of a first QoS service period. In some examples, the low latency communication manager 1920 may determine that an acknowledgment of the first wireless communication is not received from the wireless communication device. In some examples, the low latency communication manager 1920 may determine that the second transmission is discarded by the wireless communication device.

The uplink trigger manager 1925 may receive a trigger during the first TxOP or during a subsequent TxOP to initiate at least a retransmission of the first wireless communication to the wireless communication device. In some examples, the uplink trigger manager 1925 may receive a trigger during the TxOP or a subsequent TxOP to initiate a retransmission of the second transmission to the wireless communication device. In some examples, the indication includes a trigger to the device (for example, a STA, a device 1705, a device 1805, among other examples) that indicates the device (for example, a STA, a device 1705, a device 1805, among other examples) is to transmit using the primary channel and one or more secondary channels.

The channel bandwidth component 1930 may receive a report of a BSS bandwidth of the wireless communication device (for example, an AP bandwidth) in a HE operation IE, a channel bandwidth of the primary channel equal to a reported BSS bandwidth. In some examples, the indication includes an OMN that initiates an increase of a bandwidth to the device (for example, a STA, a device 1705, a device 1805, among other examples) to span a bandwidth of one or more of the secondary channels.

The contention manager 1935 may maintain an EDCA backoff counter dedicated to the primary channel. In some examples, the contention manager 1935 may transmit using one or more of the discovery channels during a TxOP based on an ED level of the one or more of the discovery channels being below a threshold ED value during an interframe space prior to the TxOP.

In some examples, the contention manager 1935 may adjust a backoff counter based on a transmission being discarded. In some examples, the contention manager 1935 may adjust a contention window backoff counter for initiating a subsequent wireless communication to the wireless communication device based on determining that the wireless communication device has taken over channel access, in which the contention window backoff counter is maintained at or reduced from a prior contention window backoff counter used for transmitting the RTS signal.

Figure 20:
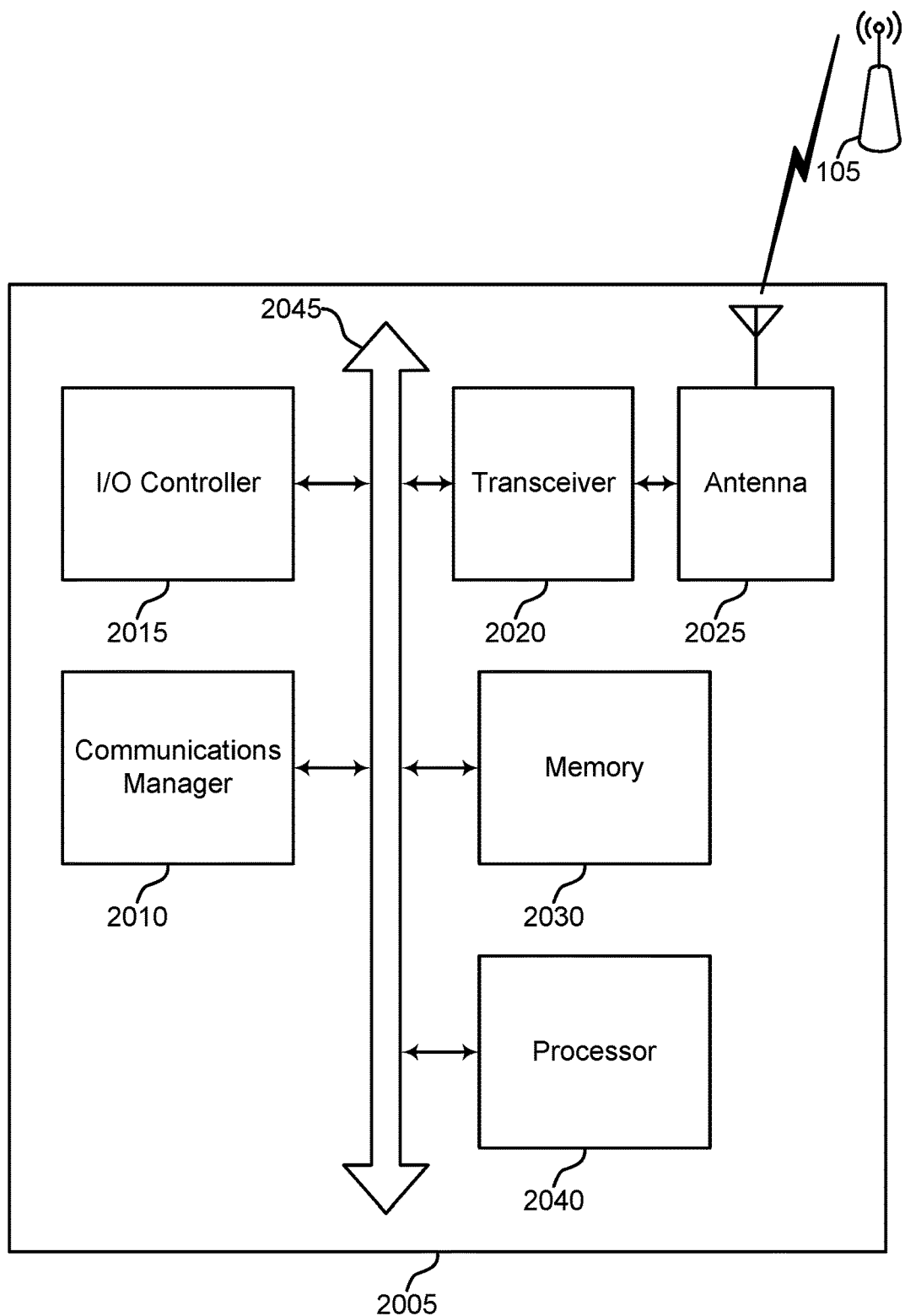
FIG. 20 shows a diagram of a system including a device that supports techniques for low latency communications in wireless local area networks in accordance with aspects of the present disclosure.

FIG. 20 shows a diagram of a system including a device 2005 that supports techniques for low latency communications in wireless local area networks in accordance with aspects of the present disclosure. The device 2005 may be an example of or include the components of device 1705, device 1805, or a STA as described herein. The device 2005 may include components for bi-directional voice and data communications including components for transmitting and receiving communications, including a communications manager 2010, an I/O controller 2015, a transceiver 2020, an antenna 2025, memory 2030, and a processor 2040. These components may be in electronic communication via one or more buses (for example, bus 2045).

The communications manager 2010 may receive configuration information for a contention-based channel access procedure for initiating wireless communications with an wireless communication device, the configuration information indicating that one or more wireless communications to the wireless communication device that are in conformance with the contention-based channel access procedure can be discarded by the wireless communication device in favor of other wireless transmissions associated with a predetermined QoS parameter, transmit a first wireless communication to the wireless communication device during a first TxOP responsive to a successful contention-based channel access procedure, and determine that the first wireless communication is discardable by the wireless communication device.

In some examples, the communications manager 2010 may also identify a primary channel of an wireless communication device, the primary channel one of a set of channels of an available bandwidth of the wireless communication device for wireless communications, transmit a first wireless communication that indicates the device 2005 has data traffic associated with a predetermined QoS parameter, and receive a second wireless communication from the wireless communication device including an indication that one or more secondary channels of the set of channels are available for wireless communications with the wireless communication device associated with the predetermined QoS parameter.

In some examples, the communications manager 2010 may also receive configuration information for a contention-based channel access procedure for initiating wireless communications with an wireless communication device, the configuration information indicating that channel access for one or more wireless communications to the wireless communication device that are in conformance with the contention-based channel access procedure can be taken over by the wireless communication device in favor of other wireless transmissions associated with a predetermined QoS parameter, transmit a RTS signal to the wireless communication device responsive to a successful contention-based channel access procedure, receive a CTS signal from the wireless communication device, and determine, by the device 2005 based on the CTS signal, that the wireless communication device has taken over channel access for at least a portion of the reserved transmit opportunity.

I/O controller 2015 may manage input and output signals for device 2005. I/O controller 2015 may also manage peripherals not integrated into device 2005. In some examples, I/O controller 2015 may represent a physical connection or port to an external peripheral. In some examples, I/O controller 2015 may utilize an operating system such as iOS®, ANDROID®, MS-DOS®, MS-WINDOWS®, OS/2®, UNIX®, LINUX®, or another known operating system. In other examples, I/O controller 2015 may represent or interact with a modem, a keyboard, a mouse, a touchscreen, or a similar device. In some examples, I/O controller 2015 may be implemented as part of a processor. In some examples, a user may interact with device 2005 via I/O controller 2015 or via hardware components controlled by I/O controller 2015.

Transceiver 2020 may communicate bi-directionally, via one or more antennas, wired, or wireless links as described above. For example, the transceiver 2020 may represent a wireless transceiver and may communicate bi-directionally with another wireless transceiver. The transceiver 2020 may also include a modem to modulate the packets and provide the modulated packets to the antennas for transmission, and to demodulate packets received from the antennas.

In some examples, the wireless device may include a single antenna 2025. However, in some examples the device may have more than one antenna 2025, which may be capable of concurrently transmitting or receiving multiple wireless transmissions.

Memory 2030 may include RAM and ROM. The memory 2030 may store computer-readable, computer-executable software 2035 including instructions that, when executed, cause the processor to perform various functions described herein. In some examples, the memory 2030 may contain, among other things, a BIOS which may control basic hardware or software operation such as the interaction with peripheral components or devices.

Processor 2040 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some examples, processor 2040 may be configured to operate a memory array using a memory controller. In other examples, a memory controller may be integrated into processor 2040. Processor 2040 may be configured to execute computer-readable instructions stored in a memory to perform various functions (for example, functions or tasks supporting techniques for low latency communications in wireless local area networks).

Figure 21:
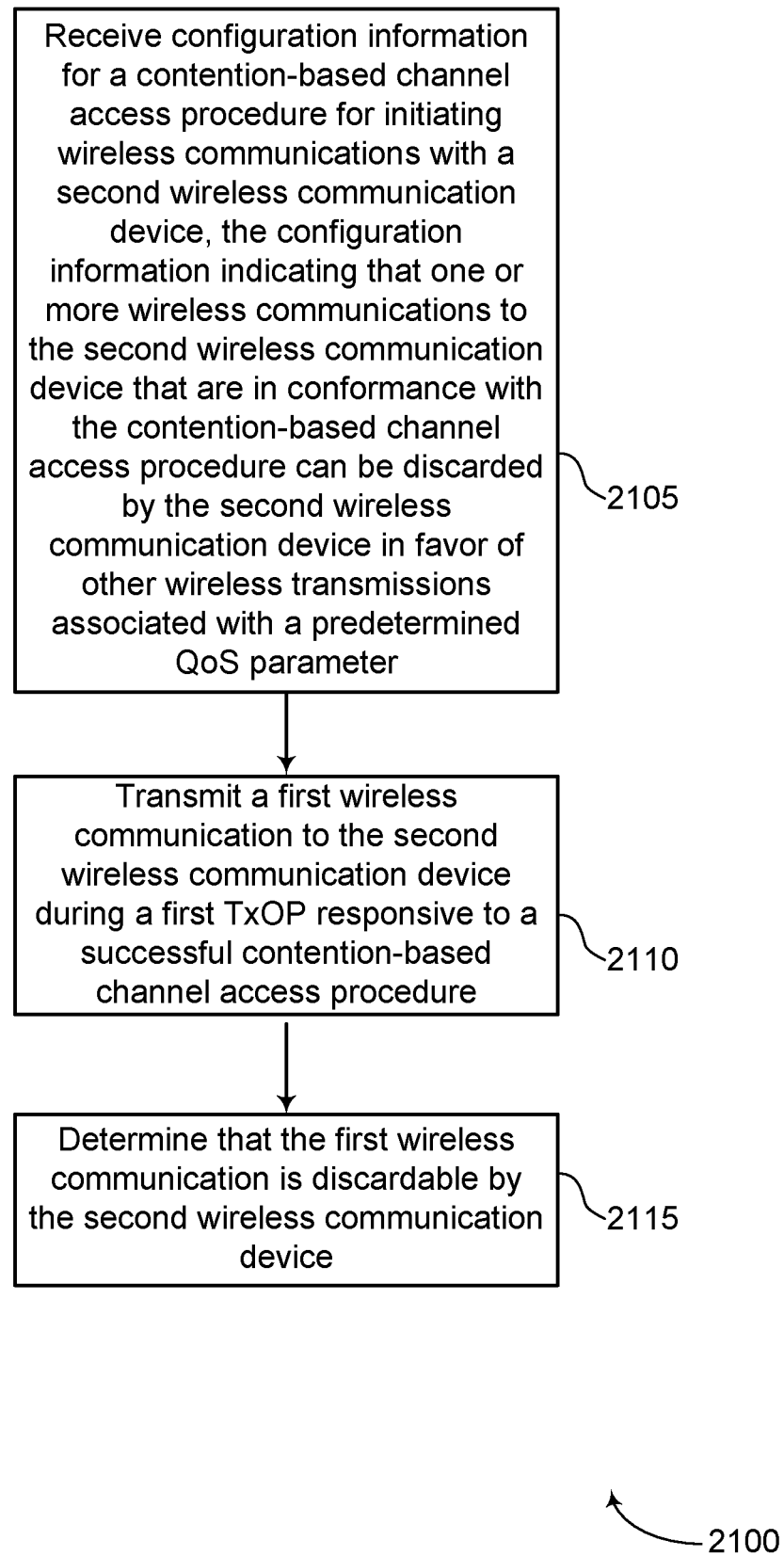
FIGS. 21 through 27 show flowcharts illustrating methods that support techniques for low latency communications in wireless local area networks in accordance with aspects of the present disclosure.

FIG. 21 shows a flowchart illustrating a method 2100 that supports techniques for low latency communications in wireless local area networks in accordance with aspects of the present disclosure. The operations of method 2100 may be implemented by a STA or its components as described herein. For example, the operations of method 2100 may be performed by a communications manager as described with reference to FIGS. 17-20. In some examples, a first wireless communication device (for example, a STA) may execute a set of instructions to control the functional elements of the first wireless communication device to perform the functions described below. Additionally or alternatively, a first wireless communication device may perform aspects of the functions described below using special-purpose hardware.

At 2105, the first wireless communication device may receive configuration information for a contention-based channel access procedure for initiating wireless communications with a second wireless communication device (for example, a AP), the configuration information indicating that one or more wireless communications to the second wireless communication device that are in conformance with the contention-based channel access procedure can be discarded by the second wireless communication device in favor of other wireless transmissions associated with a predetermined QoS parameter. The operations of 2105 may be performed according to the methods described herein. In some examples, aspects of the operations of 2105 may be performed by a configuration manager as described with reference to FIGS. 17-20.

At 2110, the first wireless communication device may transmit a first wireless communication to the second wireless communication device during a first TxOP responsive to a successful contention-based channel access procedure. The operations of 2110 may be performed according to the methods described herein. In some examples, aspects of the operations of 2110 may be performed by a channel access manager as described with reference to FIGS. 17-20.

At 2115, the first wireless communication device may determine that the first wireless communication is discardable by the second wireless communication device. The operations of 2115 may be performed according to the methods described herein. In some examples, aspects of the operations of 2115 may be performed by a low latency communication manager as described with reference to FIGS. 17-20.

Figure 22:
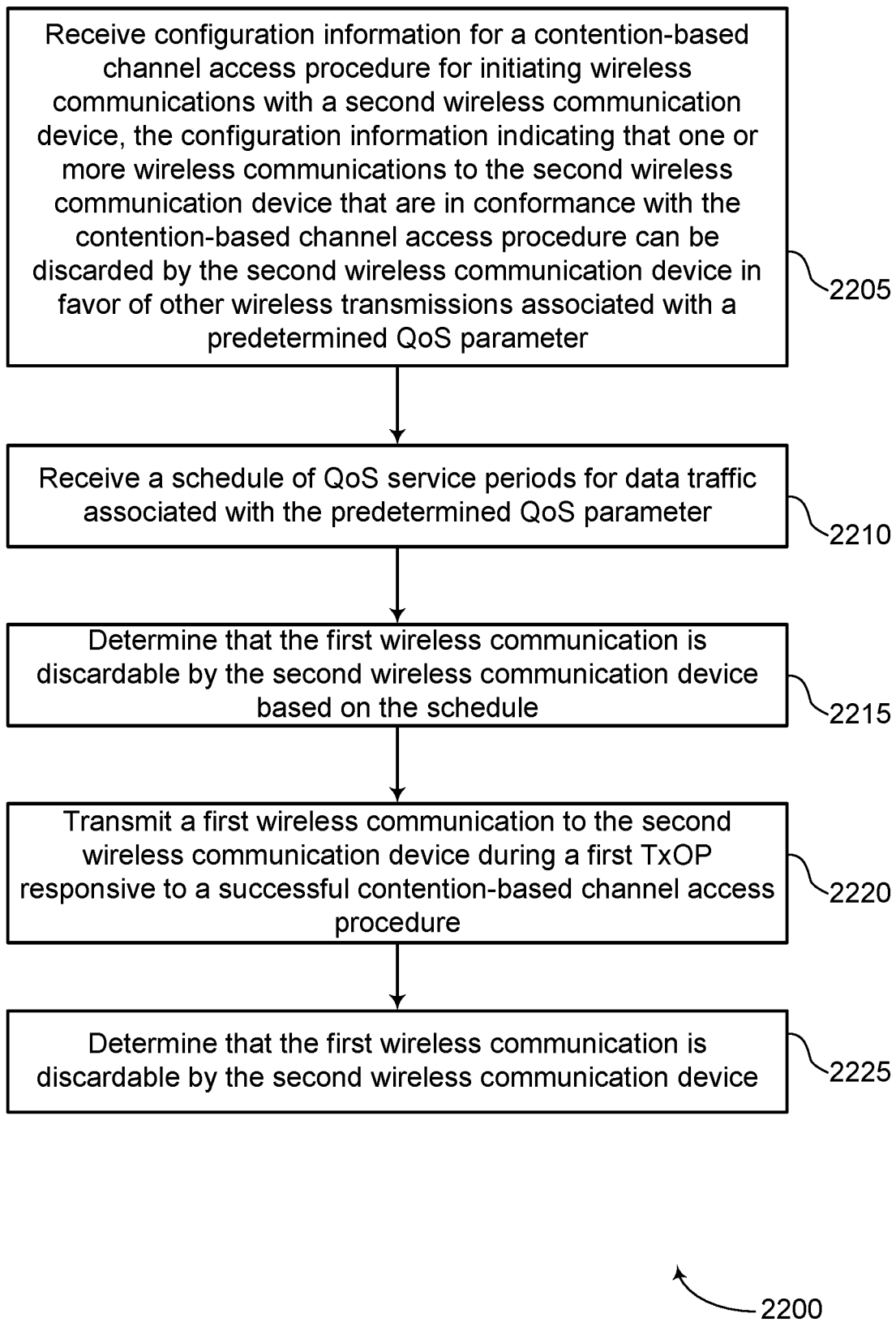

FIG. 22 shows a flowchart illustrating a method 2200 that supports techniques for low latency communications in wireless local area networks in accordance with aspects of the present disclosure. The operations of method 2200 may be implemented by a STA or its components as described herein. For example, the operations of method 2200 may be performed by a communications manager as described with reference to FIGS. 17-20. In some examples, a first wireless communication device (for example, a STA) may execute a set of instructions to control the functional elements of the first wireless communication device to perform the functions described below. Additionally or alternatively, a first wireless communication device may perform aspects of the functions described below using special-purpose hardware.

At 2205, the first wireless communication device may receive configuration information for a contention-based channel access procedure for initiating wireless communications with a second wireless communication device (for example, a AP), the configuration information indicating that one or more wireless communications to the second wireless communication device that are in conformance with the contention-based channel access procedure can be discarded by the second wireless communication device in favor of other wireless transmissions associated with a predetermined QoS parameter. The operations of 2205 may be performed according to the methods described herein. In some examples, aspects of the operations of 2205 may be performed by a configuration manager as described with reference to FIGS. 17-20.

At 2210, the first wireless communication device may receive a schedule of QoS service periods for data traffic associated with the predetermined QoS parameter. The operations of 2210 may be performed according to the methods described herein. In some examples, aspects of the operations of 2210 may be performed by a low latency communication manager as described with reference to FIGS. 17-20.

At 2215, the first wireless communication device may determine that the first wireless communication is discardable by the second wireless communication device based on the schedule. The operations of 2215 may be performed according to the methods described herein. In some examples, aspects of the operations of 2215 may be performed by a low latency communication manager as described with reference to FIGS. 17-20.

At 2220, the first wireless communication device may transmit a first wireless communication to the second wireless communication device during a first TxOP responsive to a successful contention-based channel access procedure. The operations of 2220 may be performed according to the methods described herein. In some examples, aspects of the operations of 2220 may be performed by a channel access manager as described with reference to FIGS. 17-20.

At 2225, the first wireless communication device may determine that the first wireless communication is discardable by the second wireless communication device. The operations of 2225 may be performed according to the methods described herein. In some examples, aspects of the operations of 2225 may be performed by a low latency communication manager as described with reference to FIGS. 17-20.

Figure 23:
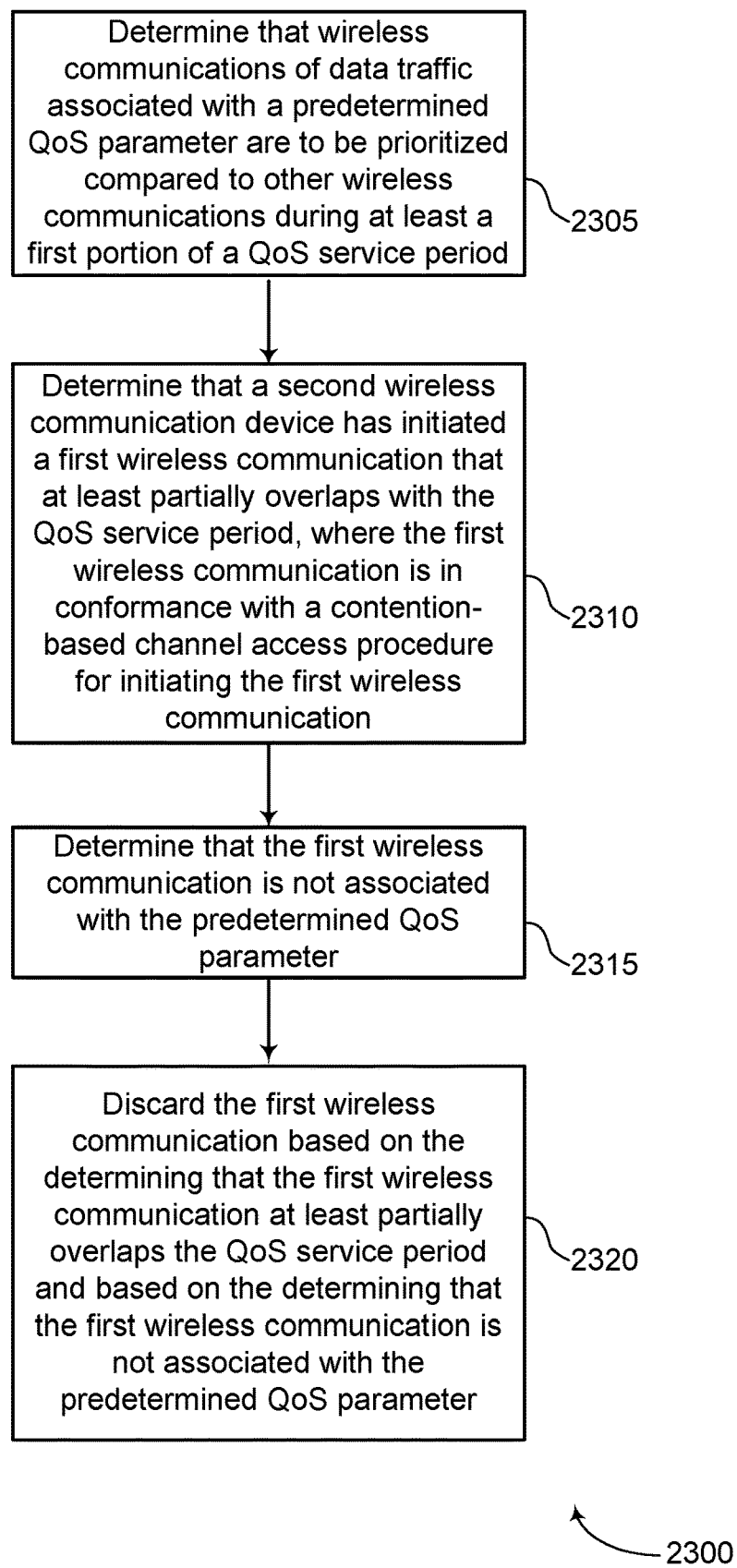

FIG. 23 shows a flowchart illustrating a method 2300 that supports techniques for low latency communications in wireless local area networks in accordance with aspects of the present disclosure. The operations of method 2300 may be implemented by an AP or its components as described herein. For example, the operations of method 2300 may be performed by a communications manager as described with reference to FIGS. 13-16. In some examples, a first wireless communication device (for example, an AP) may execute a set of instructions to control the functional elements of the first wireless communication device to perform the functions described below. Additionally or alternatively, a first wireless communication device may perform aspects of the functions described below using special-purpose hardware.

At 2305, the first wireless communication device may determine that wireless communications of data traffic associated with a predetermined QoS parameter are to be prioritized compared to other wireless communications during at least a first portion of a QoS service period. The operations of 2305 may be performed according to the methods described herein. In some examples, aspects of the operations of 2305 may be performed by a low latency communication manager as described with reference to FIGS. 13-16.

At 2310, the first wireless communication device may determine that a second wireless communication device has initiated a first wireless communication that at least partially overlaps with the QoS service period, in which the first wireless communication is in conformance with a contention-based channel access procedure for initiating the first wireless communication. The operations of 2310 may be performed according to the methods described herein. In some examples, aspects of the operations of 2310 may be performed by a QoS priority manager as described with reference to FIGS. 13-16.

At 2315, the first wireless communication device may determine that the first wireless communication is not associated with the predetermined QoS parameter. The operations of 2315 may be performed according to the methods described herein. In some examples, aspects of the operations of 2315 may be performed by a QoS priority manager as described with reference to FIGS. 13-16.

At 2320, the first wireless communication device may discard the first wireless communication based on the determining that the first wireless communication at least partially overlaps the QoS service period and based on the determining that the first wireless communication is not associated with the predetermined QoS parameter. The operations of 2320 may be performed according to the methods described herein. In some examples, aspects of the operations of 2320 may be performed by a low latency communication manager as described with reference to FIGS. 13-16.

Figure 24:
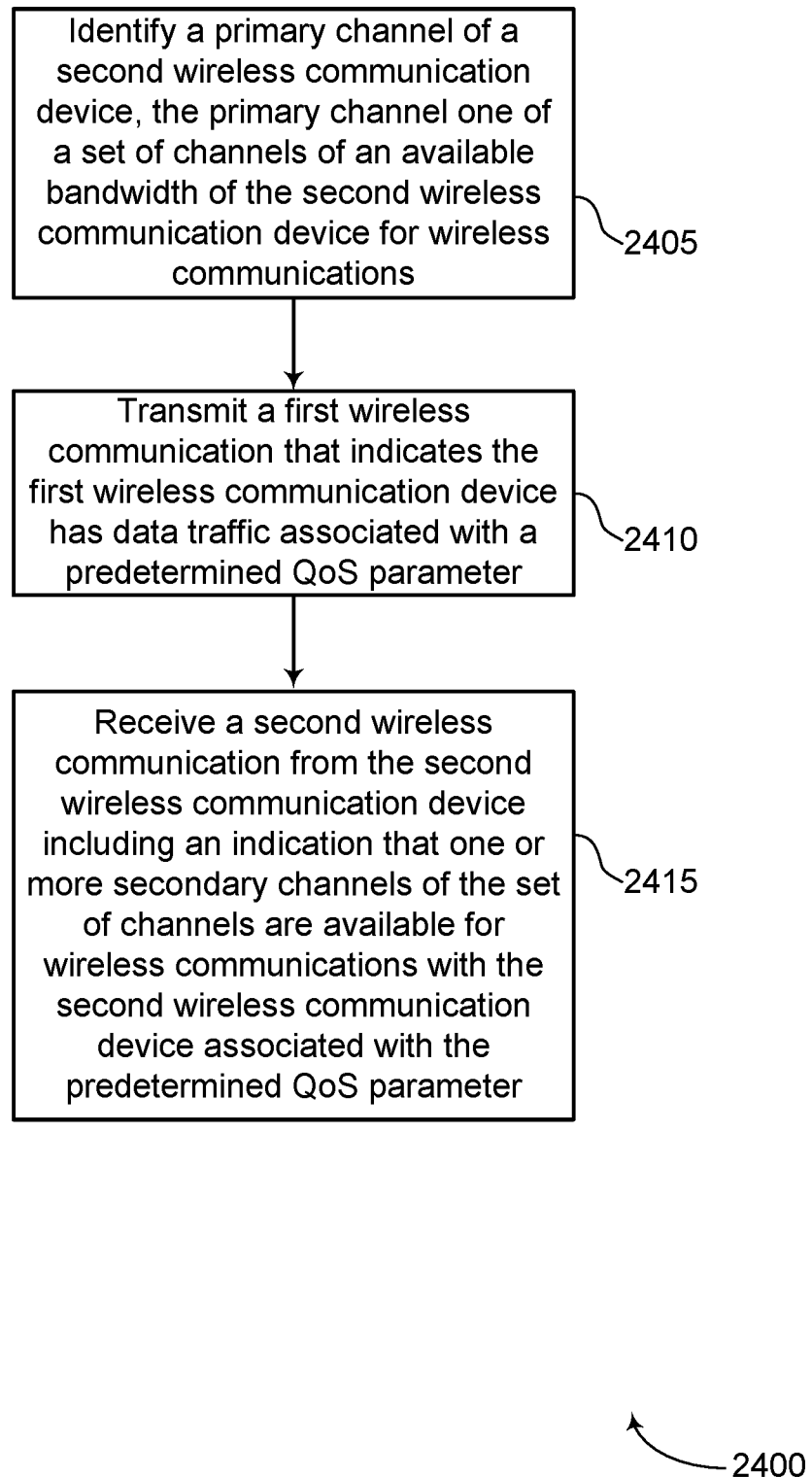

FIG. 24 shows a flowchart illustrating a method 2400 that supports techniques for low latency communications in wireless local area networks in accordance with aspects of the present disclosure. The operations of method 2400 may be implemented by a STA or its components as described herein. For example, the operations of method 2400 may be performed by a communications manager as described with reference to FIGS. 17-20. In some examples, a first wireless communication device (for example, a STA) may execute a set of instructions to control the functional elements of the first wireless communication device to perform the functions described below. Additionally or alternatively, a first wireless communication device may perform aspects of the functions described below using special-purpose hardware.

At 2405, the first wireless communication device may identify a primary channel of a second wireless communication device, the primary channel one of a set of channels of an available bandwidth of the second wireless communication device for wireless communications. The operations of 2405 may be performed according to the methods described herein. In some examples, aspects of the operations of 2405 may be performed by a configuration manager as described with reference to FIGS. 17-20.

At 2410, the first wireless communication device may transmit a first wireless communication that indicates the first wireless communication device has data traffic associated with a predetermined QoS parameter. The operations of 2410 may be performed according to the methods described herein. In some examples, aspects of the operations of 2410 may be performed by a low latency communication manager as described with reference to FIGS. 17-20.

At 2415, the first wireless communication device may receive a second wireless communication from the second wireless communication device including an indication that one or more secondary channels of the set of channels are available for wireless communications with the second wireless communication device associated with the predetermined QoS parameter. The operations of 2415 may be performed according to the methods described herein. In some examples, aspects of the operations of 2415 may be performed by a channel access manager as described with reference to FIGS. 17-20.

Figure 25:
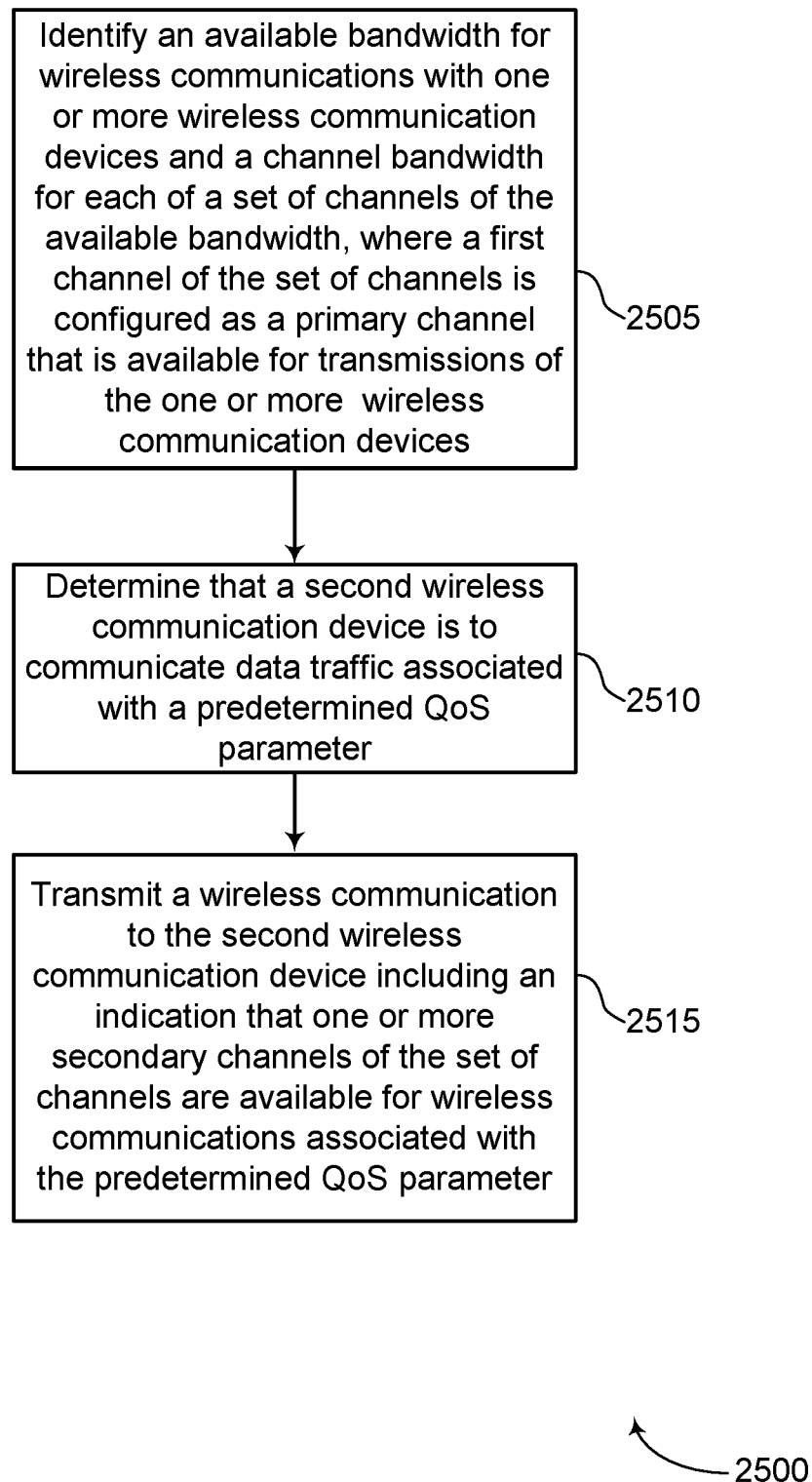

FIG. 25 shows a flowchart illustrating a method 2500 that supports techniques for low latency communications in wireless local area networks in accordance with aspects of the present disclosure. The operations of method 2500 may be implemented by an AP or its components as described herein. For example, the operations of method 2500 may be performed by a communications manager as described with reference to FIGS. 13-16. In some examples, a first wireless communication device (for example, an AP) may execute a set of instructions to control the functional elements of the first wireless communication device to perform the functions described below. Additionally or alternatively, a first wireless communication device may perform aspects of the functions described below using special-purpose hardware.

At 2505, the first wireless communication device may identify an available bandwidth for wireless communications with one or more wireless communication devices and a channel bandwidth for each of a set of channels of the available bandwidth, in which a first channel of the set of channels is configured as a primary channel that is available for transmissions of the one or more wireless communication devices. The operations of 2505 may be performed according to the methods described herein. In some examples, aspects of the operations of 2505 may be performed by a configuration manager as described with reference to FIGS. 13-16.

At 2510, the first wireless communication device may determine that a second wireless communication device is to communicate data traffic associated with a predetermined QoS parameter. The operations of 2510 may be performed according to the methods described herein. In some examples, aspects of the operations of 2510 may be performed by a low latency communication manager as described with reference to FIGS. 13-16.

At 2515, the first wireless communication device may transmit a wireless communication to the second wireless communication device including an indication that one or more secondary channels of the set of channels are available for wireless communications associated with the predetermined QoS parameter. The operations of 2515 may be performed according to the methods described herein. In some examples, aspects of the operations of 2515 may be performed by a channel access manager as described with reference to FIGS. 13-16.

Figure 26:
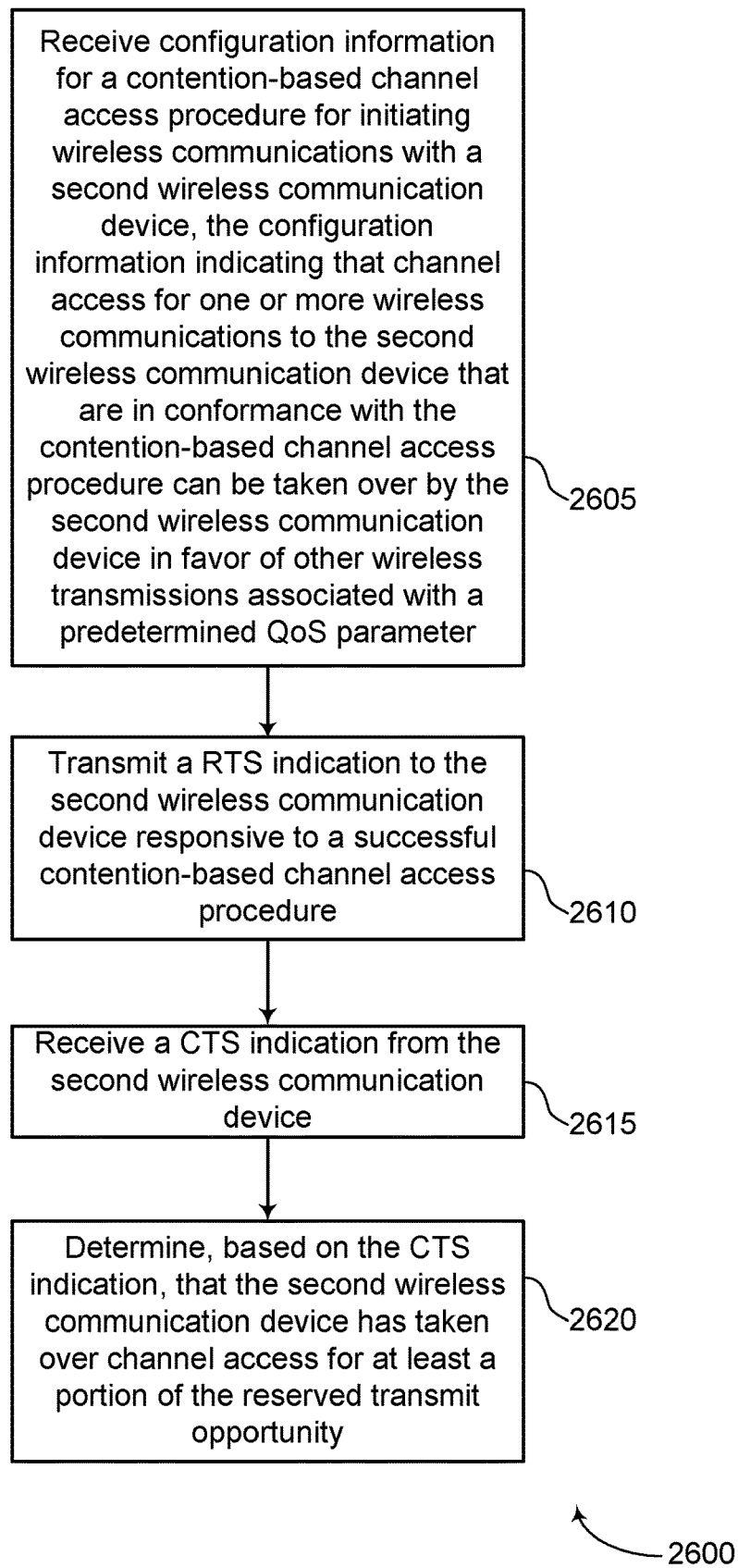

FIG. 26 shows a flowchart illustrating a method 2600 that supports techniques for low latency communications in wireless local area networks in accordance with aspects of the present disclosure. The operations of method 2600 may be implemented by a STA or its components as described herein. For example, the operations of method 2600 may be performed by a communications manager as described with reference to FIGS. 17-20. In some examples, a first wireless communication device (for example, a STA) may execute a set of instructions to control the functional elements of the first wireless communication device to perform the functions described below. Additionally or alternatively, a first wireless communication device may perform aspects of the functions described below using special-purpose hardware.

At 2605, the first wireless communication device may receive configuration information for a contention-based channel access procedure for initiating wireless communications with a second wireless communication device (for example, a AP), the configuration information indicating that channel access for one or more wireless communications to the second wireless communication device that are in conformance with the contention-based channel access procedure can be taken over by the second wireless communication device in favor of other wireless transmissions associated with a predetermined QoS parameter. The operations of 2605 may be performed according to the methods described herein. In some examples, aspects of the operations of 2605 may be performed by a configuration manager as described with reference to FIGS. 17-20.

At 2610, the first wireless communication device may transmit an RTS signal to the second wireless communication device responsive to a successful contention-based channel access procedure. The operations of 2610 may be performed according to the methods described herein. In some examples, aspects of the operations of 2610 may be performed by a channel access manager as described with reference to FIGS. 17-20.

At 2615, the first wireless communication device may receive a CTS signal from the second wireless communication device. The operations of 2615 may be performed according to the methods described herein. In some examples, aspects of the operations of 2615 may be performed by a low latency communication manager as described with reference to FIGS. 17-20.

At 2620, the first wireless communication device may determine, by the first wireless communication device based on the CTS signal, that the second wireless communication device has taken over channel access for at least a portion of the reserved transmit opportunity. The operations of 2620 may be performed according to the methods described herein. In some examples, aspects of the operations of 2620 may be performed by a low latency communication manager as described with reference to FIGS. 17-20.

Figure 27:
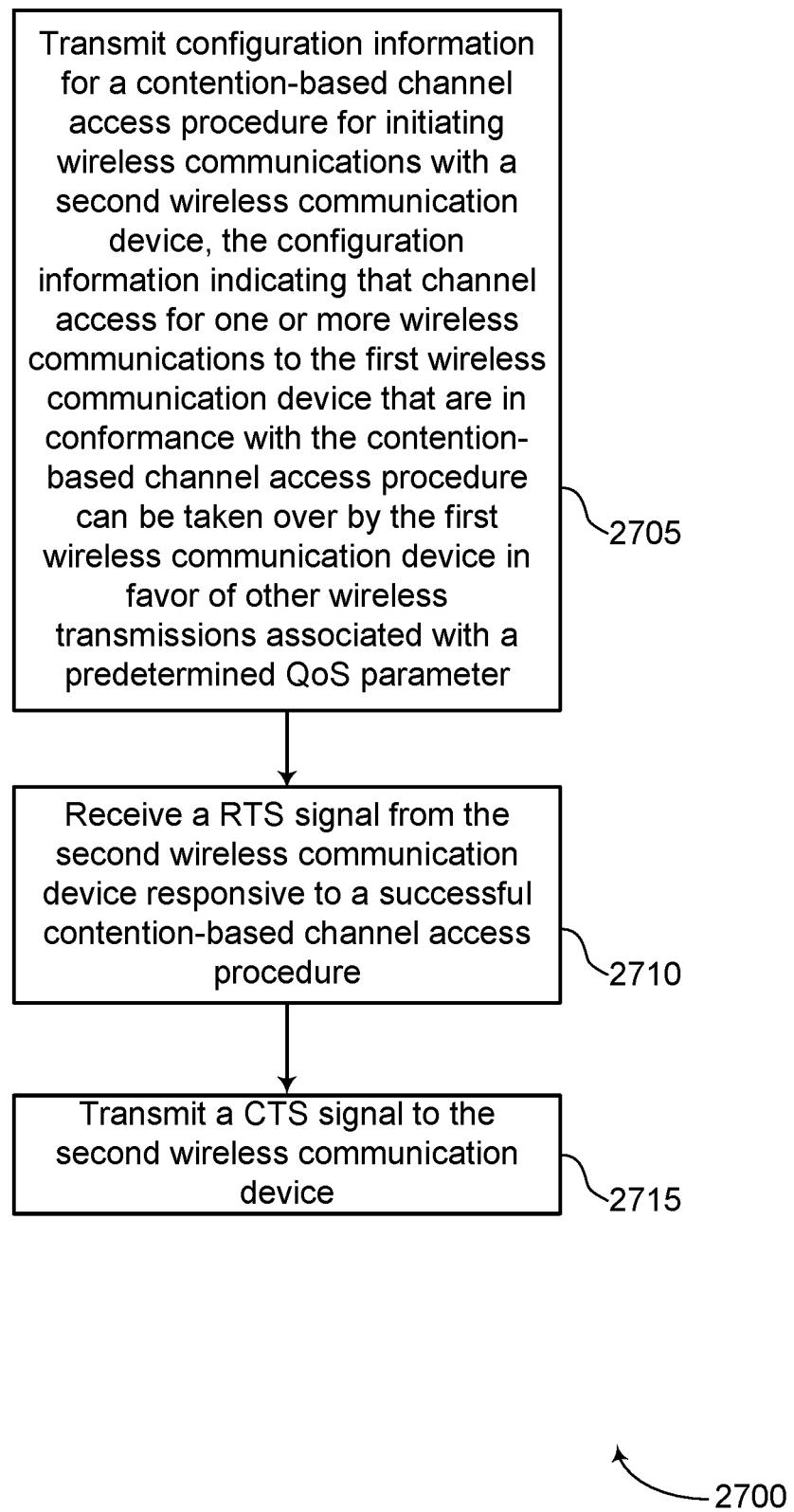

FIG. 27 shows a flowchart illustrating a method 2700 that supports techniques for low latency communications in wireless local area networks in accordance with aspects of the present disclosure. The operations of method 2700 may be implemented by an AP or its components as described herein. For example, the operations of method 2700 may be performed by a communications manager as described with reference to FIGS. 17-20. In some examples, a first wireless communication device (for example, an AP) may execute a set of instructions to control the functional elements of the first wireless communication device to perform the functions described below. Additionally or alternatively, a first wireless communication device may perform aspects of the functions described below using special-purpose hardware.

At 2705, the first wireless communication device may transmit configuration information for a contention-based channel access procedure for initiating wireless communications with a second wireless communication device, the configuration information indicating that channel access for one or more wireless communications to the first wireless communication device that are in conformance with the contention-based channel access procedure can be taken over by the first wireless communication device in favor of other wireless transmissions associated with a predetermined QoS parameter. The operations of 2705 may be performed according to the methods described herein. In some examples, aspects of the operations of 2705 may be performed by a configuration manager as described with reference to FIGS. 17-20.

At 2710, the first wireless communication device may receive an RTS signal from the second wireless communication device responsive to a successful contention-based channel access procedure. The operations of 2710 may be performed according to the methods described herein. In some examples, aspects of the operations of 2710 may be performed by a channel access manager as described with reference to FIGS. 17-20.

At 2715, the first wireless communication device may transmit a CTS signal to the second wireless communication device. The operations of 2715 may be performed according to the methods described herein. In some examples, aspects of the operations of 2715 may be performed by a low latency communication manager as described with reference to FIGS. 17-20.

It should be noted that the methods described above describe possible implementations, and that the operations and the steps may be rearranged or otherwise modified and that other implementations are possible. Furthermore, aspects from two or more of the methods may be combined.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

The hardware and data processing apparatus used to implement the various illustrative components, logics, logical blocks, modules and circuits described in connection with the aspects disclosed herein may be implemented or performed with a general purpose single- or multi-chip processor, a DSP, an ASIC, a FPGA or other programmable logic device (PLD), discrete gate or transistor logic, discrete hardware components, or any combination thereof designed to perform the functions described herein. A general purpose processor may be a microprocessor, or, any processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some implementations, particular processes, operations and methods may be performed by circuitry that is specific to a given function.

As described above, in some aspects implementations of the subject matter described in this specification can be implemented as software. For example, various functions of components disclosed herein or various blocks or steps of a method, operation, process or algorithm disclosed herein can be implemented as one or more modules of one or more computer programs. Such computer programs can include non-transitory processor- or computer-executable instructions encoded on one or more tangible processor- or computer-readable storage media for execution by, or to control the operation of, data processing apparatus including the components of the devices described herein. By way of example, and not limitation, such storage media may include RAM, ROM, EEPROM, CD-ROM or other optical disk storage, magnetic disk storage or other magnetic storage devices, or any other medium that may be used to store program code in the form of instructions or data structures. Combinations of the above should also be included within the scope of storage media.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), among other examples. CDMA2000 covers IS-2000, IS-95, and IS-856 standards. IS-2000 Releases may be commonly referred to as CDMA2000 1x, 1x, among other examples. IS-856 (TIA-856) is commonly referred to as CDMA2000 1xEV-DO, High Rate Packet Data (HRPD), among other examples. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, among other examples.

The wireless communication system or systems described herein may support synchronous or asynchronous operation. For synchronous operation, the stations may have similar frame timing, and transmissions from different stations may be approximately aligned in time. For asynchronous operation, the stations may have different frame timing, and transmissions from different stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communication system 100 of FIG. 1—may include one or more carriers, in which each carrier may be a signal made up of multiple sub-carriers (for example, waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, structures and devices are shown in block diagram form in order to avoid obscuring the concepts of the described examples.

In the appended Figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some examples be excised from the combination, and the claimed combination may be directed to a subcombination or variation of a subcombination.

Similarly, while operations are depicted in the drawings in a particular order, this should not be interpreted as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be interpreted as requiring such separation in all implementations, and it should be interpreted that the described program components and systems can generally be integrated together in a single software product or packaged into multiple software products.

What is claimed is:

1. A method for wireless communication at a first wireless communication device, comprising:

receiving, by the first wireless communication device, configuration information for a contention-based channel access procedure for initiating wireless communications with a second wireless communication device, the configuration information indicating that one or more wireless communications to the second wireless communication device that are in conformance with the contention-based channel access procedure can be discarded by the second wireless communication device in favor of other wireless transmissions associated with a predetermined quality of service (QoS) parameter;

performing the contention-based channel access procedure based at least in part on the configuration information;

transmitting, by the first wireless communication device, a first wireless communication to the second wireless communication device during a first transmission opportunity (TxOP) responsive to the successful completion of the contention-based channel access procedure; and determining, by the first wireless communication device, that the first wireless communication is discardable by the second wireless communication device based at least in part on the predetermined QoS parameter and the first wireless communication at least partially overlapping a QoS service period.

2. The method of claim 1, further comprising adjusting a contention window backoff counter for initiating a subsequent wireless communication to the second wireless communication device based at least in part on determining that the first wireless communication has been discarded by the second wireless communication device, wherein the contention window backoff counter is maintained at or reduced from a prior contention window backoff counter used for the first wireless communication.

3. The method of claim 1, further comprising receiving a trigger, during the first TxOP or during a subsequent TxOP, to initiate at least a retransmission of the first wireless communication to the second wireless communication device.

4. The method of claim 1, further comprising determining that the first wireless communication has been discarded by the second wireless communication device based at least in part on a negative acknowledgment or negative block acknowledgment received from the second wireless communication device, a transmission addressed to a third wireless communication device received from the second wireless communication device, or both.

5. The method of claim 1, further comprising:
receiving a schedule of QoS service periods for data traffic associated with the predetermined QoS parameter; and
wherein determining that the first wireless communication is discardable by the second wireless communication device is based at least in part on the schedule.

6. The method of claim 1, wherein the predetermined QoS parameter corresponds to one or more of a low latency threshold or a service priority threshold.

7. A method for wireless communication at a first wireless communication device, comprising:
determining, by the first wireless communication device, that wireless communications of data traffic associated with a predetermined quality of service (QoS) parameter are to be prioritized compared to other wireless communications during at least a first portion of a QoS service period;
determining, by the first wireless communication device, that a first wireless communication initiated by a second wireless communication device at least partially overlaps with the QoS service period, wherein the first wireless communication is in conformance with a contention-based channel access procedure for initiating the first wireless communication;
determining, by the first wireless communication device, that the first wireless communication is not associated with the predetermined QoS parameter; and
discarding, by the first wireless communication device, the first wireless communication based at least in part on the determining that the first wireless communication at least partially overlaps the QoS service period and based on the determining that the first wireless communication is not associated with the predetermined QoS parameter.

8. The method of claim 7, further comprising determining that the first wireless communication at least partially overlaps the QoS service period based at least in part on a transmission end time provided in a header of the first wireless communication.

9. The method of claim 7, further comprising transmitting configuration information to one or more wireless communication devices, the configuration information including an indication that wireless communications of the one or more wireless communication devices can be discarded by the first wireless communication device, and that a backoff counter for initiating a subsequent wireless communication from the one or more wireless communication devices can be adjusted responsive to the first wireless communication being discarded.

10. The method of claim 7, further comprising transmitting a negative acknowledgment or negative block acknowledgment that indicates that the first wireless communication has been discarded by the first wireless communication device.

11. The method of claim 7, further comprising transmitting an indication to the second wireless communication device during the QoS service period or a subsequent TxOP to initiate a contention-free retransmission of the first wireless communication by the second wireless communication device.

12. The method of claim 11, wherein the indication to the second wireless communication device is a trigger frame or a reverse direction grant provided to the second wireless communication device.

13. The method of claim 7, further comprising:
transmitting a wireless communication having data traffic associated with the predetermined QoS parameter to a third wireless communication device during the QoS service period.

14. The method of claim 13, wherein the transmitting comprises:
performing an energy detection procedure on each of a plurality of channels to be used for transmission of the wireless communication having data traffic associated with the predetermined QoS parameter; and
suppressing portions of the wireless communication having data traffic associated with the predetermined QoS parameter on at least a first channel of the plurality of channels responsive to a detected energy of the first channel being above a threshold value.

15. The method of claim 7, wherein the second wireless communication device is associated with the first wireless communication device, and the first wireless communication device accesses a channel for transmitting a wireless communication having data traffic associated with the predetermined QoS parameter to a third wireless communication device.

16. The method of claim 7, further comprising:
transmitting a schedule of QoS service periods for data traffic associated with the predetermined QoS parameter.

17. The method of claim 16, wherein the schedule of QoS service periods is transmitted in a broadcast management frame.

18. An apparatus for wireless communication at a first wireless communication device, comprising: a processor, memory in electronic communication with the processor, and instructions stored in the memory and executable by the processor to cause the apparatus to:
receive, by the first wireless communication device, configuration information for a contention-based channel access procedure for initiating wireless communications with a second wireless communication device, the configuration information indicating that one or more wireless communications to the second wireless communication device that are in conformance with the contention-based channel access procedure can be discarded by the second wireless communication device in favor of other wireless transmissions associated with a predetermined quality of service (QoS) parameter;
perform the contention-based channel access procedure based at least in part on the configuration information;

transmit, by the first wireless communication device, a first wireless communication to the second wireless communication device during a first transmission opportunity (TxOP) responsive to the successful completion of the contention-based channel access procedure; and determine, by the first wireless communication device, that the first wireless communication is discardable by the second wireless communication device based at least in part on the predetermined QoS parameter and the first wireless communication at least partially overlapping a QoS service period.

19. The apparatus of claim 18, further comprising adjusting a contention window backoff counter for initiating a subsequent wireless communication to the second wireless communication device based at least in part on determining that the first wireless communication has been discarded by the second wireless communication device, wherein the contention window backoff counter is maintained at or reduced from a prior contention window backoff counter used for the first wireless communication.

20. The apparatus of claim 18, further comprising receiving a trigger, during the first TxOP or during a subsequent TxOP, to initiate at least a retransmission of the first wireless communication to the second wireless communication device.

21. The apparatus of claim 18, further comprising determining that the first wireless communication has been discarded by the second wireless communication device based at least in part on a negative acknowledgment or negative block acknowledgment received from the second wireless communication device, a transmission addressed to a third wireless communication device received from the second wireless communication device, or both.

22. The apparatus of claim 18, wherein the instructions are further executable by the processor to cause the apparatus to:
receive a schedule of QoS service periods for data traffic associated with the predetermined QoS parameter; and
wherein determining that the first wireless communication is discardable by the second wireless communication device is based at least in part on the schedule.

23. The apparatus of claim 18, wherein the predetermined QoS parameter corresponds to one or more of a low latency threshold or a service priority threshold.

24. An apparatus for wireless communication at a first wireless communication device, comprising: a processor, memory in electronic communication with the processor, and instructions stored in the memory and executable by the processor to cause the apparatus to:
determine, by the first wireless communication device, that wireless communications of data traffic associated with a predetermined quality of service (QoS) parameter are to be prioritized compared to other wireless communications during at least a first portion of a QoS service period;

determine, by the first wireless communication device, that a first wireless communication initiated by a second wireless communication device at least partially overlaps with the QoS service period, wherein the first wireless communication is in conformance with a contention-based channel access procedure for initiating the first wireless communication;

determine, by the first wireless communication device, that the first wireless communication is not associated with the predetermined QoS parameter; and discard, by the first wireless communication device, the first wireless communication based at least in part on the determining that the first wireless communication at least partially overlaps the QoS service period and based on the determining that the first wireless communication is not associated with the predetermined QoS parameter.

25. The apparatus of claim 24, further comprising determining that the first wireless communication at least partially overlaps the QoS service period based at least in part on a transmission end time provided in a header of the first wireless communication.

26. The apparatus of claim 24, further comprising transmitting configuration information to one or more wireless communication devices, the configuration information including an indication that wireless communications of the one or more wireless communication devices can be discarded by the first wireless communication device, and that a backoff counter for initiating a subsequent wireless communication from the one or more wireless communication devices can be adjusted responsive to the first wireless communication being discarded.

27. The apparatus of claim 24, further comprising transmitting a negative acknowledgment or negative block acknowledgment that indicates that the first wireless communication has been discarded by the first wireless communication device.

28. The apparatus of claim 24, further comprising transmitting an indication to the second wireless communication device during the QoS service period or a subsequent TxOP to initiate a contention-free retransmission of the first wireless communication by the second wireless communication device.

29. The apparatus of claim 28, wherein the indication to the second wireless communication device is a trigger frame or a reverse direction grant provided to the second wireless communication device.

30. The apparatus of claim 24, wherein the instructions are further executable by the processor to cause the apparatus to:
transmit a wireless communication having data traffic associated with the predetermined QoS parameter to a third wireless communication device during the QoS service period.

* * * * *